(12) United States Patent
Stiles, Jr. et al.

(10) Patent No.: US 11,845,020 B2
(45) Date of Patent: *Dec. 19, 2023

(54) SYSTEM AND METHOD FOR A FILTER SYSTEM

(71) Applicant: Pentair Water Pool and Spa, Inc., Cary, NC (US)

(72) Inventors: Robert W. Stiles, Jr., Cary, NC (US); Ronald B. Robol, Savannah, GA (US); Everett Franklin Cox, Sanford, NC (US); Thomas Johnson Ray Safon, Holly Springs, NC (US); Anuj Saini, Haridwar Uttarakhand (IN); Alex Victor, Ghaziabad (IN)

(73) Assignee: Pentair Water Pool and Spa, Inc., Cary, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/654,947

(22) Filed: Mar. 15, 2022

(65) Prior Publication Data
US 2022/0203274 A1 Jun. 30, 2022

Related U.S. Application Data

(63) Continuation of application No. 16/812,992, filed on Mar. 9, 2020, now Pat. No. 11,273,394, which is a
(Continued)

(51) Int. Cl.
*B01D 29/60* (2006.01)
*E04H 4/12* (2006.01)
(Continued)

(52) U.S. Cl.
CPC ........... *B01D 29/606* (2013.01); *B01D 29/15* (2013.01); *B01D 29/48* (2013.01); *B01D 29/66* (2013.01);
(Continued)

(58) Field of Classification Search
CPC ...... B01D 29/606; B01D 29/15; B01D 29/48; B01D 29/66; B01D 29/668; B01D 29/682;
(Continued)

(56) References Cited

U.S. PATENT DOCUMENTS 3,574,509 A * 4/1971 Zentis ................. B01D 29/682
  210/415
5,320,750 A * 6/1994 Krofta ....................... C02F 1/24
  210/275

(Continued)

FOREIGN PATENT DOCUMENTS

KR      10-0875389 B1 * 12/2008
WO   WO 2015023763 A1 *  2/2015
WO   WO 2017154011 A1 *  9/2017

OTHER PUBLICATIONS

Communication pursuant to Article 94(3) EPC for European Patent Application No. 18855455.4 dated Feb. 2, 2022, 4 pages.
(Continued)

*Primary Examiner* — Fred Prince
(74) *Attorney, Agent, or Firm* — Husch Blackwell LLP

(57) ABSTRACT

A variable pore size filter media including an upper plate, a retainer, and a support profile disposed between the upper plate and the retainer. The variable pore size filter media also includes a plurality of wire rings disposed on the support profile and longitudinally distributed within a region between the upper plate and the retainer, the plurality of wire rings being distributed in a non-contiguous manner to form a plurality of spaces therebetween. The variable pore size filter media further includes a plurality of pores defined by the plurality of spaces between the plurality of wire rings and a pore size adjustment mechanism configured to vary a respective distance between each of the plurality of wire rings to increase or decrease a respective size of each of the (Continued)

plurality of pores by increasing or decreasing a size of each of the plurality of spaces.

20 Claims, 81 Drawing Sheets

Related U.S. Application Data continuation of application No. 16/129,660, filed on Sep. 12, 2018, now Pat. No. 10,583,378.

(60) Provisional application No. 62/557,694, filed on Sep. 12, 2017.

(51) Int. Cl.
*B01D 29/66* (2006.01)
*B01D 29/68* (2006.01)
*B01D 29/48* (2006.01)
*B01D 29/15* (2006.01)

(52) U.S. Cl.
CPC ......... *B01D 29/668* (2013.01); *B01D 29/682* (2013.01); *E04H 4/1245* (2013.01); *B01D 2201/186* (2013.01); *B01D 2201/29* (2013.01); *B01D 2201/302* (2013.01); *B01D 2201/32* (2013.01); *B01D 2201/583* (2013.01); *B01D 2321/205* (2013.01); *B01D 2321/22* (2013.01)

(58) Field of Classification Search
CPC .......... B01D 2201/186; B01D 2201/29; B01D 2201/302; B01D 2201/32; B01D 2201/583; B01D 2321/205; B01D 2321/22; E04H 4/1245
USPC ...... 210/143, 167.1, 167.12, 167.13, 167.14, 210/167.17, 411
See application file for complete search history.

(56) References Cited

U.S. PATENT DOCUMENTS

| | | | | |
|---|---|---|---|---|
| 7,513,372 | B2 * | 4/2009 | Carew | B01D 29/48 210/497.1 |
| 2004/0206685 | A1 * | 10/2004 | Kang | B01D 29/216 210/357 |
| 2006/0151376 | A1 * | 7/2006 | Tubbs | B01D 35/02 210/335 |
| 2008/0060985 | A1 * | 3/2008 | Carew | B01D 29/925 210/497.1 |
| 2012/0267295 | A1 * | 10/2012 | Kim | B01D 29/114 210/408 |
| 2014/0099234 | A1 * | 4/2014 | Hirshberg | B01D 46/0041 210/767 |

OTHER PUBLICATIONS

Communication pursuant to Article 94(3) EPC for European Patent Application No. 18855455.4 dated Aug. 26, 2022, 4 pages.

\* cited by examiner

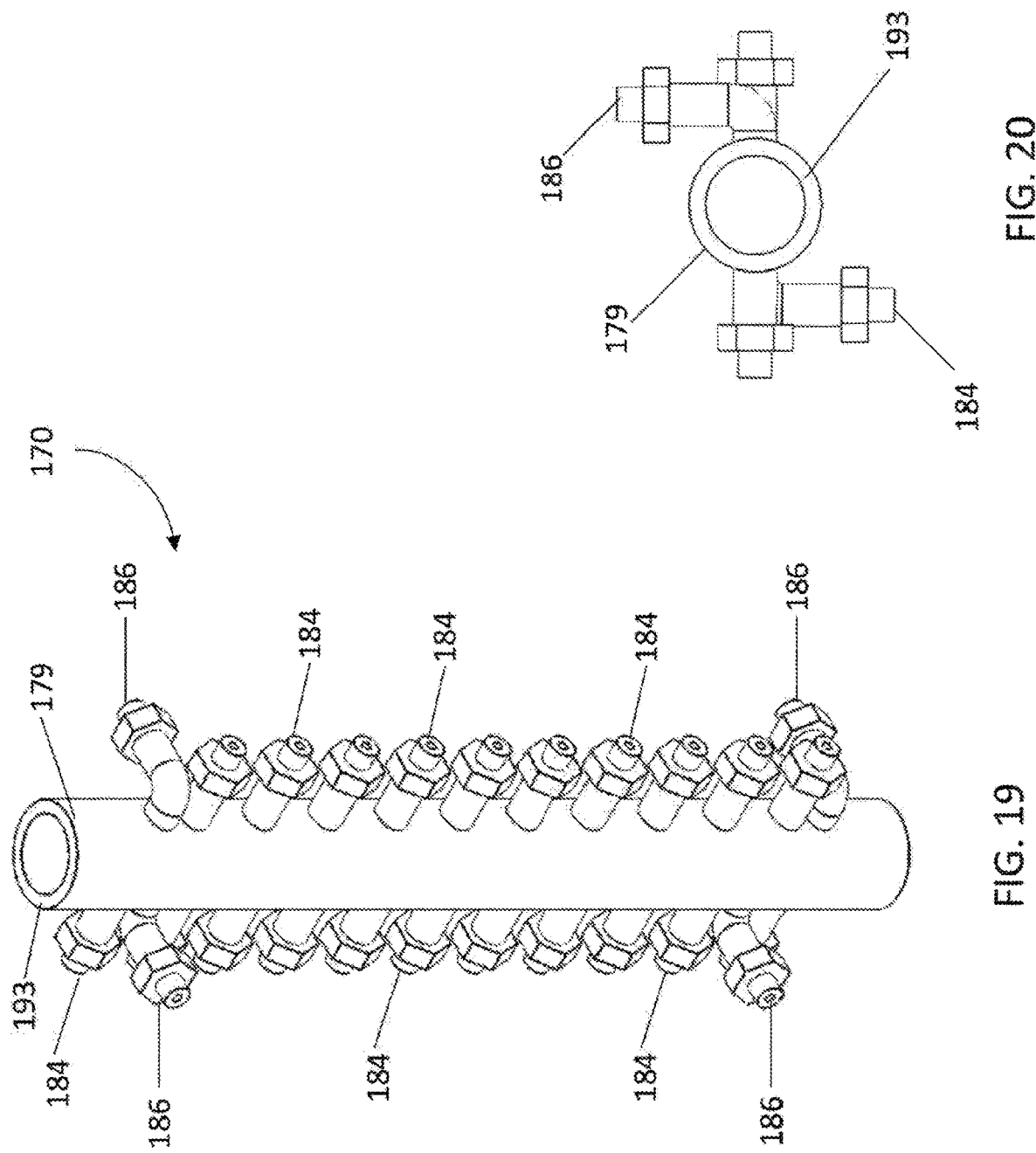

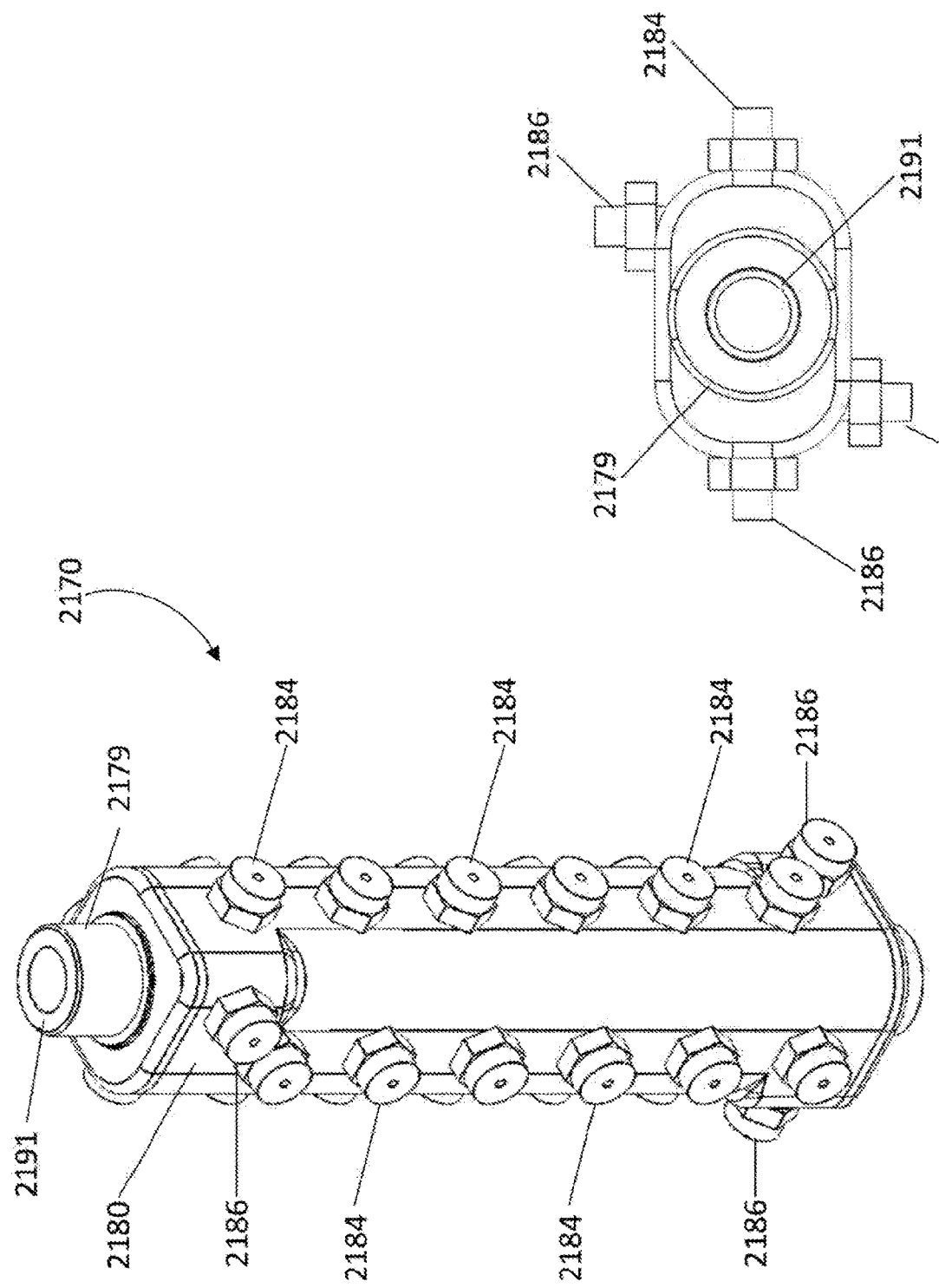
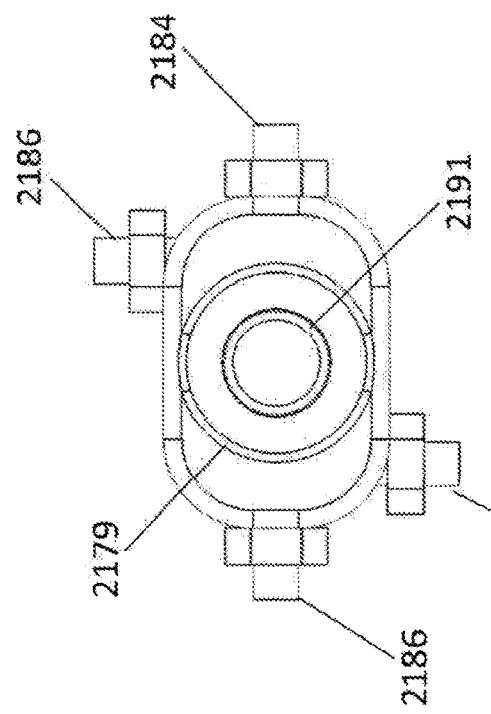
FIG. 21
FIG. 22

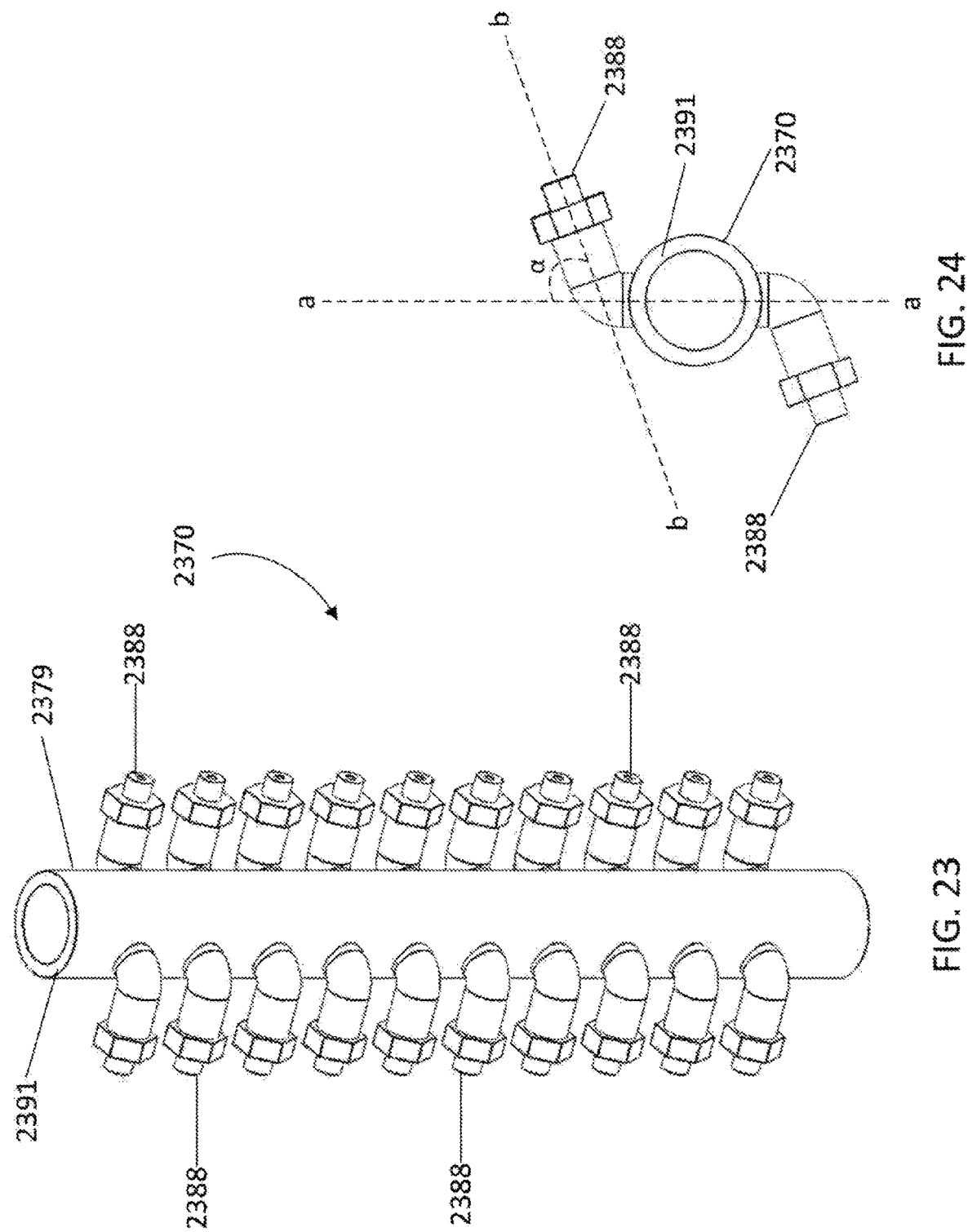

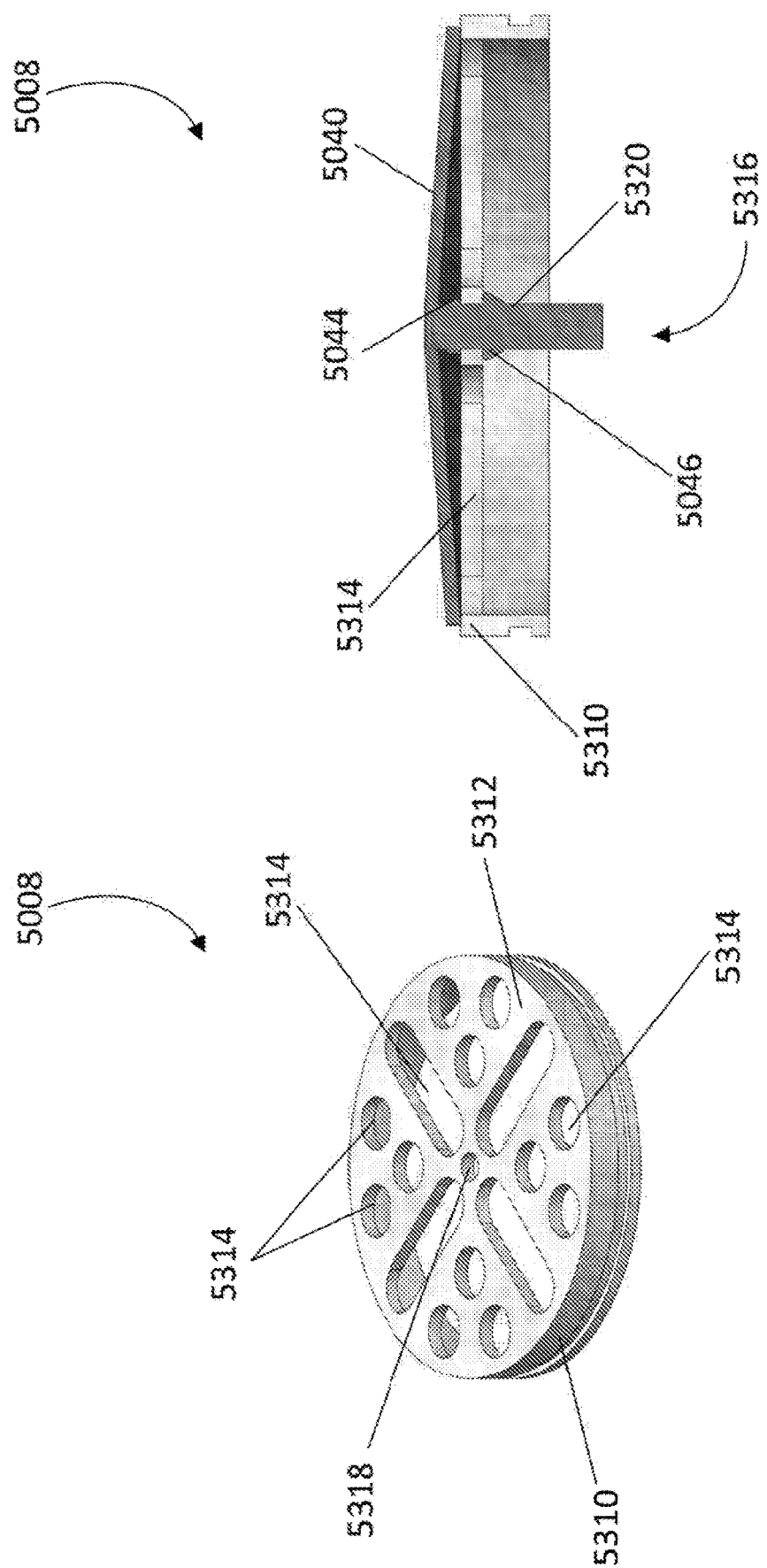

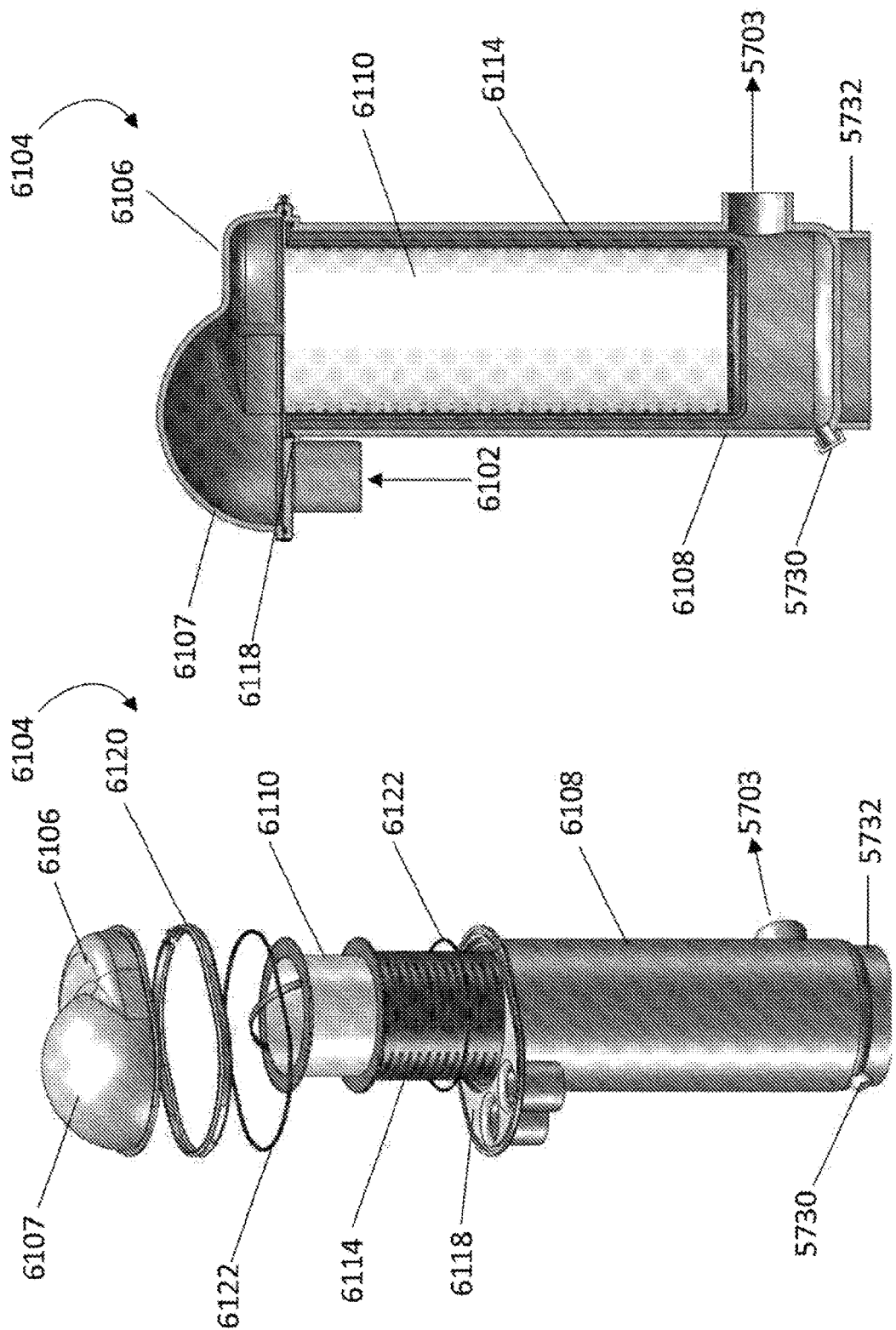

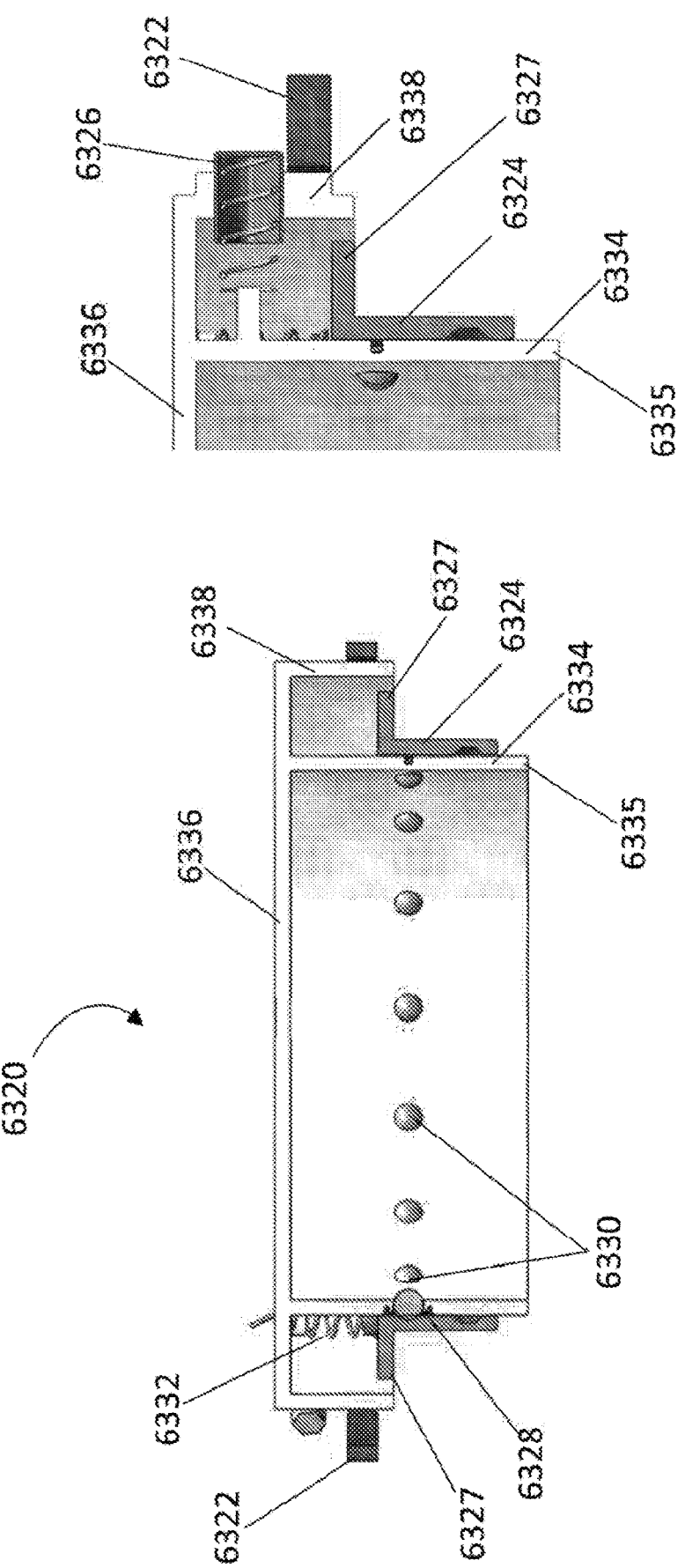

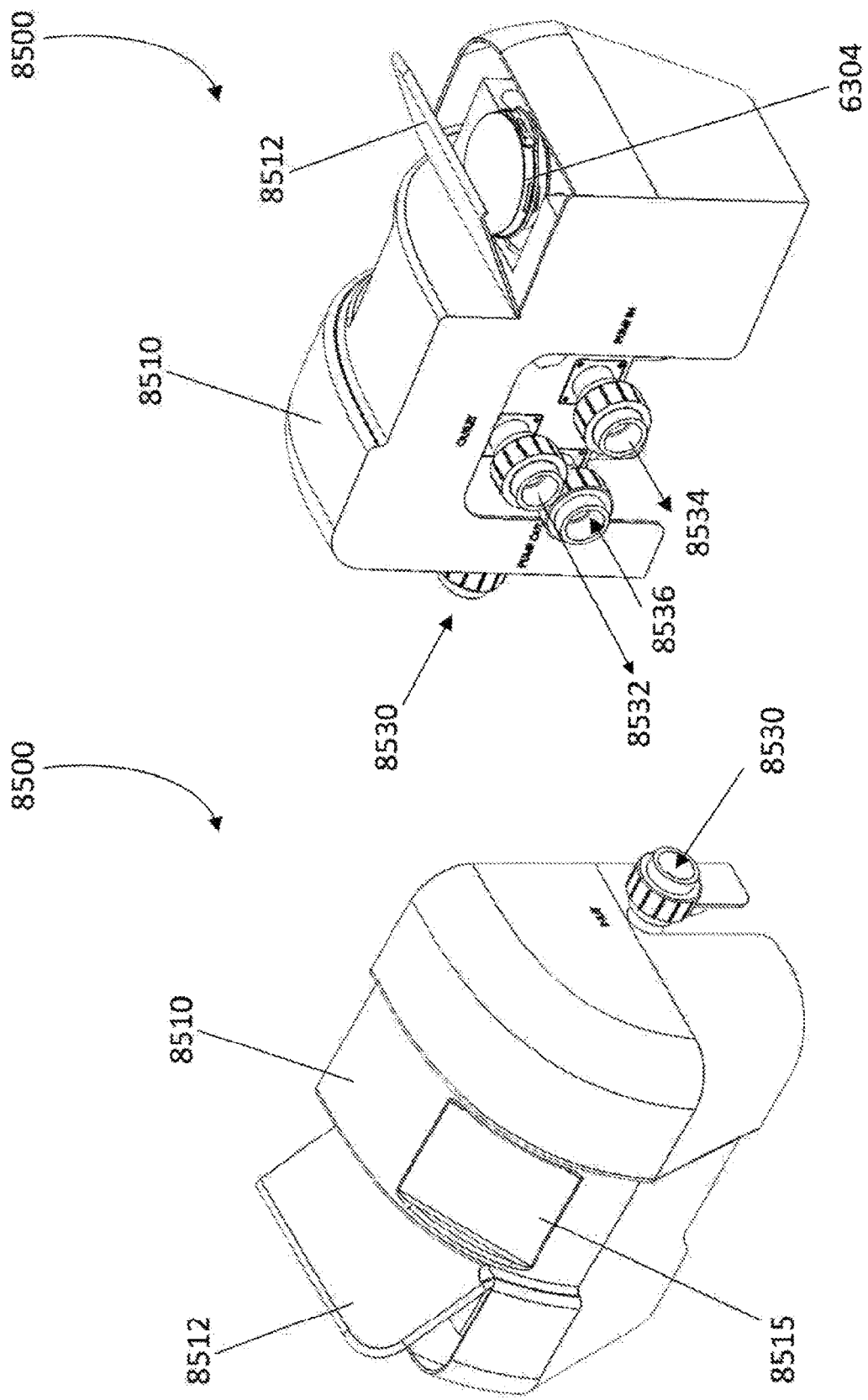

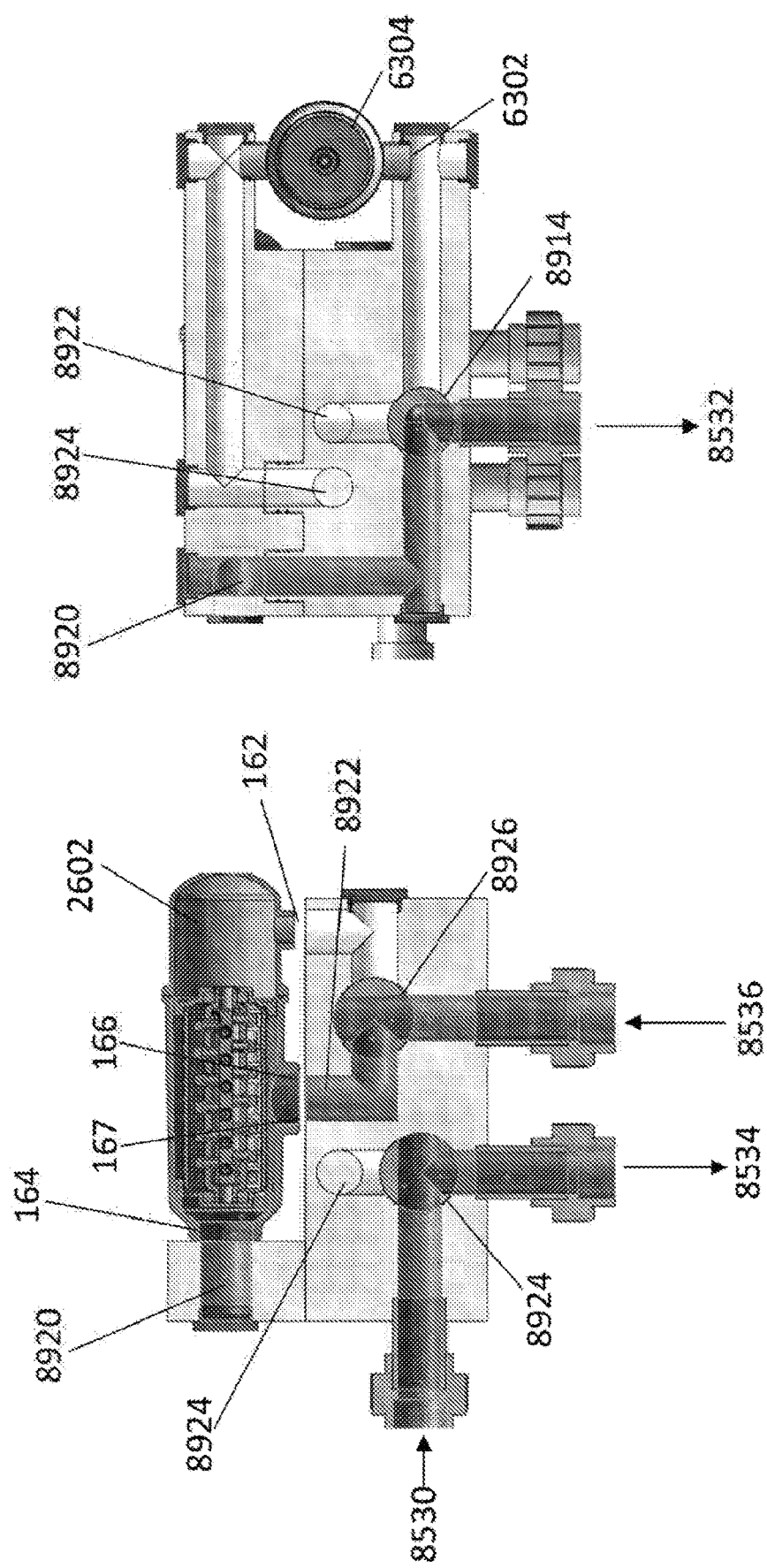

SYSTEM AND METHOD FOR A FILTER SYSTEM

CROSS-REFERENCE TO RELATED APPLICATIONS

This application is a continuation of U.S. patent application Ser. No. 16/812,992 filed on Mar. 9, 2020, which is a continuation of and claims priority to U.S. patent application Ser. No. 16/129,660, filed on Sep. 12, 2018, which claims priority to U.S. Provisional Application No. 62/557,694, filed on Sep. 12, 2017, the entire contents of which are herein incorporated by reference.

BACKGROUND

Filtration systems are an important aspect of ensuring healthy conditions in swimming pools, hot tubs, plunge pools, and other recreational water venues. Filtration systems are used to remove pollutants and contaminants to reduce turbidity and to promote visual clarity of the water. Contaminants are often introduced into pools by environmental sources such as windblown debris, external unsanitary water sources, and droppings from animals that contain potentially harmful pathogens. Other contaminants are introduced from the swimmers and can include sweat, bodily oils, suntan lotion, urine, and fecal matter. In addition to contributing to high turbidity, contaminants can also react with disinfectant chemicals to produce chloramines and other disinfection by-products, which can contribute to adverse health effects.

In general, there are four pool filtration technologies currently used in the art: diatomaceous earth filters, pressure-fed sand filters, gravity sand filters, and cartridge filters. Typically, each filter type requires manual cleaning to prevent fouling and high pressure operation. Disassembly of the filter is often a laborious task, and manual backwashing of the filter often results in a loss of filter material that must be replaced before use. Additionally, if the filters are not cleaned regularly, high pressure operation can lead to costly and inefficient energy operation.

SUMMARY

Currently, there is a need for an energy efficient pool filtration system that simplifies the cleaning process.

Some embodiments of the invention provide a variable pore size filter media including an upper plate, a retainer, and a support profile disposed between the upper plate and the retainer. The variable pore size filter media also includes a plurality of wire rings disposed on the support profile and longitudinally distributed within a region between the upper plate and the retainer, the plurality of wire rings being distributed in a non-contiguous manner to form a plurality of spaces therebetween. The variable pore size filter media further includes a plurality of pores defined by the plurality of spaces between the plurality of wire rings and a pore size adjustment mechanism configured to vary a respective distance between each of the plurality of wire rings to increase or decrease a respective size of each of the plurality of pores by increasing or decreasing a size of each of the plurality of spaces.

In some forms, the filter includes a housing having an inlet to receive a fluid, and an outlet to discharge filtrate, a filter media positioned in an inner chamber of the housing, the filter media having a plurality of wire rings longitudinally distributed apart from one another within the inner chamber to form a plurality of spaces therebetween. The filter also includes a plurality of pores defined by the plurality of spaces between the plurality of wire rings and an actuator coupled to the filter media to move a portion of the filter media to change a dimension of the plurality of pores by increasing or decreasing a size of each of the plurality of spaces. The filter further includes a controller communicatively coupled to the actuator, the controller configured to control the actuator to move the portion of the filter media.

In some forms, a variable pore size filter includes an upper plate, a retainer, a support profile disposed between the upper plate and the retainer, and a plurality of wire rings disposed on the support profile and longitudinally distributed between the upper plate and the retainer to form a plurality of pores therebetween. The variable pore size filter also includes a plurality of magnets coupled to the plurality of wire rings, at least one sensor configured to generate a signal and an actuator coupled to the upper plate. The variable pore size filter further includes a controller communicatively coupled to the actuator and at least one sensor. The controller can be configured to control the actuator based on the signal from the at least one sensor to increase or decrease a respective size of each of the plurality of pores.

The foregoing and other embodiments and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DESCRIPTION OF THE DRAWINGS

FIG. 19 is a perspective view of a backwash jet assembly according to one embodiment of the invention.

FIG. 20 is a top view of a backwash jet assembly according to one embodiment of the invention.

FIG. 21 is a perspective view of a backwash jet assembly according to one embodiment of the invention.

FIG. 22 is a top view of a backwash jet assembly according to one embodiment of the invention.

FIG. 23 is a perspective view of a backwash jet assembly according to one embodiment of the invention.

FIG. 24 is a top view of a backwash jet assembly according to one embodiment of the invention.

FIG. 53 is a perspective view of a check valve for a backwash filter according to one embodiment of the invention.

FIG. 54 is a cross sectional view of a check valve for a backwash filter according to one embodiment of the invention.

FIG. 61 is a cross sectional and partially exploded view of a backwash filter according to one embodiment of the invention.

FIG. 62 is a cross sectional view of a backwash filter according to one embodiment of the invention.

FIG. 67 is a cross sectional view of a filter top for a backwash filter according to one embodiment of the invention.

FIG. 68 is a cross sectional view of a filter top for a backwash filter according to one embodiment of the invention.

FIG. 84 is a perspective view of a filter system according to one embodiment of the invention.

FIG. 85 is a perspective view of a filter system according to one embodiment of the invention.

FIG. 89 is a top view of a manifold assembly according to one embodiment of the invention.

FIG. 90 is a top view of a manifold assembly according to one embodiment of the invention.

DETAILED DESCRIPTION

Figure 1:
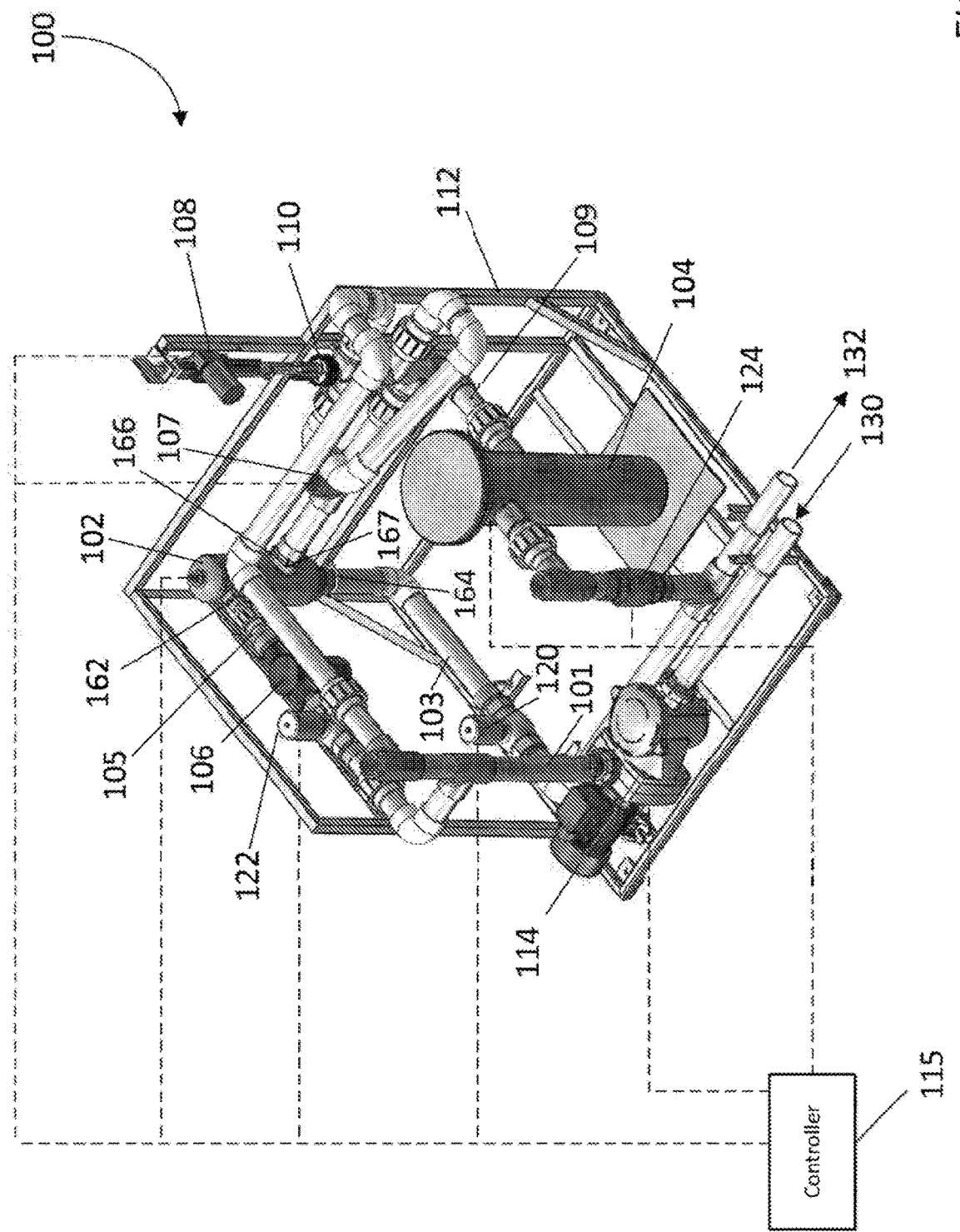
FIG. 1 is a perspective view of a filter system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, the terms "fluid," "fluid mixture," "fluid containing debris," and "fluid slurry," can refer to any liquid or gas mixture, but is generally used to define an aqueous solution, an organic solution, a colloidal solution, and mixtures of these solutions that are dispersed soluble and/or insoluble particles. The following fluids are examples of the types of fluids that can be filtered using various embodiments of the invention: pool, spa, and/or water feature, potable waste solutions, petroleum solutions, beverages, pharmaceutical solutions, dairy solutions (e.g., milk and whey solutions), sewage solutions, industrial waste solutions, and solutions laden with particles greater than 1 micron (e.g., sand, silt, human hair, plant spores), and solutions laden with particles greater than 0.1 micron.

Filtration System

FIG. 1 illustrates a filter system 100 according to one embodiment of the invention. In general, the filter system 100 includes a primary filter 102, a backwash filter 104, a pre-screen filter 106, at least one sensor 107, a pump 114 in fluid communication with a fluid inlet stream 130, and a fluid outlet stream 132. The fluid inlet stream 130 includes an inlet fluid mixture that the pump 114 transfers from a fluid reservoir (not shown) to the filtration system 100.

In one embodiment, the filter system 100 includes a fluid feed line 101 connected to a cleaning inlet 167 of the primary filter 102. The fluid feed line 101 may include a first feed line valve 122 and a second feed line valve 110. In the illustrated embodiment, the second feed line valve 110 comprises a push-pull valve 110 and an actuator 108 that controls the position of the push-pull valve 110. The primary filter 102 includes filter media disposed within the housing that filters the inlet fluid mixture to generate a filtrate that discharges from the primary filter 102 through the cleaning outlet 164. The filtrate flows along a filtrate line 103 that transfers the filtrate out of the filter system 100 through the fluid outlet stream 132. The filtrate line 103 includes a first filtrate valve 120 positioned downstream of the primary filter 102.

The filter system 100 further includes a pre-screen filter 106 in fluid communication with the first feed line valve 122 and a backwash inlet 162 of the primary filter 102. The pre-screen filter may be positioned in a pre-filter line 105 defined as the length of pipe between the first feed line valve 122 and the backwash inlet 162. The pre-screen filter 106 includes pre-screen filter media that filters the inlet fluid mixture. The pre-screen filter 106 discharges a filtrate that is transferred to the backwash inlet 162 of the primary filter 102. The filter system 100 further includes a backwash filter 104 in fluid communication with the second feed line valve 110 and the backwash outlet of the primary filter 102. The backwash filter includes backwash filter media that filters the backwash fluid transferred from the backwash outlet 166 of the primary filter 102 during the backwash cycle to generate a filtrate. The filtrate discharging from the backwash filter 104 may be transferred to the filtrate line 103. The flow rate of filtrate discharging form the backwash filter 104 is regulated by a second filtrate valve 124 positioned between the backwash filter 104 and the filtrate line 103. A backwash line 109 may be defined by the length of pipe between the backwash outlet 166 of the primary filter 102 and the second filtrate valve 124. A frame 112 is configured to support the components of the filter system 100.

The filter system 100 also includes a controller 115 that is in electrical communication with the first feed line valve 122, the second feed line valve 110, the first filtrate valve 120, and the second filtrate valve 124 to direct flow between two operational sequences: a cleaning cycle and a backwash cycle. The controller 115 is also in electrical communication with the primary filter 102, the backwash filter 104, the one or more sensor 107, the pump 114, and the actuator 108.

Although the filter system 100 includes a single sensor 107 positioned upstream of the primary filter 102 in the fluid feed line 101, other sensors or additional sensors 107 can be placed in one or more process streams (e.g., the pre-filter line, the backwash line, or the filtrate line), or within any one of the process units (e.g., primary filter, pre-screen filter, backwash filter). The sensors 107 may be used to generate a signal indicative of a process parameter, such as a pressure, a temperature, a flow rate, a fluid level, a fluid density, a count, or an operation time. The controller 115 is connected to the sensors 107 to receive the signal and may generate a control signal, for example, to control the flow within the filter system to transition from a cleaning cycle to a backwash cycle.

As will be discussed below in the descriptions of the various embodiments of the invention, the primary filter 102 may have static filter media and/or filter media having variable pores. For example, an actuator (not shown in FIG. 1) may be coupled to the filter media and connected to the controller 115. The actuator may move the filter media in the primary filter 102 to vary a dimension of the pores. For example, the dimension of the pores may be moved from a fully-open dimension of the pores, a fully-closed dimension of the pores, and positions therebetween. In some embodiments, the actuator varies the dimension of the pores based on one or more signal that is generated by the sensors 107 in the filtration system 100. In one embodiment, the controller causes the actuator to reduce the dimension of the pores when the pressure signal approaches a linear state, a predetermined static state, or a dynamic state.

Operational Sequences

Figure 2:
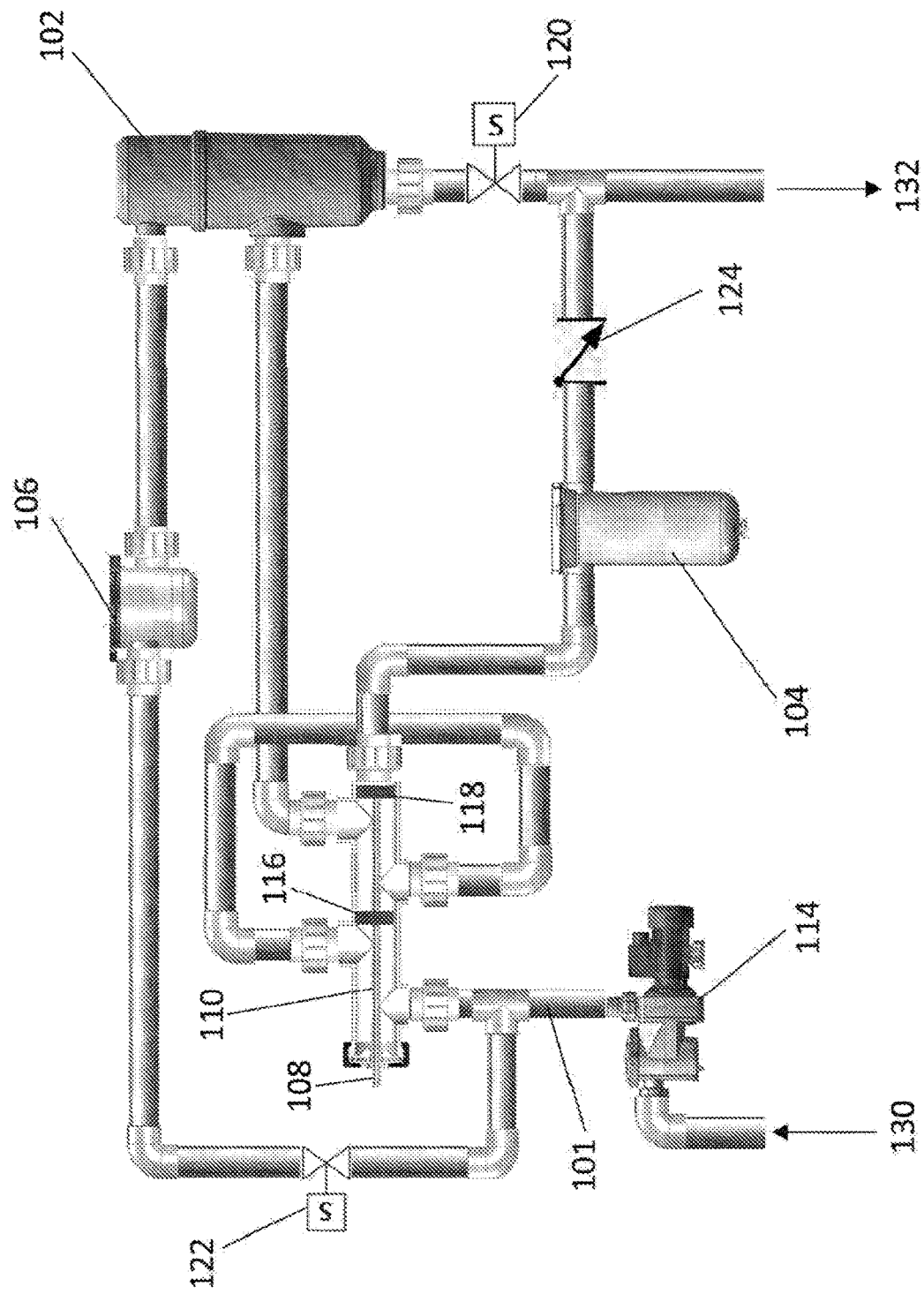
FIG. 2 is a schematic flow diagram for the filter system operating in the cleaning cycle according to one embodiment of the invention.
Figure 3:
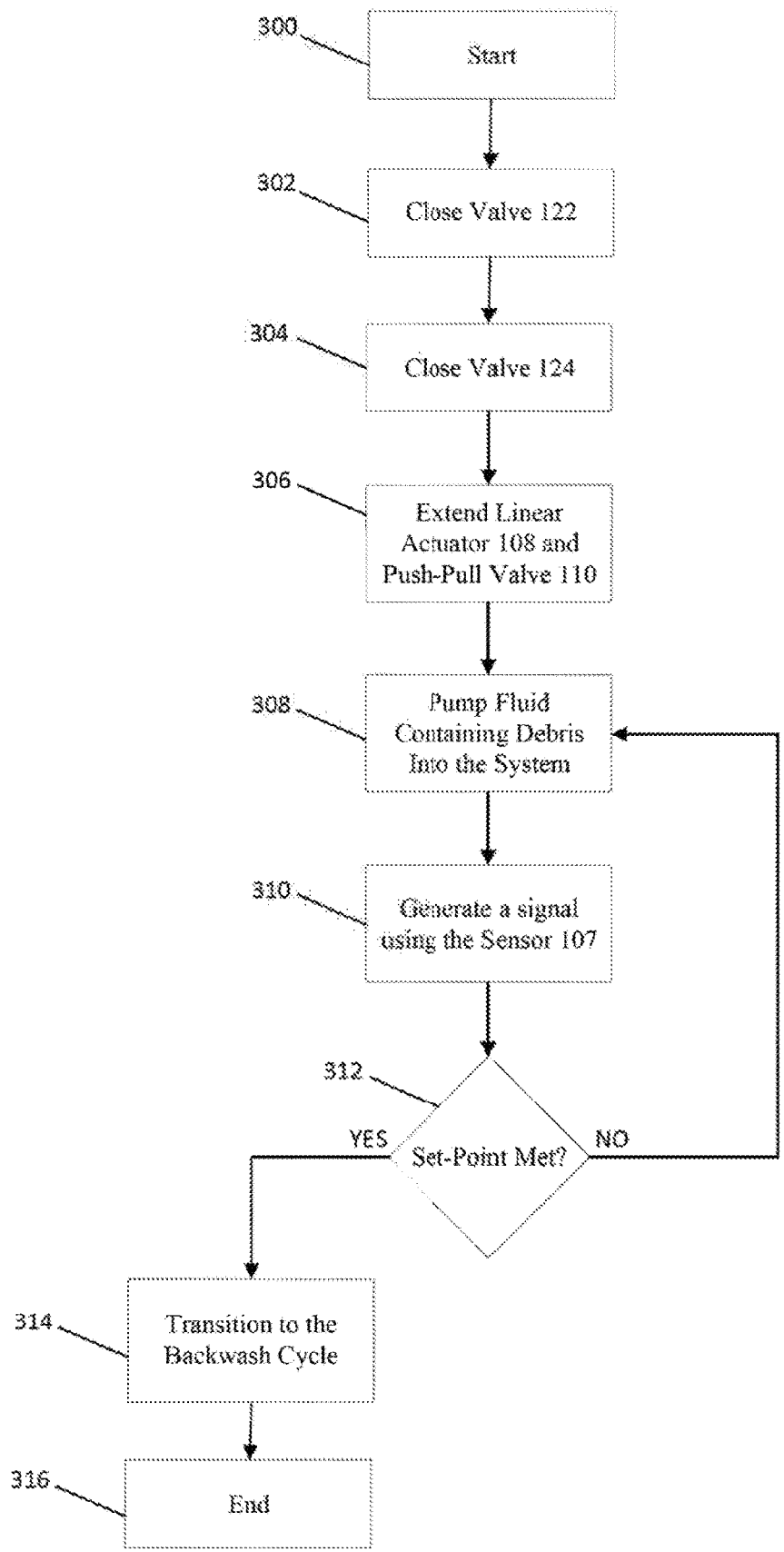
FIG. 3 is a method flow diagram showing a start-up method for the filter system according to one embodiment of the invention.

The cleaning cycle removes debris from the fluid inlet stream 130 using the primary filter 102 and discharges filtered fluid through the fluid outlet stream 132. FIG. 2 illustrates a schematic flow diagram for the filter system 100 operating in the cleaning cycle, and FIG. 3 illustrates a start-up method for the filter system 100. After initiating the cleaning cycle at step 300, the controller 115 closes the first feed line valve 122 and the second filtrate valve 124, as indicated by steps 302-304, while all the other valves are maintained in the open position. In one embodiment, valves 122 and 124 are two-way solenoid valves. Alternatively, the valve 124 can be a check valve. At step 306, the second feed line valve 110 is configured to transfer the inlet fluid mixture from the fluid inlet stream 130 to the cleaning inlet 167 of the primary filter.

For example, in FIG. 1 the linear actuator 108 extends the push-pull valve 110 and positions a first washer valve 116 and a second washer valve 118 to direct the fluid containing debris towards the primary filter 102. The first washer valve 116 and the second washer valve 118 are connected to the piston shaft of the push-pull valve 110, and further include lubricated gaskets positioned concentrically on the outside of the washer to prevent the passage of fluid. At step 308, fluid containing debris is pumped into the filter system 100, and directed toward the cleaning inlet 167 of the primary filter 102. The fluid containing debris is then filtered by passing through the primary filter 102 and exits through the cleaning outlet 164. The filtered fluid then passes through the first filtrate valve 120 where it is directed to the fluid outlet stream 132, and discharges from the filter system 100. In some embodiments, the filtrate is transferred to reservoir, such as a pool or a container to collect the filtrate. At step 310 of the cleaning cycle, the sensor 107 generate a signal in the filter system 100, such as the inlet pressure to the primary filter 102. The cleaning cycle continues until the signal meets, exceeds, or drops below a pre-determined set-point. In one embodiment, the system may transition from the cleaning cycle to the backwash cycle when the set-point exceeds a pressure set-point of 1 (.+−.0.5) psi above the base pressure. The base pressure may depend on the filter area, flow rate, and turbidity of the fluid. Once the pre-determined set-point is exceeded, the controller 115 begins transitioning into the backwash cycle.

The backwash cycle removes debris that becomes entrained on the filter media of the primary filter 102 during the cleaning cycle. The backwash cycle of the filter system 100 results in substantially no fluid loss and reduces the energy requirement of the cleaning cycle by periodically reducing the pressure of operation during the filtration process.

Figure 4:
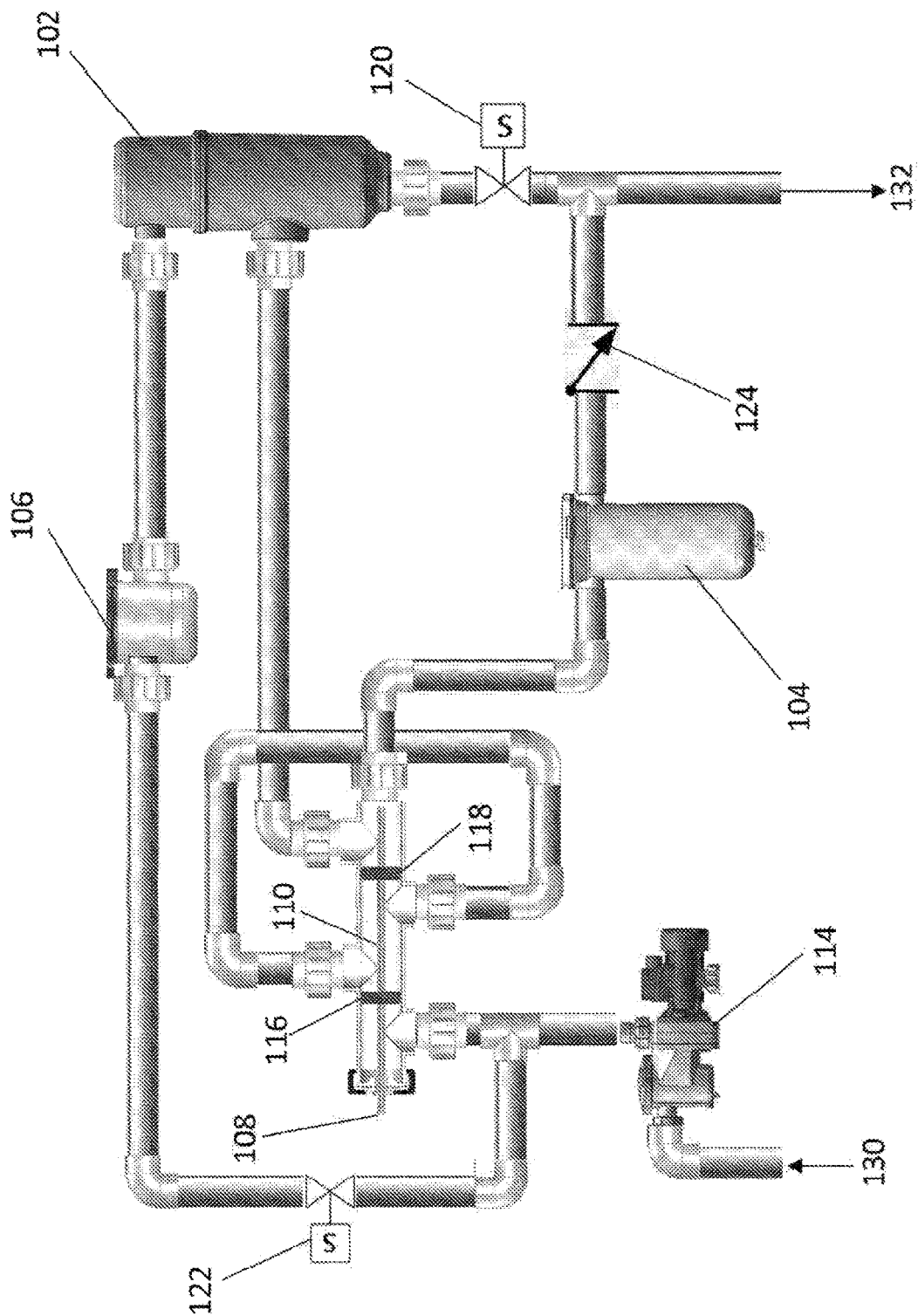
FIG. 4 is a schematic flow diagram for the filter system operating in the backwash cycle according to one embodiment of the invention.
Figure 5:
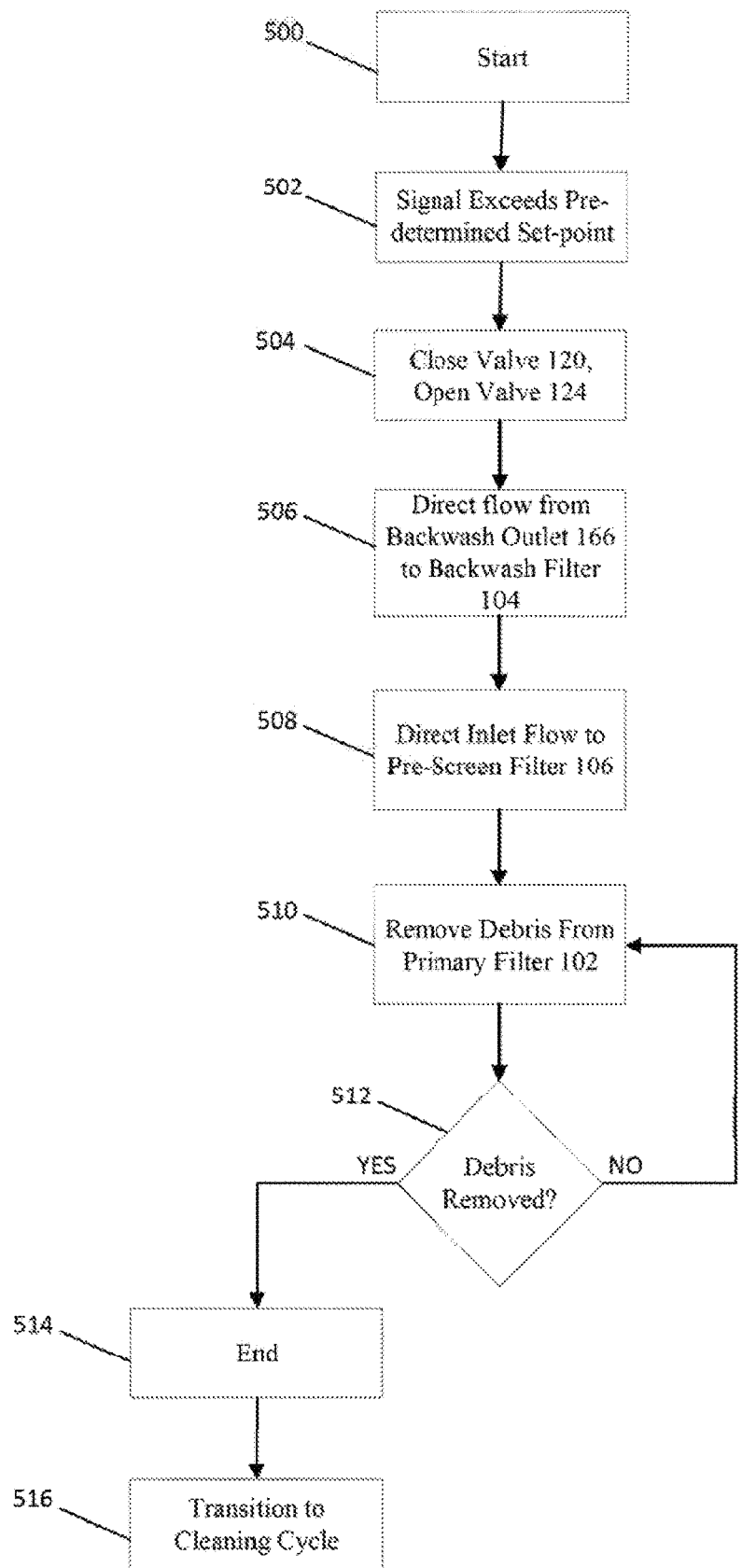
FIG. 5 is a method flow diagram for the filter system transitioning from the cleaning cycle to the backwash cycle according to one embodiment of the invention.

FIG. 4 illustrates the filter system 100 operating in the backwash cycle, and FIG. 5 illustrates a method of transitioning from the cleaning cycle to the backwash cycle.

The backwash cycle is triggered at step 500 when the signal meets, exceeds, or drops below the pre-determined set-point at step 502. The controller 115 then closes the first filtrate valve 120, opens the second filtrate valve 124, alters the first feed line valve to direct the inlet fluid mixture flow to the pre-screen filter, and alters the second feed line valve 110 to direct fluid flow from the backwash outlet 166 of the primary filter 102 to the backwash filter 104, as indicated by steps 504-508. As illustrated in FIG. 1, steps 504-508 include retracting the push-pull valve 110 using the linear actuator 108, opening valves 122 and 124, and closing valve 120. Although these steps are listed sequentially, the controller 115 can execute steps 504-508 simultaneously. Debris is removed from the inlet fluid mixture prior to entering a backwash inlet 162 of the primary filter 102 by passing the inlet fluid mixture through the pre-screen filter 106. The pre-screen filter 106 is useful in preventing debris from clogging the clean side of the primary filter 102. After entering the backwash inlet 162, the fluid then flows through the primary filter 102 in the reverse direction of the cleaning cycle at step 510 to remove entrained debris from the filter. The fluid containing debris then exits the primary filter 102 through the backwash outlet 166 and is directed towards the backwash filter 104. The filtered fluid exits the filter system 100 through the fluid outlet stream 132. The backwash cycle continues until substantially all the debris has been removed from the primary filter 102 at step 512. After the debris is removed, the backwash cycle is completed at step 514 and the filter system 100 begins to transition to the cleaning cycle at step 516.

In one embodiment, the duration of the backwash timer can be entered manually into the controller 115, or the duration can be programmed automatically. In one embodiment, the backwash cycle continues for a duration between 1 second to 10 minutes. In some embodiments, the backwash cycle continues for a duration between 8 seconds to 20 seconds. In other embodiments, the backwash cycle continues for a duration between 1 minute to 5 minutes. Alternatively, the sensor 107 may also be used to identify when to transition from the backwash cycle to the cleaning cycle, for example, by measuring the signals from the sensors and transitioning between cycles once a pre-determined set-point has been met.

Figure 6:
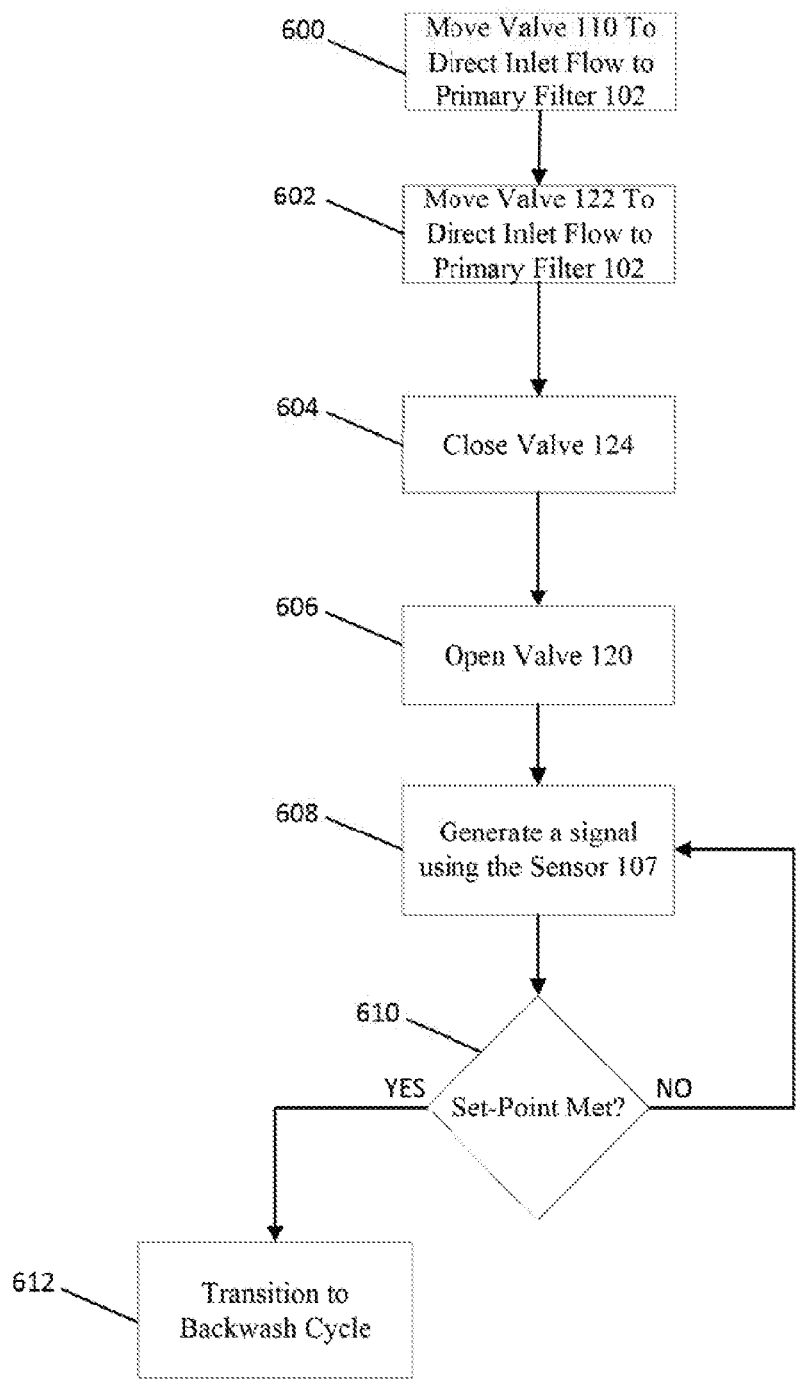
FIG. 6 is a method flow diagram for the filter system transitioning from the backwash cycle to the cleaning cycle according to one embodiment of the invention.

FIG. 6 illustrates a method of transitioning the filter system 100 from the backwash cycle to the cleaning cycle. Once the backwash timer has expired or a pre-determined set-point has been met, the second feed line 110 moves to direct the inlet fluid flow towards the cleaning inlet 167 of the primary filter 102, the first feed line valve 110 moves to direct the inlet fluid flow towards the cleaning inlet 167 of the primary filter, the first filtrate valve 120 opens, and the second filtrate valve 124 closes, as indicated by steps 600-606, respectively. As illustrated in FIG. 1, steps 600-606 include extending the linear actuator 108 to extend the push-pull valve 110, closing valve 122, closing valve 124, and opening valve 120. Although these steps are listed sequentially, the controller can execute steps 600-606 simultaneously. The filter system 100 will continue to operate in the cleaning cycle until the pre-determined set-point is met, as illustrated in steps 608-610. The system will then transition into the backwash cycle at step 612.

Figure 7:
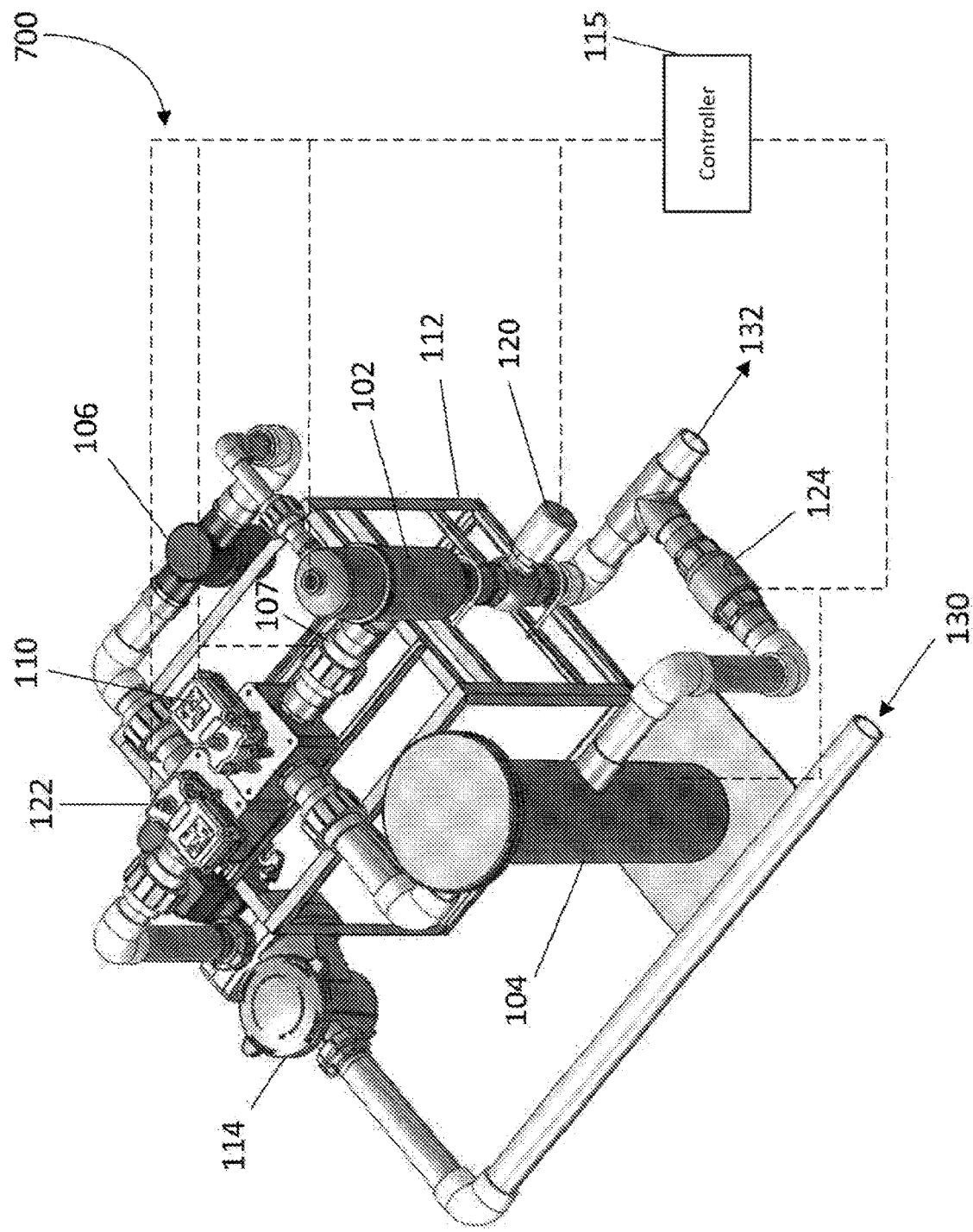
FIG. 7 is a filter system according to one embodiment of the invention.

FIG. 7 illustrates a filter system 700 according to one embodiment of the invention. Similar to the embodiment shown in FIG. 1, the filter system 700 includes a primary filter 102, a backwash filter 104, a pre-screen filter 106, at least one sensor 107, and a pump 114 in fluid communication with a fluid inlet stream 130 and a fluid outlet stream 132 of the system. A frame 112 is also provided to support the components of the filter system 700. The system 700 further includes a first feed line valve 122, a second feed line valve 110, a first filtrate valve 120, and a second filtrate valve 124 that are configured to control the flow of the system 700. In one embodiment, a controller 115 is in electrical communication with the control valves of the system to direct the flow of fluid between two operational sequences: a cleaning cycle and a backwash cycle. The controller 115 is further in electrical communication with the sensor 107, the backwash filter 104, the primary filter 102, and the pump 114.

Figure 9:
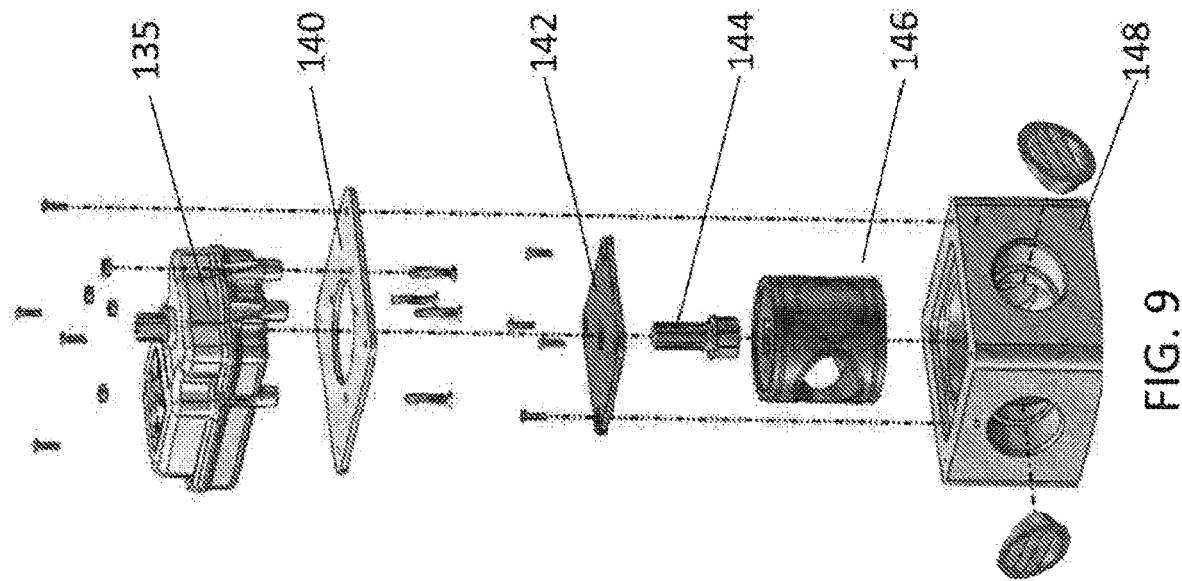
FIG. 9 is an exploded view of a diverter valve according to one embodiment of the invention.
Figure 8:
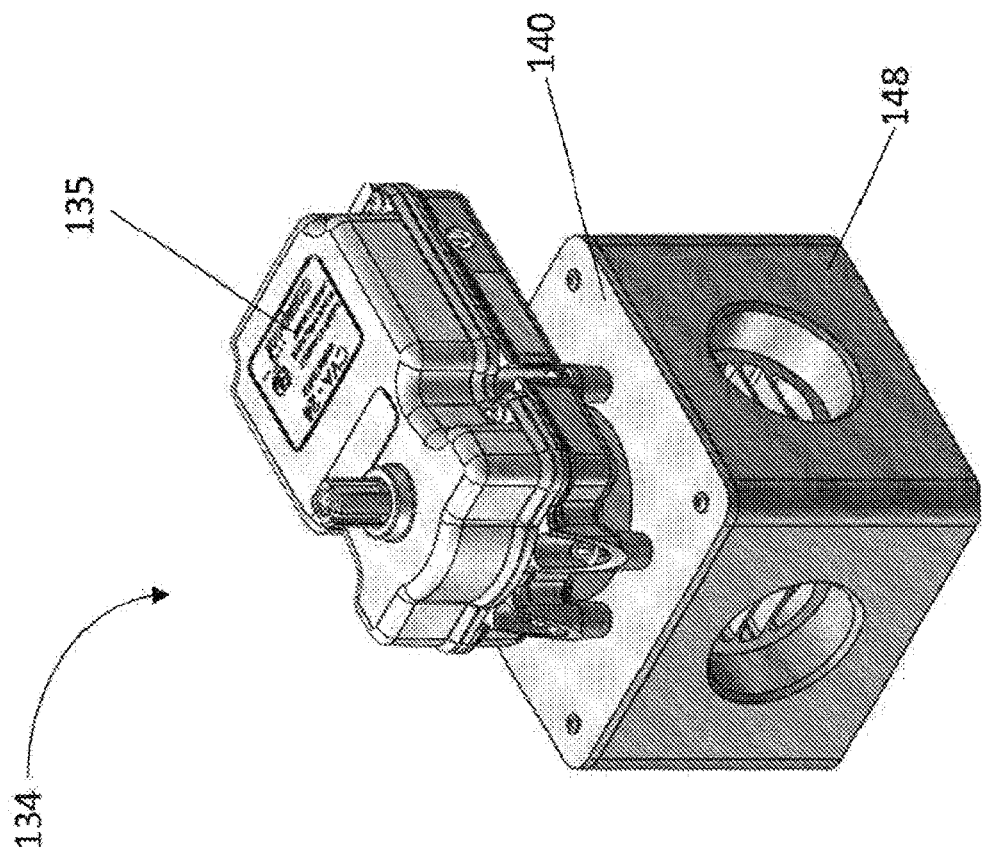
FIG. 8 is a diverter valve used in the filter system according to one embodiment of the invention.

In one embodiment, the first filtrate valve 122 is a first diverter valve and the second filtrate valve 110 is a second diverter valve. FIGS. 8-9 illustrate one embodiment of the diverter valve 134 used in the filter system 700. The first diverter 134 includes a rotary actuator 135, an actuator holder plate 140, a top cover 142, a link 144, a flow diverter 146, and a valve body 148. The link 144 longitudinally extends between the rotary actuator 135 and flow diverter 146. The link 144 includes teeth that engage with receiving slots in the rotary actuator 135 and the flow diverter 146, which allows the rotary actuator 135 to rotate the link 144 and flow diverter 146. In one embodiment, the flow diverter 146 is a three way T-port with three cylindrical hallow passageways. The rotary actuator 135 rotates the flow diverter 146 inside the valve body 148 to control the flow path of the fluid within the filter system 700.

Figure 10:
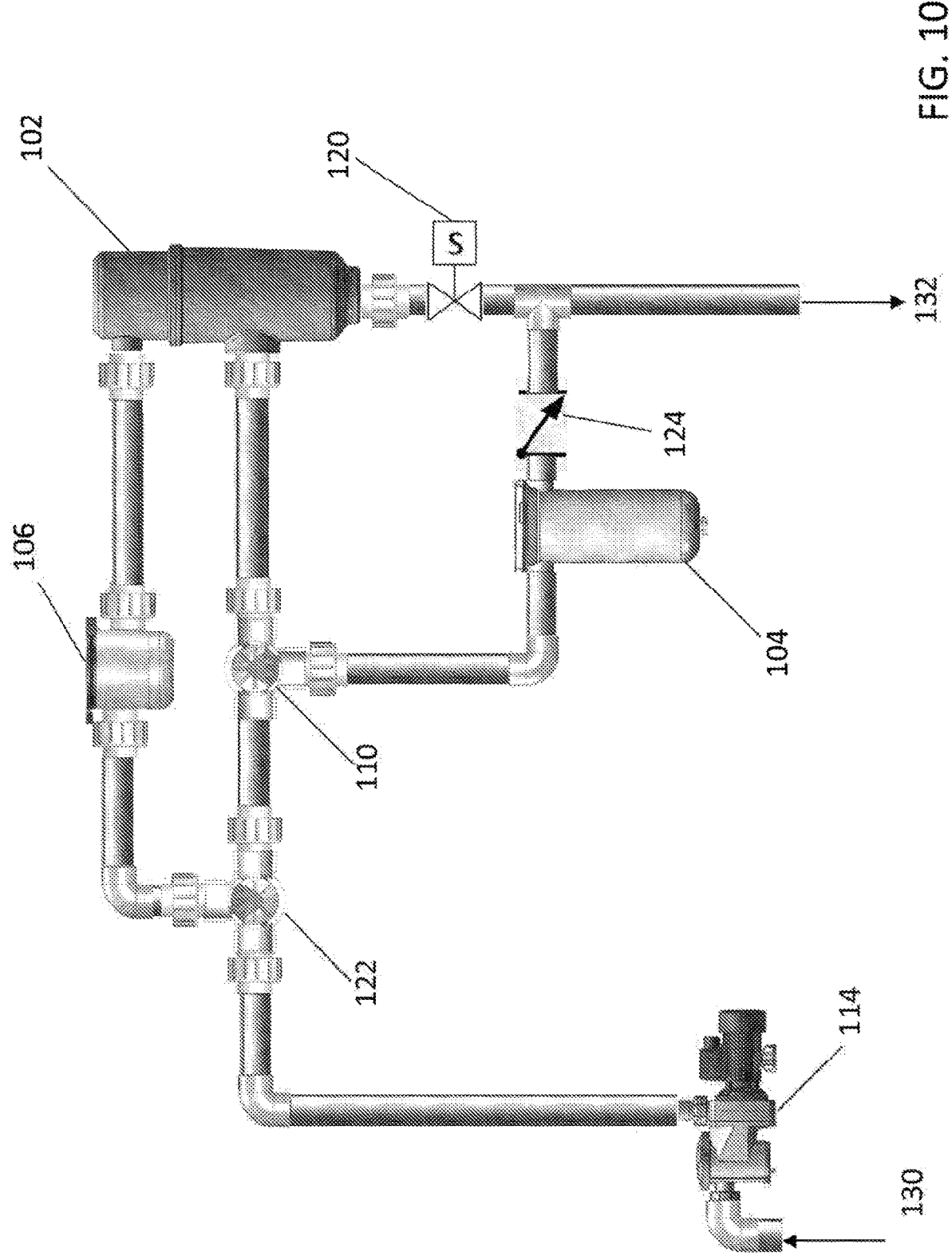
FIG. 10 is a schematic flow diagram of the fluid system operating in the cleaning cycle according to one embodiment of the invention.

FIG. 10 illustrates the filter system 700 operating in the cleaning cycle. To initiate the cleaning cycle, the controller 115 closes valve 124, opens valve 120, and rotates the first and second diverter valves 134 and 136 to direct the flow towards the primary filter 102. Fluid containing debris is pumped into the system through the fluid stream inlet 130, filtered using the primary filter 102, and is returned to the fluid source through the fluid outlet stream 132. The cleaning cycle continues until the inlet pressure of the primary filter 102 exceeds the set-point, as described above.

The filter system 700 transitions from the cleaning cycle to the backwash cycle by having the controller 115 open the valve 124, close the valve 120, and rotate the first and second diverter valves 134 and 136 to direct the fluid containing debris towards the pre-screen filter 106 and the backwash filter 104, respectively.

Figure 11:
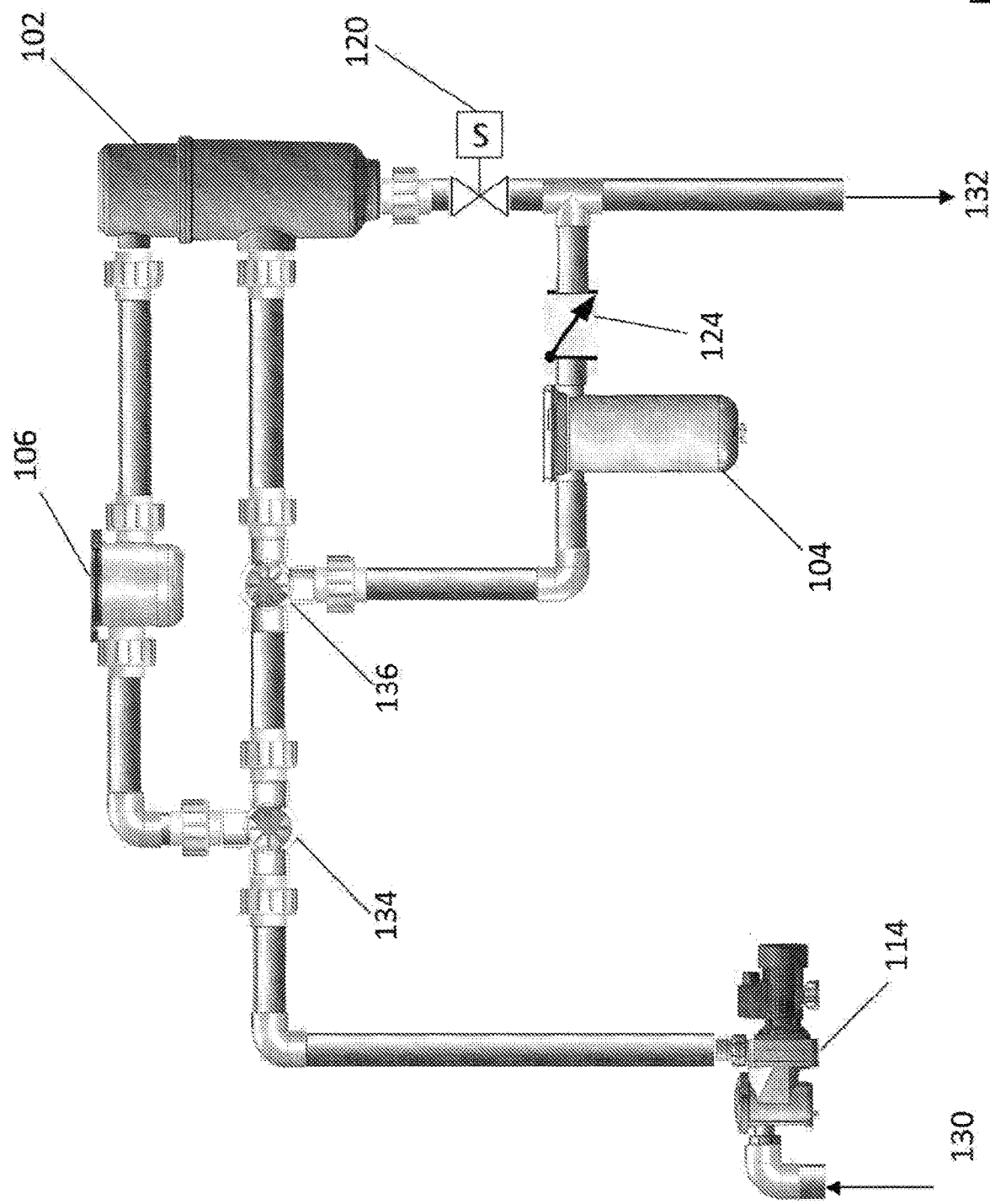
FIG. 11 is the filter system operating in the backwash cycle according to one embodiment of the invention.

FIG. 11 shows the filter system 700 operating in the backwash cycle. During the backwash cycle, fluid containing debris is directed towards the first diverter valve 134 and diverted to the pre-screen filter 106. Debris is removed from the fluid stream and continues to flow towards the backwash inlet 162 of the primary filter 102. The cleaned fluid stream then flows through the primary filter 102 in the reverse direction to remove entrained debris from the primary filter 102. Fluid containing debris then exits the primary filter 102 through the backwash outlet 166. The fluid containing debris is then filtered using the backwash filter 104 and exits the system through the fluid outlet stream 132.

Figure 12:
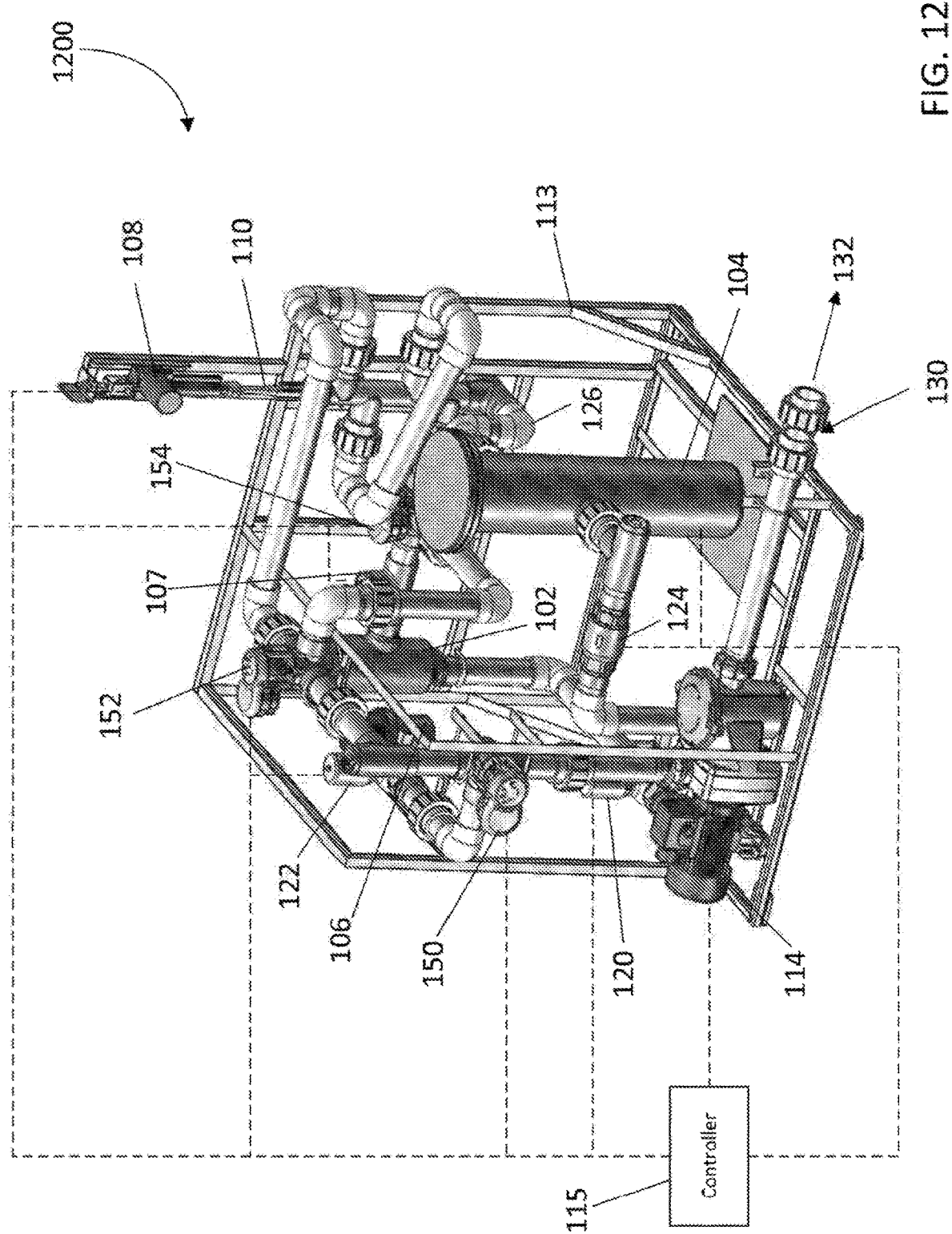
FIG. 12 is a filter system according to one embodiment of the invention.

FIG. 12 shows a filter system 1200 according to another embodiment of the invention similar to the embodiment of FIG. 1. The filter system 1200 includes a primary filter 102, a backwash filter 104, a pre-screen filter 106, at least one sensor 107, and a pump 114 in fluid communication with a fluid inlet stream 130, and a fluid outlet stream 132. The system 1200 also includes a plurality of valves. In some embodiments, the filter system 1200 includes a first feed line valve 122, a second feed line valve 110, a first filtrate valve 120, and a second filtrate valve 124, as described above. Additionally, the filter system 1200 includes a diverter valve 150, a second diverter valve 152, a third diverter valve 154, and a third filtrate valve 126. The additional valves offer the benefit of improved process control and flexibility. The diverter valves 150-154 are the same or substantially similar to the diverter valves disclosed in FIGS. 8-9. A frame 112 is also provided to support the components of the filter system 1200. A controller 115 is in electrical communication with the control valves of the system to direct the flow of fluid between two operational sequences: a cleaning cycle and a backwash cycle. The controller 115 is further in electrical communication with the primary filter 102, the backwash filter 104, the sensor 107, the pump 114, and the actuator 108.

Startup of Cleaning Cycle

Figure 13:
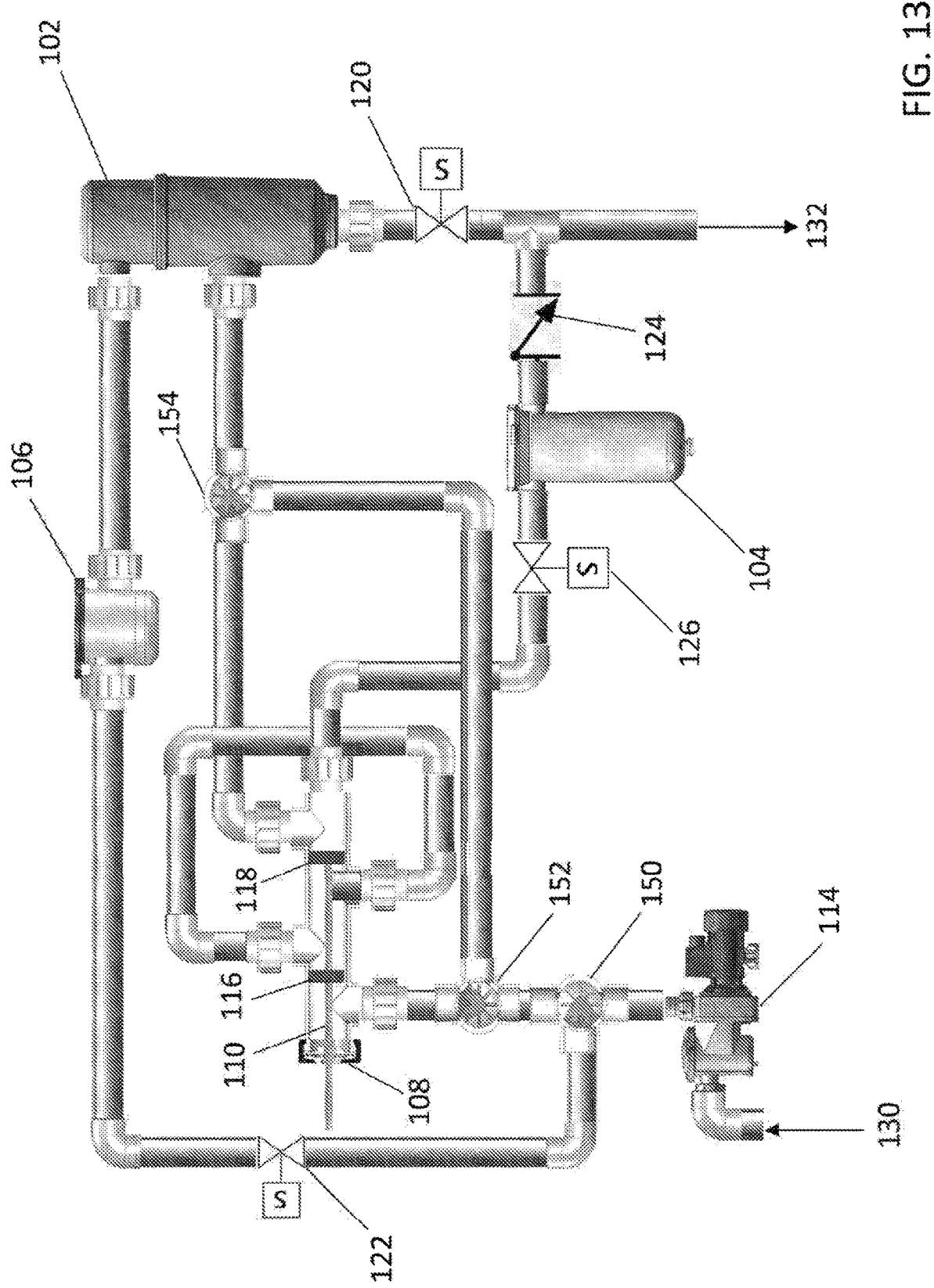
FIG. 13 is a schematic flow diagram of the fluid system operating in the cleaning cycle according to one embodiment of the invention.

FIG. 13 illustrates the fluid system 1200 operating in the cleaning cycle. To initiate the cleaning cycle, the controller 115 opens the first filtrate valve 120, extends the push-pull valve 110 using the linear actuator 108, and closes the first feed line valve 122, closes second filtrate valve 124, and the third filtrate valve 126. The controller 115 also rotates the first diverter valve 150, the second diverter valve 152, and third diverter valve 154 to direct the flow towards the primary filter 102. Fluid containing debris is pumped into the system through the fluid stream inlet 130, filtered using the primary filter 102, and is returned to the pool through the fluid outlet stream 132. The cleaning cycle continues until the inlet pressure of the primary filter 102 meets or exceeds the pre-determined set-point.

Transition and Backwash Cycle

The filter system 1200 transitions from the cleaning cycle to the backwash cycle by opening the second filtrate valve 124 and the third filtrate valve 126. Next, the first filtrate valve 120 is closed, and the first diverter valve 150 is rotated to direct the fluid flow towards the first feed line valve 122. The second diverter valve 154 is also rotated to direct the flow towards the second feed line valve 110.

Figure 14:
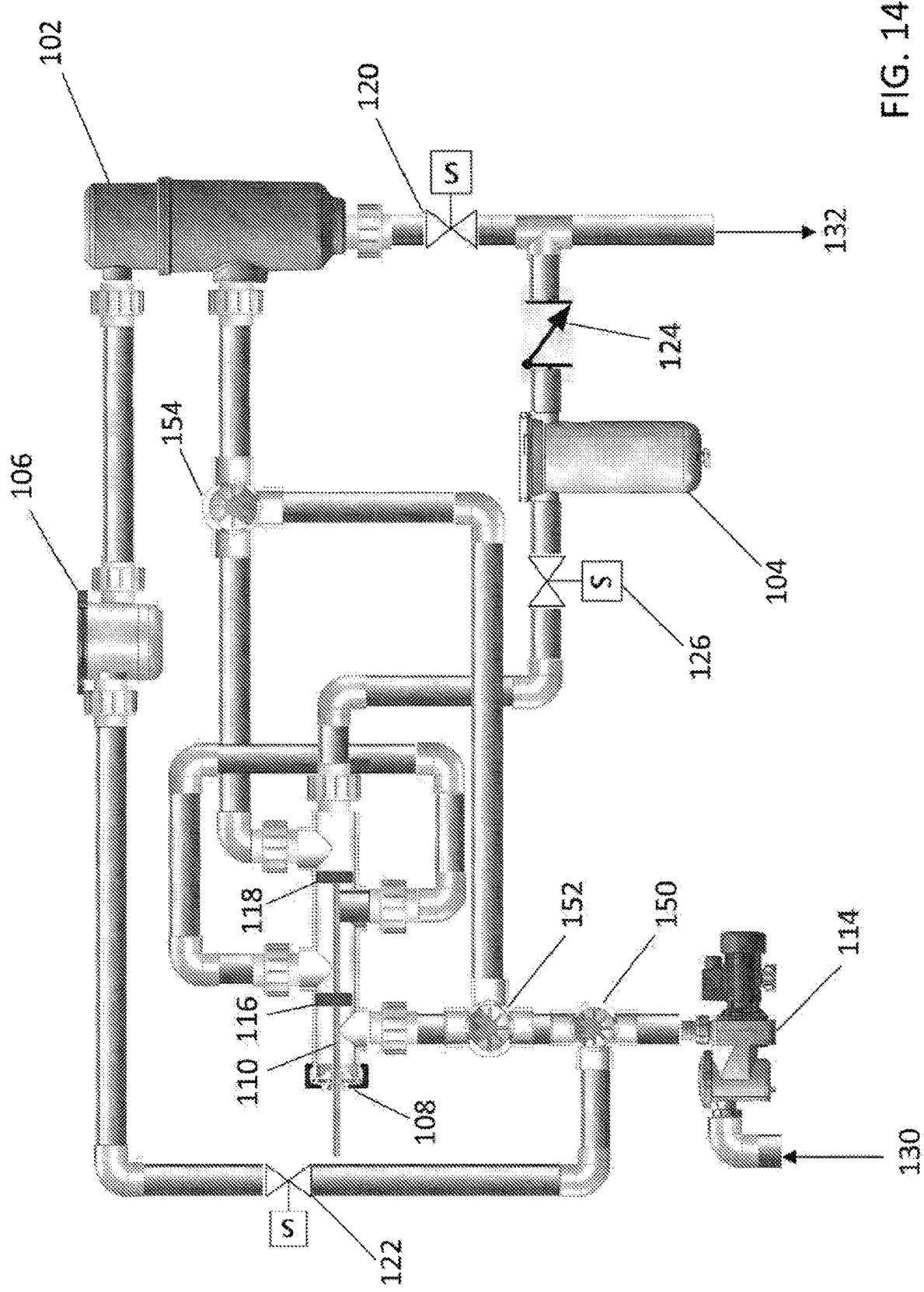
FIG. 14 is the filter system operating in the backwash cycle according to one embodiment of the invention

FIG. 14 shows the filter system 1200 operating in the backwash cycle. During the backwash cycle, fluid containing debris is directed towards the first diverter valve 150 and diverted to the pre-screen filter 106. Debris is removed from the fluid stream and continues to flow towards the backwash inlet 162 of the primary filter 102. The cleaned fluid stream then flows through the primary filter 102 in the reverse direction to remove entrained debris from the primary filter 102. Fluid containing debris then exits the primary filter 102 through the backwash outlet 166. The fluid containing debris is then filtered using the backwash filter 104 and exits the system through the fluid outlet stream 132.

Alternative Cleaning Cycle

Figure 15:
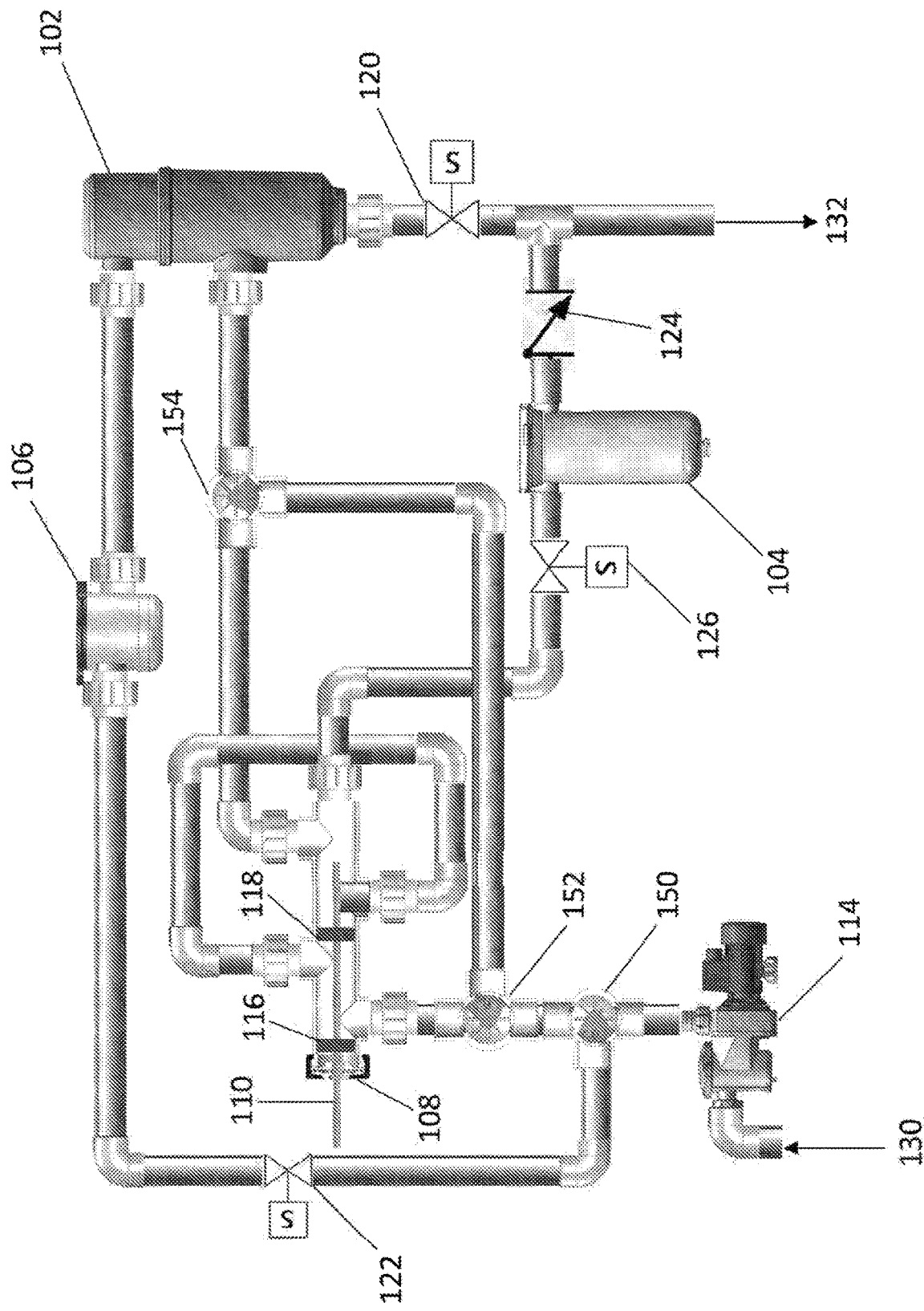
FIG. 15 is the fluid system operating in the cleaning cycle according to another embodiment of the invention.

FIG. 15 shows the fluid system 1200 operating in the cleaning cycle. The controller 115 initiates the cleaning cycle by rotating the first and second diverter valves 150 and 152 so that the fluid flow is directed towards the second feed line valve 110 during the start-up process. The controller 115 then alters the second feed line valve 110 to direct fluid to the inlet of the primary filter 102, for example by retracting the push-pull actuator 108. Fluid containing debris is pumped into the system through the fluid stream inlet 130, filtered using the primary filter 102, and is returned to the fluid source through the fluid outlet stream 132. The cleaning cycle continues until the inlet pressure of the primary filter 102 meets or exceeds the pressure set-point.

Transition and Backwash

In some embodiments, the filter system 1200 transitions from the cleaning cycle to the backwash cycle by opening the second filtrate valve 124 and the third filtrate valve 126. Next, the first filtrate valve 120 is closed, and the first diverter valve 150 is rotated to direct the fluid flow towards the first feed line valve 122.

Figure 16:
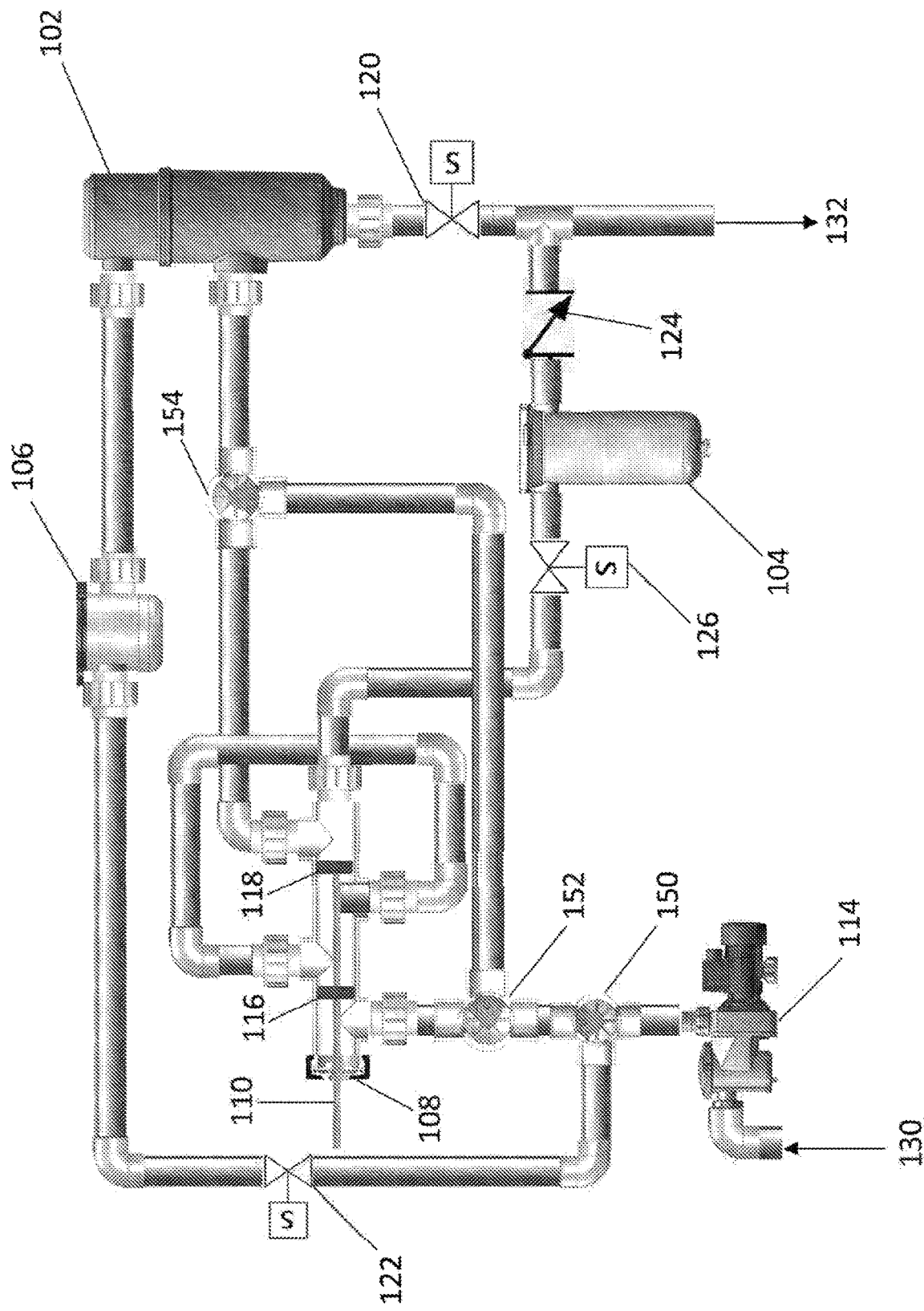
FIG. 16 is the filter system transitioning from the cleaning cycle to the backwash cycle according to one embodiment of the invention

FIG. 16 shows the filter system 1200 operating in the backwash cycle. During the backwash cycle, fluid containing debris is directed towards the first diverter valve 150 and diverted to the pre-screen filter 106. Debris is removed from the fluid stream and continues to flow towards the backwash inlet 162 of the primary filter 102. The cleaned fluid stream then flows through the primary filter 102 in the reverse direction to remove entrained debris from the primary filter 102. Fluid containing debris then exits the primary filter 102 through the backwash outlet 166. The fluid containing debris is then filtered using the backwash filter 104 and exits the system through the fluid outlet stream 132.

Primary Filter

Figure 17:
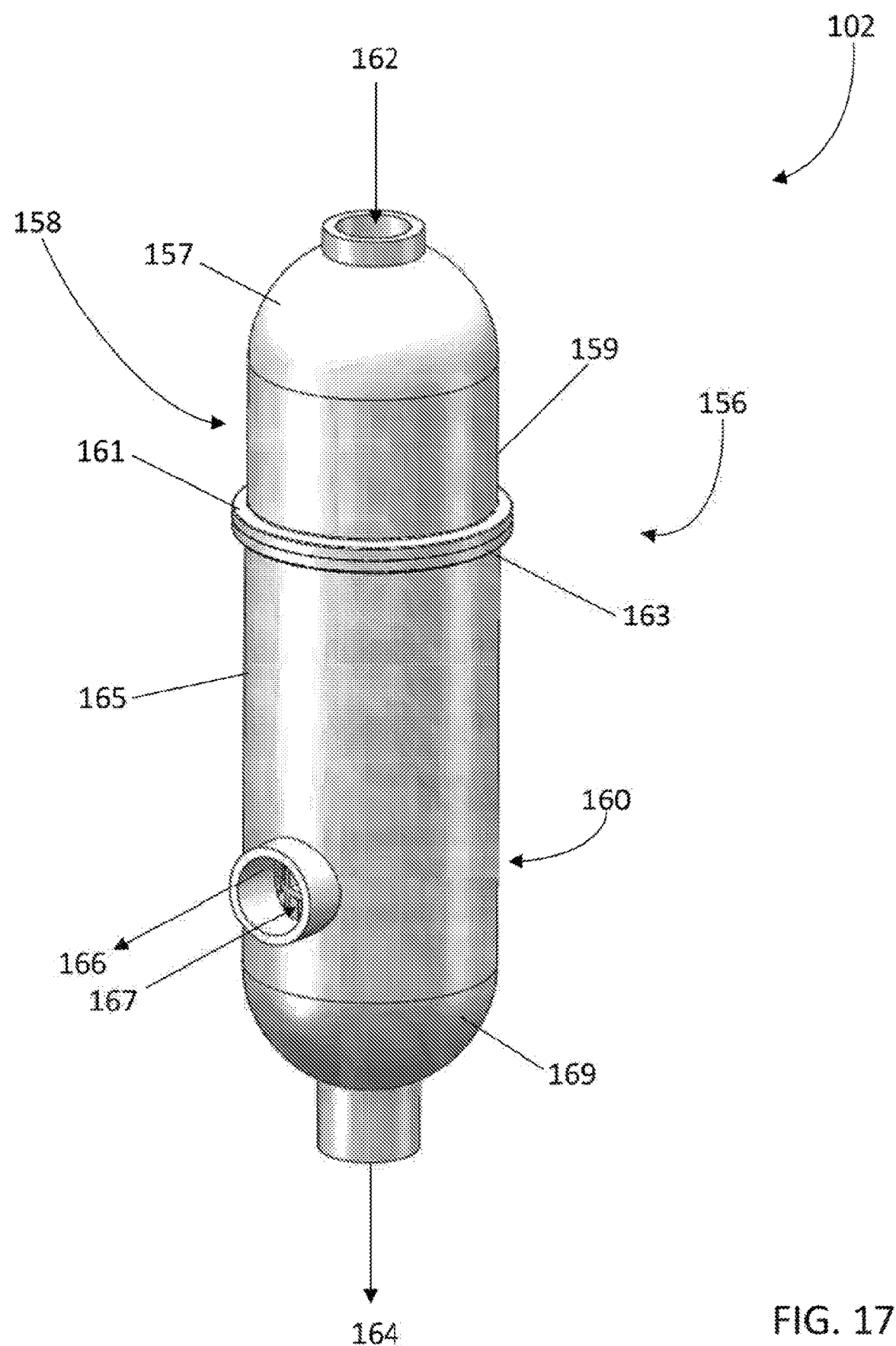
FIG. 17 is a perspective view of a primary filter according to one embodiment of the invention.

FIG. 17 shows the primary filter 102 according to one embodiment of the invention. As mentioned above, the primary filter 102 and the cleaning cycle are useful in removing debris from an inlet fluid stream. Frequently removing debris from the primary filter 102 allows for the fluid system 100 to operate at an average pressure that is lower than convention filters. Operating consistently at a lower average pressure reduces the total energy required to operate the system, and can lead to substantial energy savings over time.

The primary filter 102 includes a housing 156 having a cleaning inlet 167, a cleaning outlet 164, a backwash inlet 162, and a backwash outlet 164. In some embodiments, the housing 156 includes a filter tank top 158 and a filter tank bottom 160. The filter tank top 158 includes an upper spherical portion 157 configured to mate with the top face of a cylindrical body 159 that extends longitudinally to a bottom radial flange 161. The filter tank bottom 160 includes a top radial flange 163 and a lower cylindrical body 165 that extends longitudinally to a lower spherical portion 169. The bottom radial flange 161 and the top radial flange 163 are coupled together so that a liquid-tight seal is formed. The filter tank top 158 includes a backwash inlet 162 that is in fluid communication with the backwash outlet 166 on the lower cylindrical body 165. The lower cylindrical body 165 is configured with a cleaning inlet 167 that is in fluid communication with the cleaning outlet 164 on the lower spherical portion 169.

Figure 18:
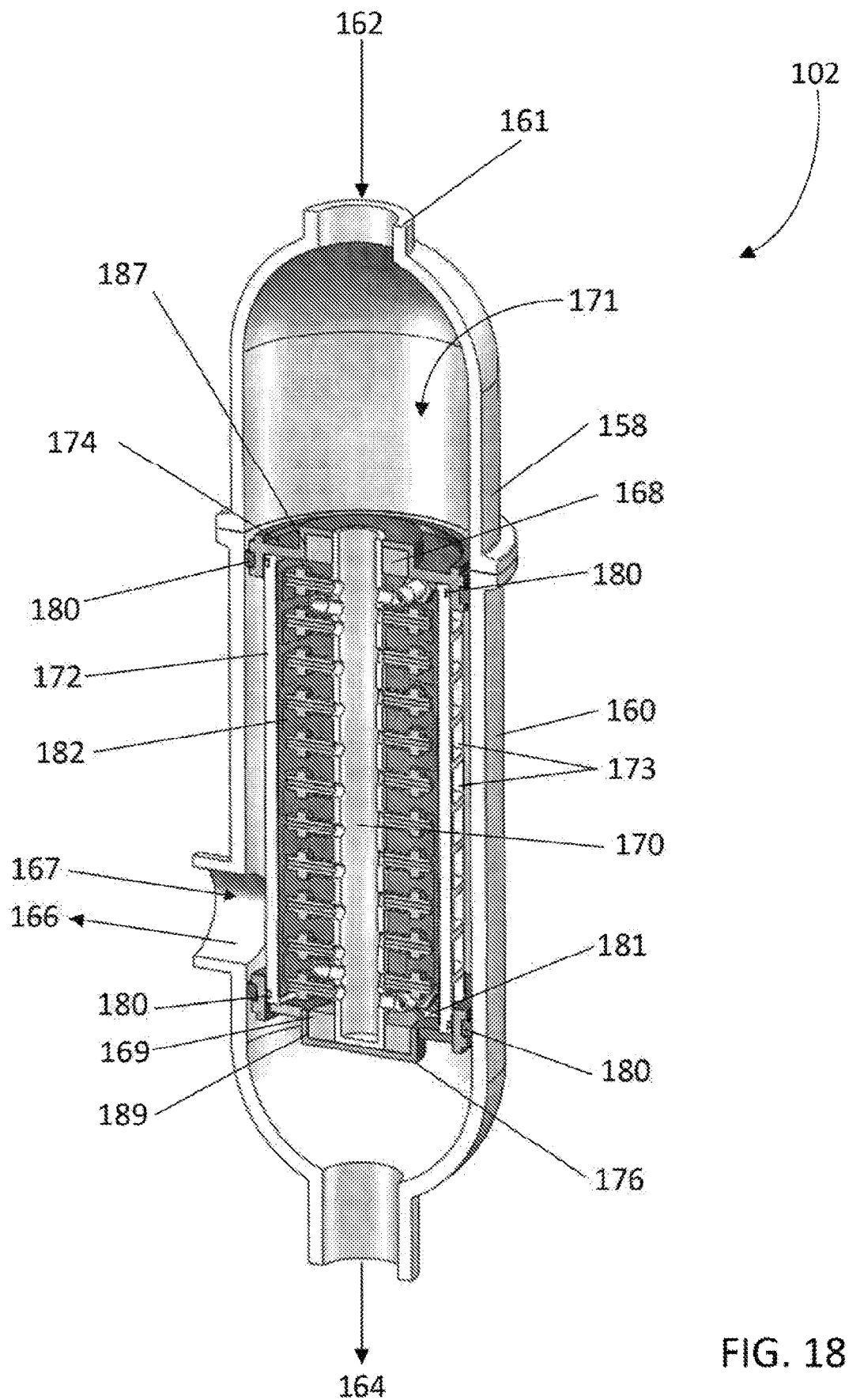
FIG. 18 is a cross-sectional view of the primary filter according to one embodiment of the invention.

As shown in FIG. 18, the primary filter 102 also includes a cartridge support 172 that is coaxially disposed within an internal chamber 171 of the primary filter 102. The cartridge support 172 extends longitudinally between a cartridge top cover 174 and a cartridge bottom cover 176. The outer surface of the cartridge support 172 includes wells 173 that extend through the cartridge support 172 to place the outer surface of the cartridge support 172 in fluid communication with a filter media 182. In some embodiments, the filter media 182 is configured to the inner surface of the cartridge support 172. The filter media 182 may include a mesh screen filter. The filter media 182 divides internal chamber 171 of the primary filter 102 between a filtrate side coupled to the cleaning outlet 164, and an inlet side that is coupled to the cleaning inlet 167. The filter media 182 may include pores between 5 and 100 microns. In some embodiments, the area of the filter media 182 may be between 1 in.sup.2 to 1000 in.sup.2, although the area of the filter media 182 depends on the intended application and can be greater or less than this embodiment.

The cartridge top cover 174 is configured on top of the cartridge support 172. The cartridge top cover 174 includes a first cylindrical recess 187 that is configured to receive the backwash jet assembly 170 and a first bearing 168. The backwash jet assembly 170 may be configured concentrically inside of the first bearing 168. The first bearing 168 assists in the rotation of the backwash jet assembly 170 within the primary filter 102. The top cover 174 further includes a fluid inlet port 161 to place the backwash inlet 162 in fluid communication with the backwash jet assembly 170.

The cartridge bottom cover 176 is configured on the bottom of the cartridge support 172. The cartridge bottom cover 176 includes a second cylindrical recess 189 that is configured to receive the backwash jet assembly 170 and a second bearing 169. Similar to above, the backwash jet assembly 170 may be configured concentrically inside of the second bearing 169. The second bearing 169 assists in the rotation of the backwash jet assembly 170 within the primary filter 102. The cartridge bottom cover 176 further includes at least one fluid exit port 181 to allow fluid to exit during the cleaning cycle. The primary filter 102 may also include several gaskets 180 to form liquid-tight seals between the various components within the primary filter.

FIGS. 19-20 show the backwash jet assembly 170 according to one embodiment of the invention. The backwash jet assembly 170 includes several radial nozzles 184 and perpendicular nozzles 186 in fluid communication with a conduit 179 that extends the length between the cartridge top cover 174 and the cartridge bottom cover 176. The top of the conduit 179 includes a fluid inlet port 193, while the bottom of the conduit 179 is closed to force the flow of fluid through the radial nozzles 184 and the perpendicular nozzles.

Operation of the Primary Filter-Cleaning and Backwash

Referring to FIGS. 18-20, during the cleaning cycle fluid containing debris enters the primary filter 102 in the cleaning inlet 167. Fluid containing debris is filtered by passing through the filter media 182. The clean fluid then passes through the at least one fluid exit port 181 in the cartridge bottom cover 176 and exits the primary filter 102 through the cleaning exit 164. In some embodiments, the flow rate during the cleaning cycle is between 5 and 150 gallons per minute (gpm).

During the backwash cycle, fluid enters the primary filter 102 through the backwash inlet 162 and is directed to the backwash jet assembly 170. Fluid exits the backwash jet assembly 170 through the radial nozzles 184 and the perpendicular nozzles 186. The normal force generated from the fluid exiting the perpendicular nozzles 186 causes the backwash jet assembly 170 to rotate within the cartridge support 172. The rotation of the backwash jet assembly 170 increases the fluid contact with the filter media 182 and increases the efficiency at which debris is removed from the filter. The fluid containing debris then exits the primary filter 102 through the backwash outlet 166. In some embodiments, the velocity of fluid flowing through the nozzles can range from 500 to 1500 inches per second (in/s).

Other Embodiments

FIGS. 21-22 show a backwash jet assembly 2170 according to another embodiment of the invention. The backwash jet assembly 2170 includes a housing 2180 that includes a several radial nozzles 2184 and perpendicular nozzles 2186 in fluid communication with a conduit 2179. The conduit 2179 is configured to extend the length between the cartridge top cover 174 and the cartridge bottom cover 176. The top of the conduit 2179 includes a fluid inlet port 2191, while the bottom of the conduit 2179 is closed to force fluid flow through the radial nozzles 2184 and the perpendicular nozzles 2186. In some embodiments, the housing is produced by stamping a metallic material, and assembled using multiple parts. In other embodiments, the housing is produced using a single metallic piece.

FIGS. 23-24 show a backwash jet assembly 2370 according to another embodiment of the invention. The backwash jet assembly 2370 includes one or more nozzles 2388 in fluid communication with a conduit 2379 that extends the length between the cartridge top cover 174 and the cartridge bottom cover 176. As shown in FIG. 24, an angle, a, can be defined between a reference plane a-a and a reference plane b-b. In some embodiments, a ranges from 5 to 90 degrees. In other embodiments, a ranges from 45 to 70 degrees. The top of the conduit 2379 includes a fluid inlet port 2391, while the bottom of the conduit 2379 is closed to force fluid flow through the one or more nozzles 2388.

Figure 25:
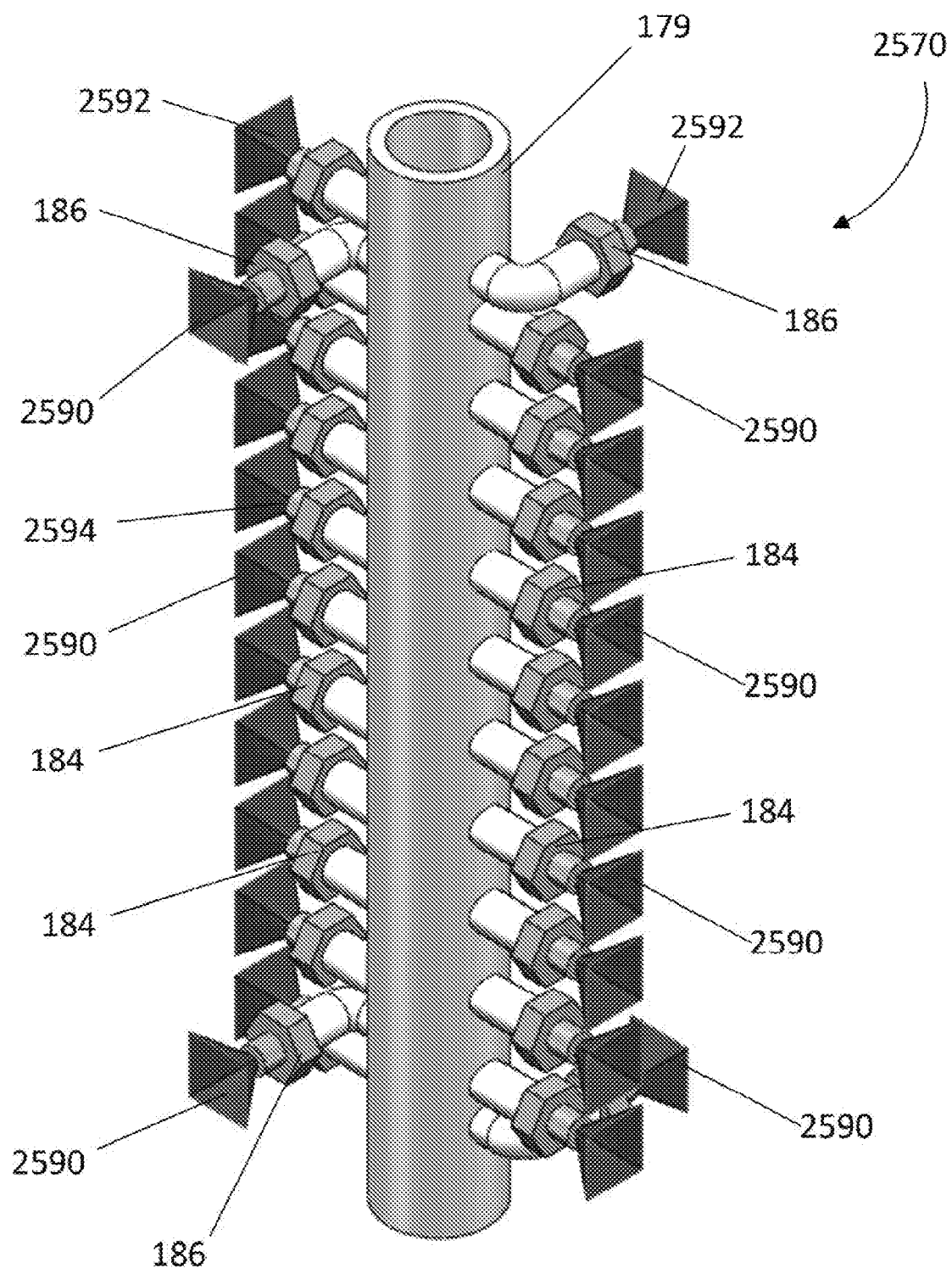
FIG. 25 is a perspective view of a backwash jet assembly according to one embodiment of the invention.

FIG. 25 shows a backwash jet assembly 2570 according to another embodiment of the invention. The backwash jet assembly 2570 has a similar configuration and components as disclosed in FIG. 19, but includes nozzle attachments 2590 as additional components. The nozzle attachments 2590 include outer triangular surfaces 2592 that converge to a single point 2594 at the fluid outlet, making the shape roughly of a pyramid. In other embodiments, the outer triangular surfaces 2592 can be rectangular, curved, or bent. The nozzle attachments 2590 focus the fluid spray from the radial nozzles 184 and perpendicular nozzles 186 toward the filter media 182, and increase the efficiency of removing debris during the backwash cycle. The nozzle attachments 2590 can also be used on any of the other backwash jet assemblies disclosed herein.

Primary Filter with Internal Cartridge Support

Figure 26:
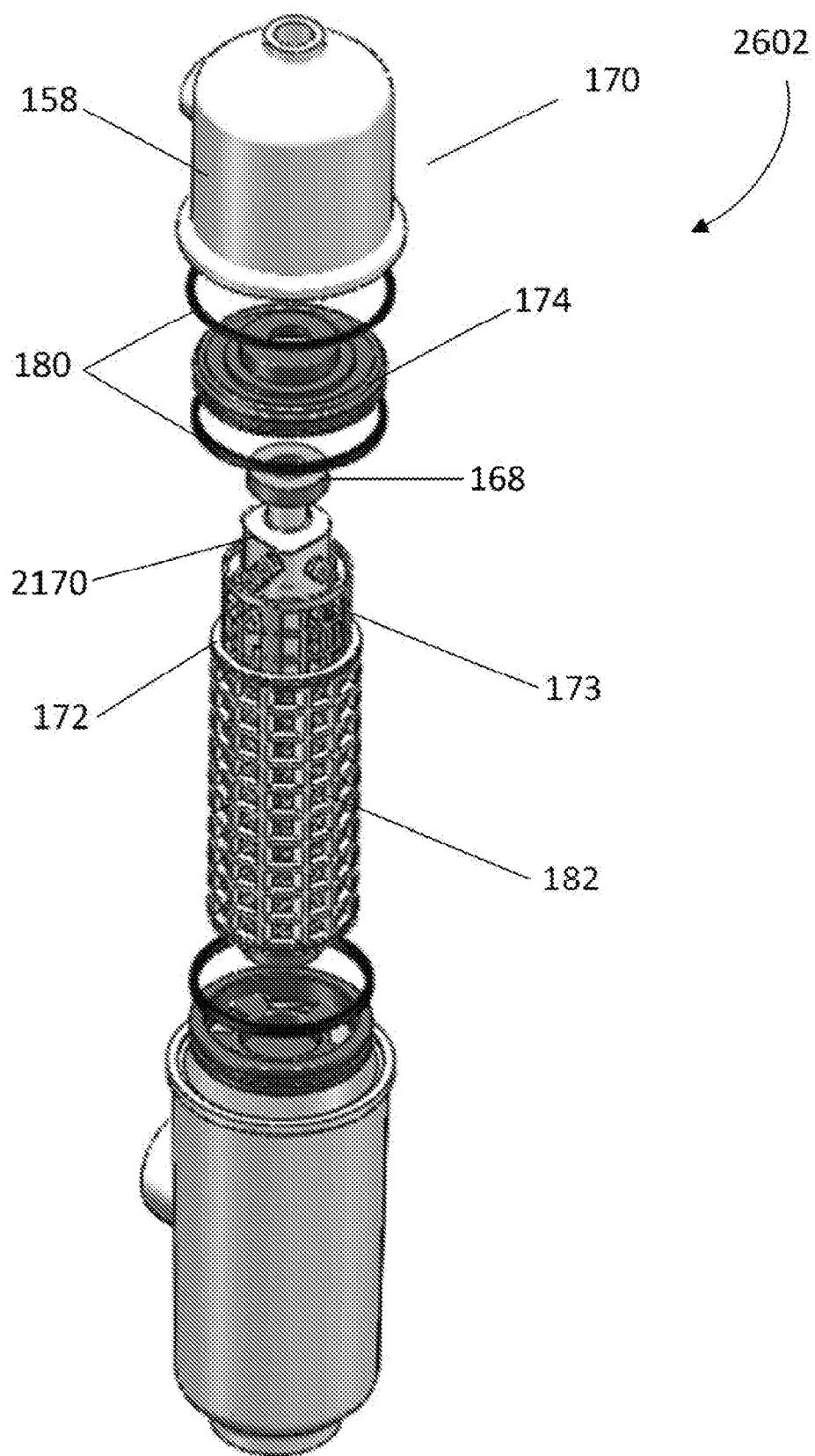
FIG. 26 is an exploded view of a primary filter according to one embodiment of the invention.

FIG. 26 shows a primary filter 2602 according to one embodiment of the invention. In this embodiment, the primary filter 2602 includes similar parts as disclosed in FIG. 18, and further includes an internal cartridge support 173 configured between the filter media 182 and the backwash jet assembly 2170. The internal cartridge support 173 is useful in supporting the filter media 182 during high flow operation.

Figure 27:
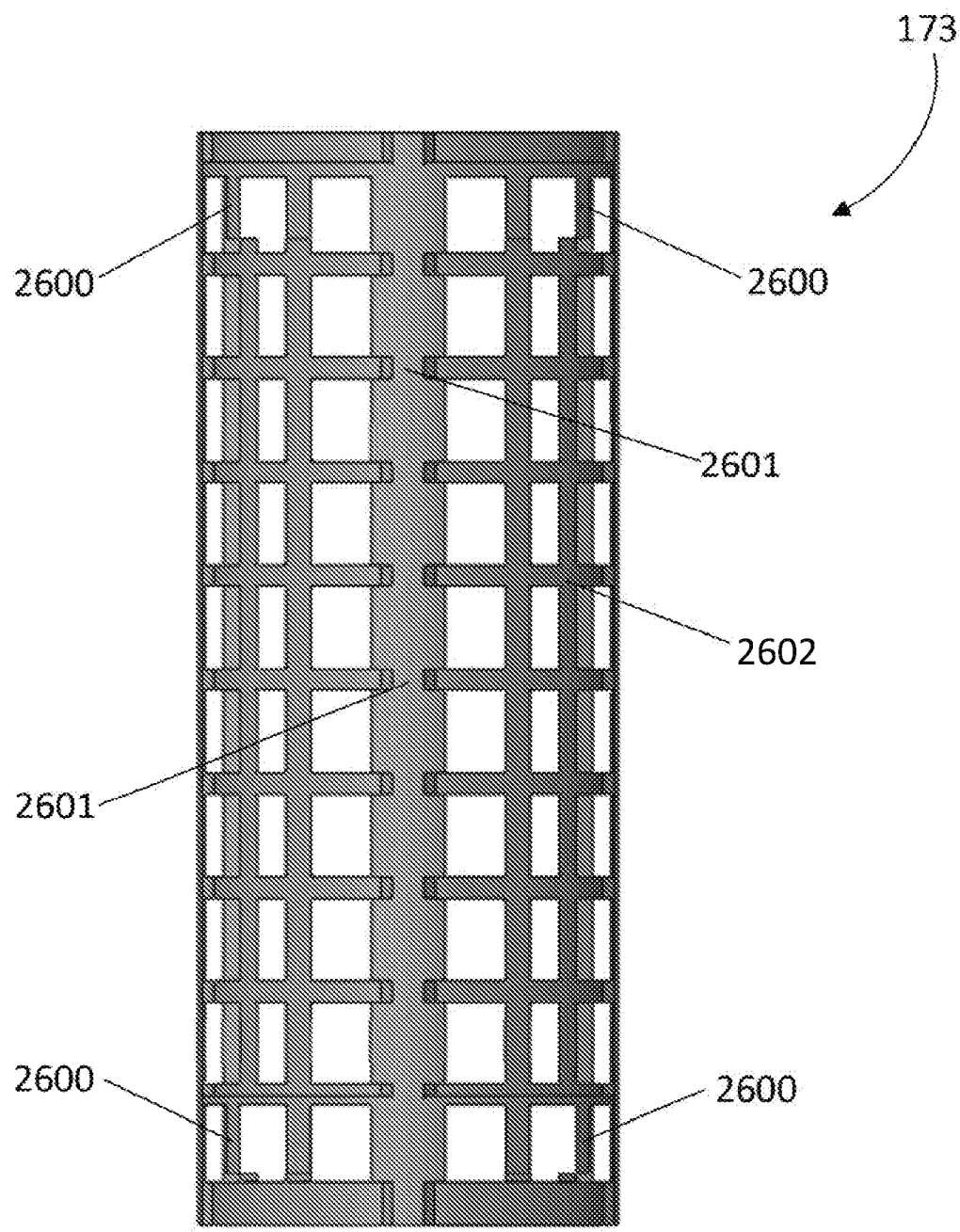
FIG. 27 is a perspective view of the internal cartridge support according to one embodiment of the invention.

As shown in FIG. 27, the internal cartridge support 173 includes a revolve cut 2600 at the top and bottom of a cylinder 2602 to facilitate the rotation of the backwash jet assembly 2170 during the backwash cycle. The internal cartridge support 173 further includes a through cut 2601 to allow the backwash jet assembly 2170 to easily enter the internal cartridge support 173 during assembly. The internal cartridge support 173 also includes several apertures 2604 that are configured to align with the wells 173 and the mesh screen filter 182. The internal cartridge support 173 maintains the structure of the mesh screen filter 182 during high flow operation of the cleaning cycle. In some embodiments, the internal cartridge support 173 can be constructed of a synthetic polymer or stainless steel. In other embodiments, the internal cartridge 173 support can be constructed of acrylonitrile butadiene styrene (ABS).

Primary Filter with a Paddle Attachment

Figures 28, 29:
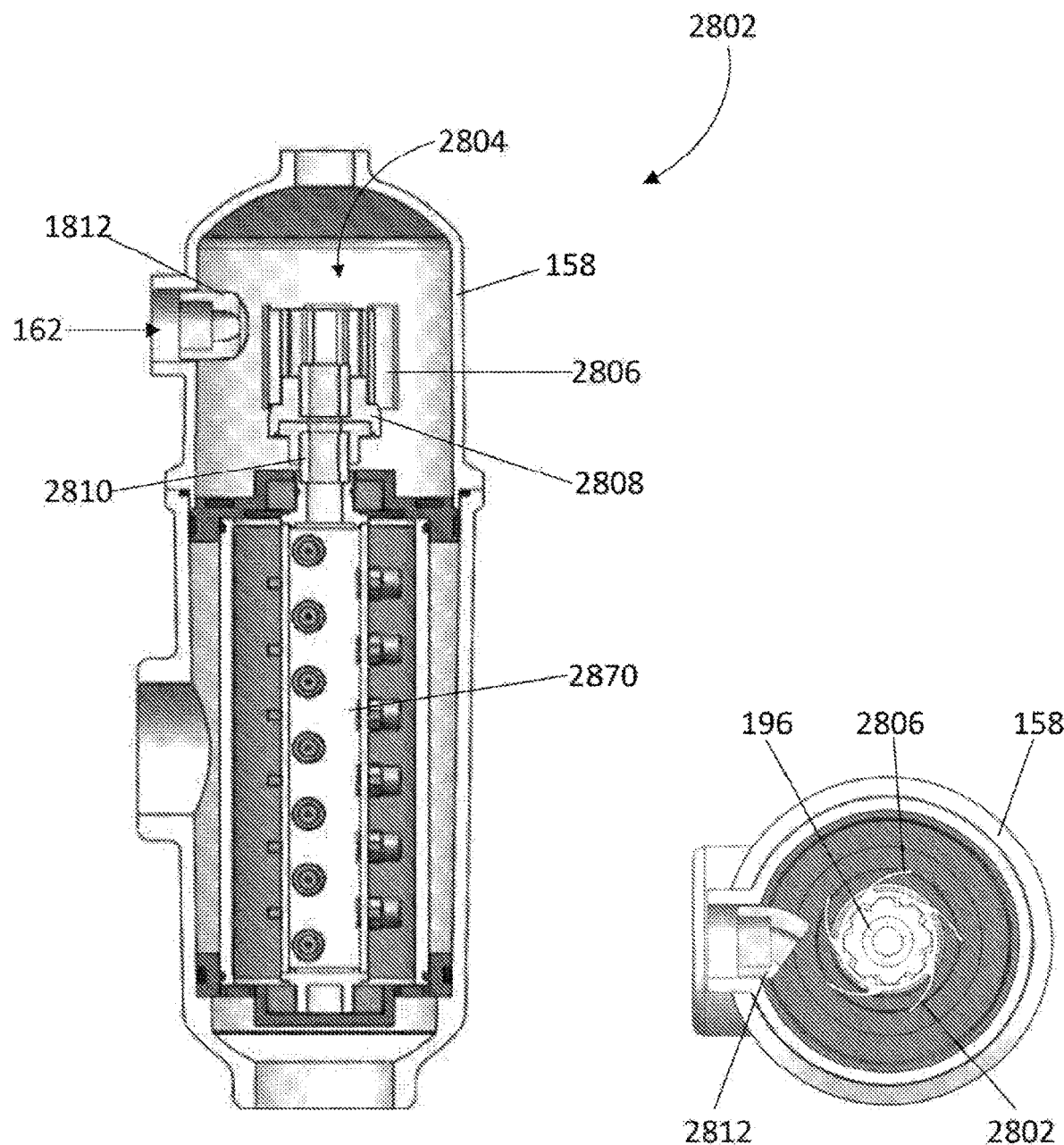
FIG. 28 is a cross sectional view of a primary filter according to one embodiment of the invention.
FIG. 29 is a top view of a primary filter according to one embodiment of the invention.

FIGS. 28-29 show a primary filter 2802 according to another embodiment of the invention. The primary filter 2802 includes a similar configuration and components as shown in FIG. 18, but includes a backwash jet assembly 2870 whose rotation during the backwash cycle is assisted by a paddle attachment 2804. The paddle attachment 2804 is positioned within the filter tank top 158 so that the backwash inlet stream 162 can contact one or more paddles 2806 to promote rotation.

In some embodiments, the one or more paddles 2806 can be curved, bent, or flat. The one or more paddles 2806 in the paddle attachment 2804 are connected to a union piece 2808 that fits concentrically around a connecting pipe 2810. The connecting pipe 2810 is coupled to the conduit of the backwash jet assembly 2870. In some embodiments, the backwash inlet stream 162 is in fluid communication with the side of the cylinder body 159 of the filter tank top 158 to facilitate the contact of the fluid with the one or more paddles 2806. In some embodiments, a flow director 2812 can be placed in the backwash inlet stream 162 to divert the flow of fluid at an angle towards the one or more paddles 2806. The flow director 2812 assists in the rotation of the paddle attachment 2804 by promoting a rotational flow pattern of the fluid within the filter tank top 158.

Variable Tank Dimensions

Figure 30:
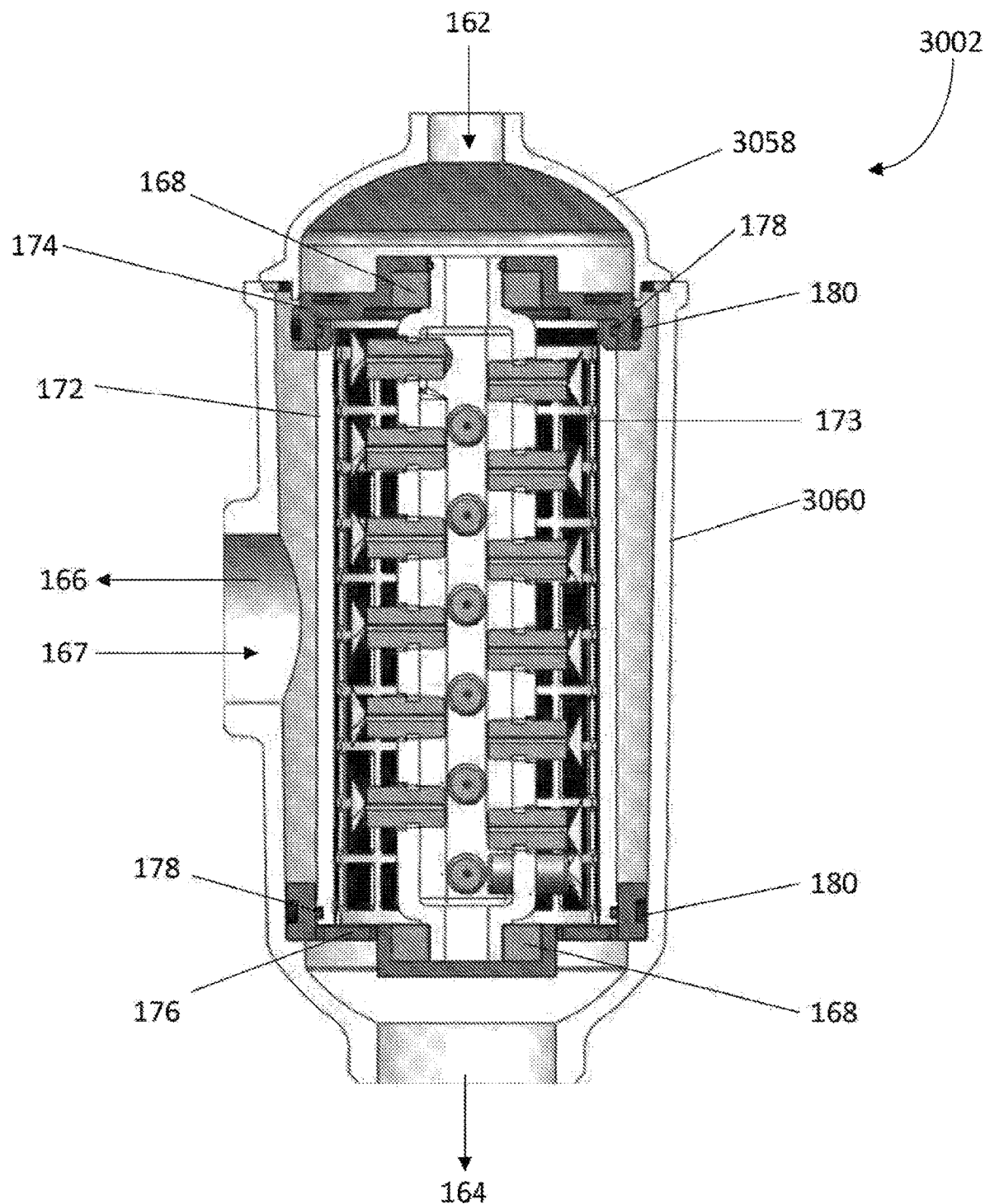
FIG. 30 is a cross sectional view of a primary filter according to one embodiment of the invention.

Different geometrical configurations of the primary filter 102 can be used for various applications. FIG. 30 shows a primary filter 3002 where a height of a filter tank top 3058 has been reduced, a height of a filter tank bottom 3060 has been increased, and a cartridge support 173 has been inserted.

As shown in FIG. 18, the primary filter 102 also includes a cartridge support 172 that is coaxially disposed within an internal chamber 171 of the primary filter 102.

Primary Filter with Wire Mesh

Figure 31:
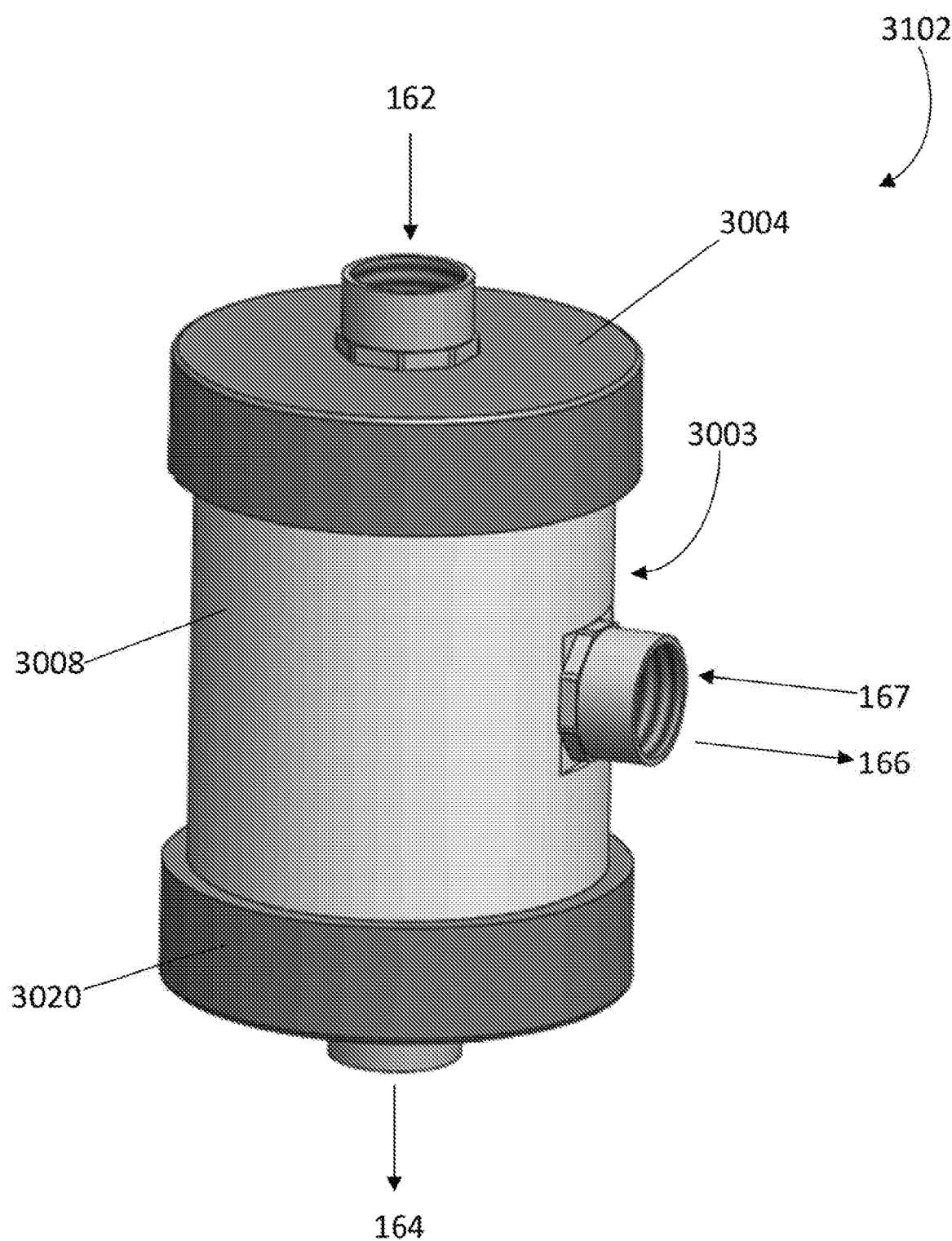
FIG. 31 is a perspective view of a primary filter according to one embodiment of the invention.

FIG. 31 shows a primary filter 3102 according to one embodiment of the invention. The primary filter 3102 includes a housing 3003 having a cleaning fluid inlet 167, a cleaning fluid outlet 164, a backwash inlet 162, and a backwash outlet 166. The housing 3003 includes a main body 3008 that extends longitudinally between a top cover 3004 and a bottom cover 3020. In some embodiments, the top cover 3004 includes the backwash fluid inlet 162 and the bottom cover 3020 includes the cleaning fluid outlet 164. In some embodiments, the main body 3008 of the primary filter 3102 includes the cleaning fluid inlet 167 and the backwash fluid outlet 166.

Figure 32:
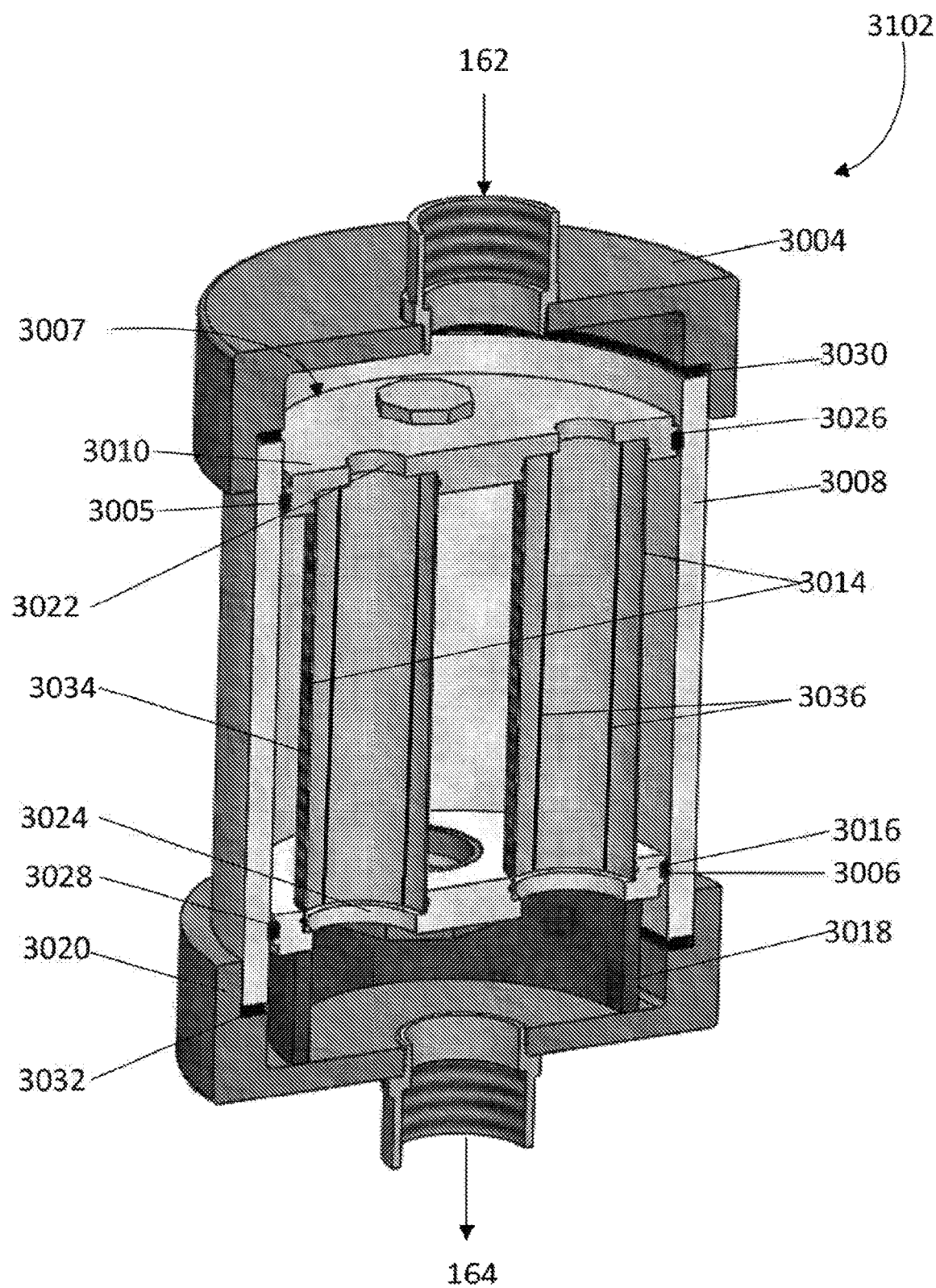
FIG. 32 is a cross sectional view of a primary filter according to one embodiment of the invention.

As shown in FIG. 32, the primary filter 3102 also includes filter media 3014 that is coaxially disposed within an internal chamber 3007 of the primary filter 3102. The filter media 3014 divides internal chamber 3007 of the primary filter 3102 between a filtrate side coupled to the cleaning outlet 164, and an inlet side that is coupled to the cleaning inlet 167. In some embodiments, the filter media 3014 includes one or more wedge wire screens that extend longitudinally between an upper support plate 3010 and a lower support plate 3016. The upper support plate 3010 and the lower support plate 3016 are configured concentrically within the main body 3008. The upper support plate 3010 and lower support plate 3016 also include an inlet fluid port 3022 and an outlet fluid port 3024 that are configured to receive the filter screen 3014. A retainer 3018 provides support to adjust the height of the lower support plate 3016 within the primary filter 3102. The primary filter 3102 also includes a first gasket 3005 that is positioned within a first recess 3026 on the peripheral edge of the upper support plate 3010. Similarly, a second gasket 3006 is positioned within a second recess 3028 on the peripheral edge of the lower support plate 3016. A third gasket 3030 is positioned between the main body 3008 and the top cover 3004 and a fourth gasket 3032 is positioned between the main body 3008 and the bottom cover 3020.

In some embodiments, the filter screen 3014 is constructed of stainless steel and has a surface profile 3034 coupled around several support profiles 3036 that longitudinally extend the length of the filter screen 3014. In some embodiments, the surface profile 3034 includes several wedge wire rings, usually in a V-shape, that are resistance welded to the several support profiles 3036. The distance between wedge wire rings is precisely controlled to form a pore size between 5 and 125 microns. In some embodiments, the several support profiles 3034 include rods configured in the axial direction, and the surface profile 3034 includes wires that are spirally wound around the support profile 3034. In other embodiments, the surface profile 3034 includes rods configured in the axial direction, and the several support profiles 3036 include rings wrapped concentrically around the surface profile. In other embodiments, the surface profile 3034 includes rods in the axial direction, and the several support profiles 3036 are spirally wound around the surface profile.

Primary Filter with Modified Inlet and Outlet

Figure 33:
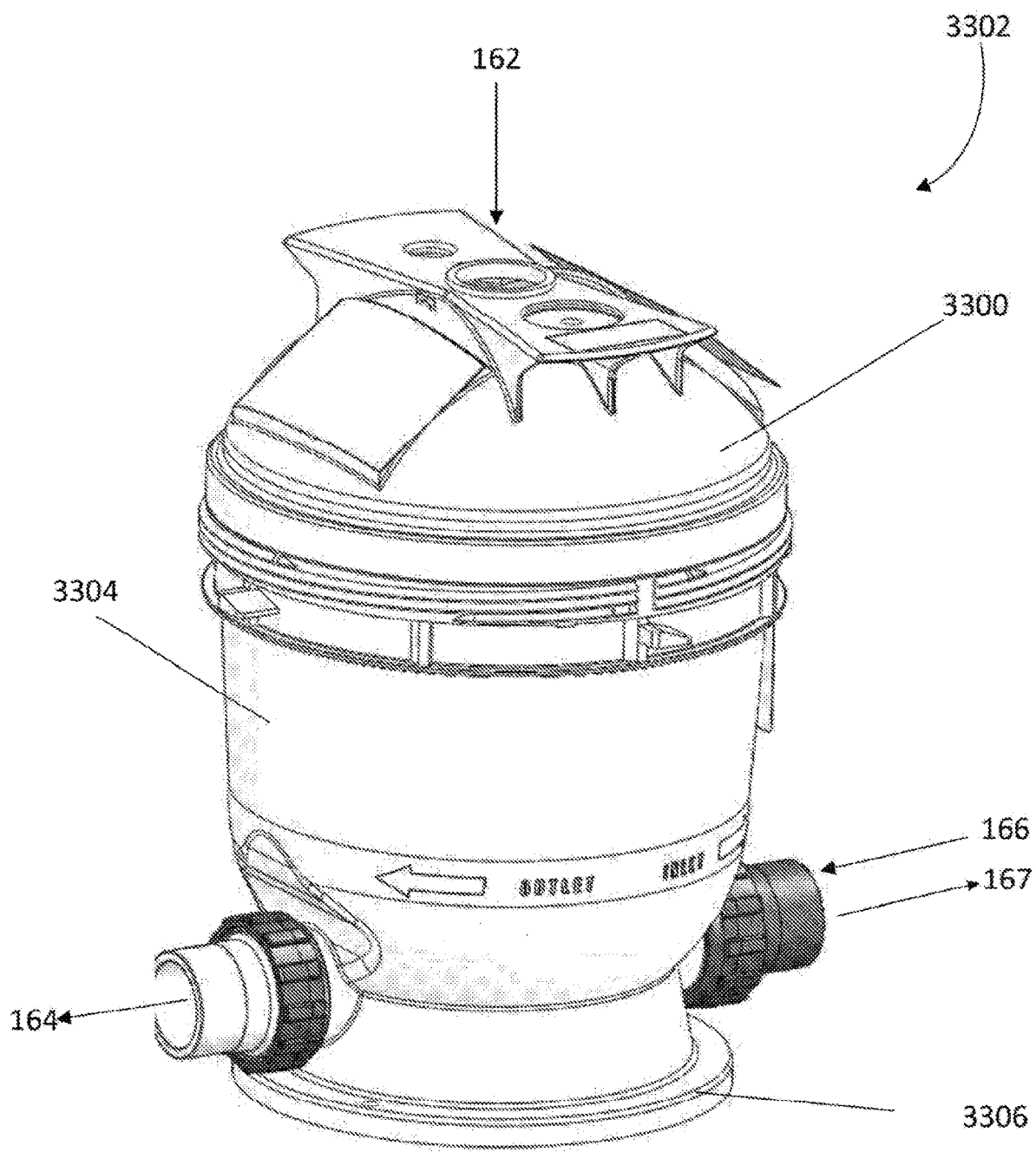
FIG. 33 is a perspective view of a primary filter according to one embodiment of the invention.

FIG. 33 shows a primary filter 3302 according to one embodiment of the invention. The primary filter 3302 includes a housing 3303 having a cleaning fluid inlet 167, a cleaning fluid outlet 164, a backwash inlet 162, and a backwash outlet 166. The housing 3303 includes a main body 3304 that longitudinally extends between a filter tank top 3300 and a filter tank bottom 3306. In some embodiments, the filter tank top 3300 includes a backwash inlet 162. In some embodiments, the primary filter 3302 also includes a cleaning outlet 164, a backwash outlet 166, and a cleaning inlet 167 that are configured in between the main body 3304 and the filter tank bottom 3306.

Figure 34:
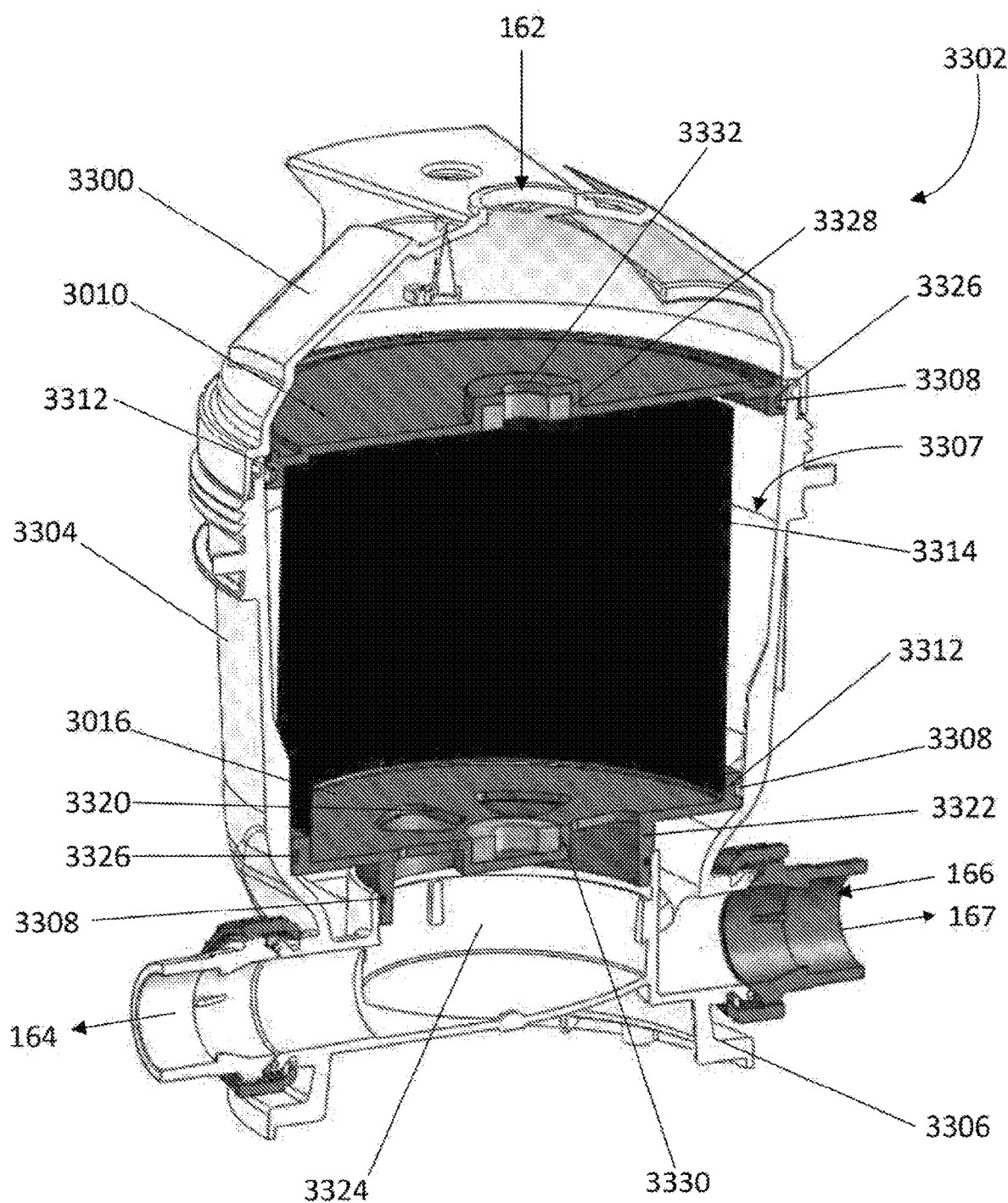
FIG. 34 is a cross sectional view of a primary filter according to one embodiment of the invention.

As shown in FIG. 34, the primary filter 3302 further includes filter media 3314 that is coaxially disposed within an internal chamber 3307 of the primary filter 3302. The filter media 3314 divides internal chamber 3307 of the primary filter 3302 between a filtrate side coupled to the cleaning outlet 164, and an inlet side that is coupled to the cleaning inlet 167. In some embodiments, the filter media 3314 includes one or more wedge wire rings that extend longitudinally between an upper support plate 3010 and a lower support plate 3016. The one or more wedge wire rings have similar features as described above. The upper support plate 3010 and the lower support plate 3016 both include a turned-over edge 3312 configured to couple the upper support plate 3010 and the lower support plate 3016 to the main body 3304. The turned-over edge 3312 also includes a recess 3326 configured to receive a gasket 3308. The primary filter 3302 can be configured to include any backwash jet assembly 170, 2170, 2370, 2570, or 2870 as described above. The backwash jet assembly 170, 2170, 2370, 2570, or 2870 can be inserted between a first central recess 3328 configured in the upper support plate 3010 and a second central recess 3330 configured in the lower support plate 3016. The first central recess 3328 further includes a fluid inlet port 3332 to place the filter media 3314 in fluid communication with the backwash inlet 162.

The lower support plate 3016 also includes one or more fluid exit ports 3320. A cylinder 3322 is configured to extend axially downward from the bottom face of the lower support plate 3016 to connect with a retainer 3324. The retainer 3324 couples concentrically around the cylinder 3322 and places the one or more fluid exit ports 3320 in fluid communication with the cleaning fluid outlet 164.

Primary Filter with a Variable Pore Size

Figure 35:
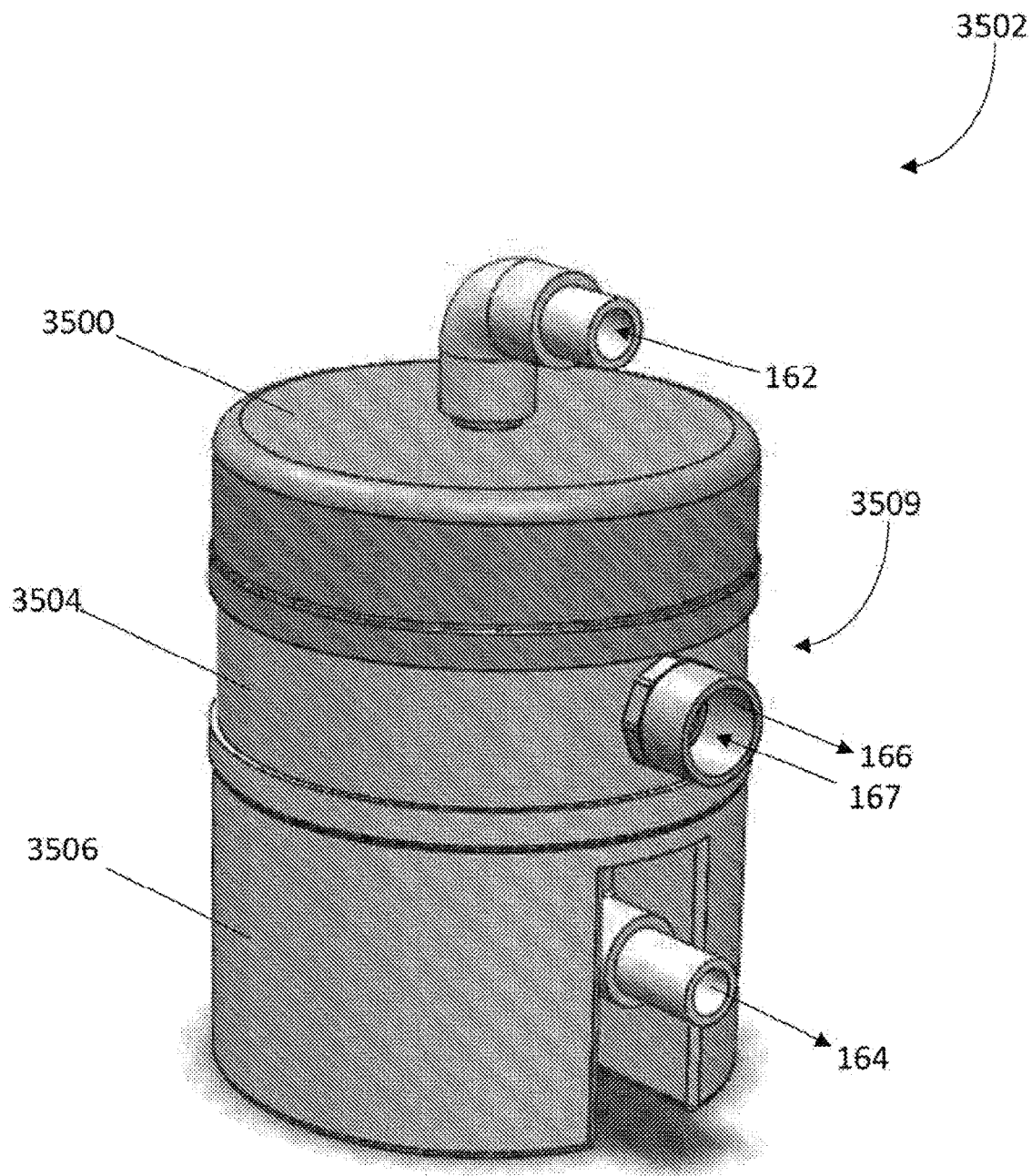
FIG. 35 is a perspective view of a primary filter according to one embodiment of the invention.

FIG. 35 shows a primary filter 3502 according to one embodiment of the invention. The primary filter 3502 includes a housing 3509 having a cleaning inlet 167, a cleaning outlet 164, a backwash inlet 162, and a backwash outlet 166. The housing 3509 includes a main body 3504 that longitudinally extends between a filter tank top 3500 and a filter tank bottom 3506. In some embodiments, the filter tank top 3500 includes a backwash inlet 162, and the filter tank bottom 3506 includes a cleaning outlet 164. In some embodiments, the main body 3504 includes a cleaning inlet 167 and a backwash outlet 166.

Figure 36:
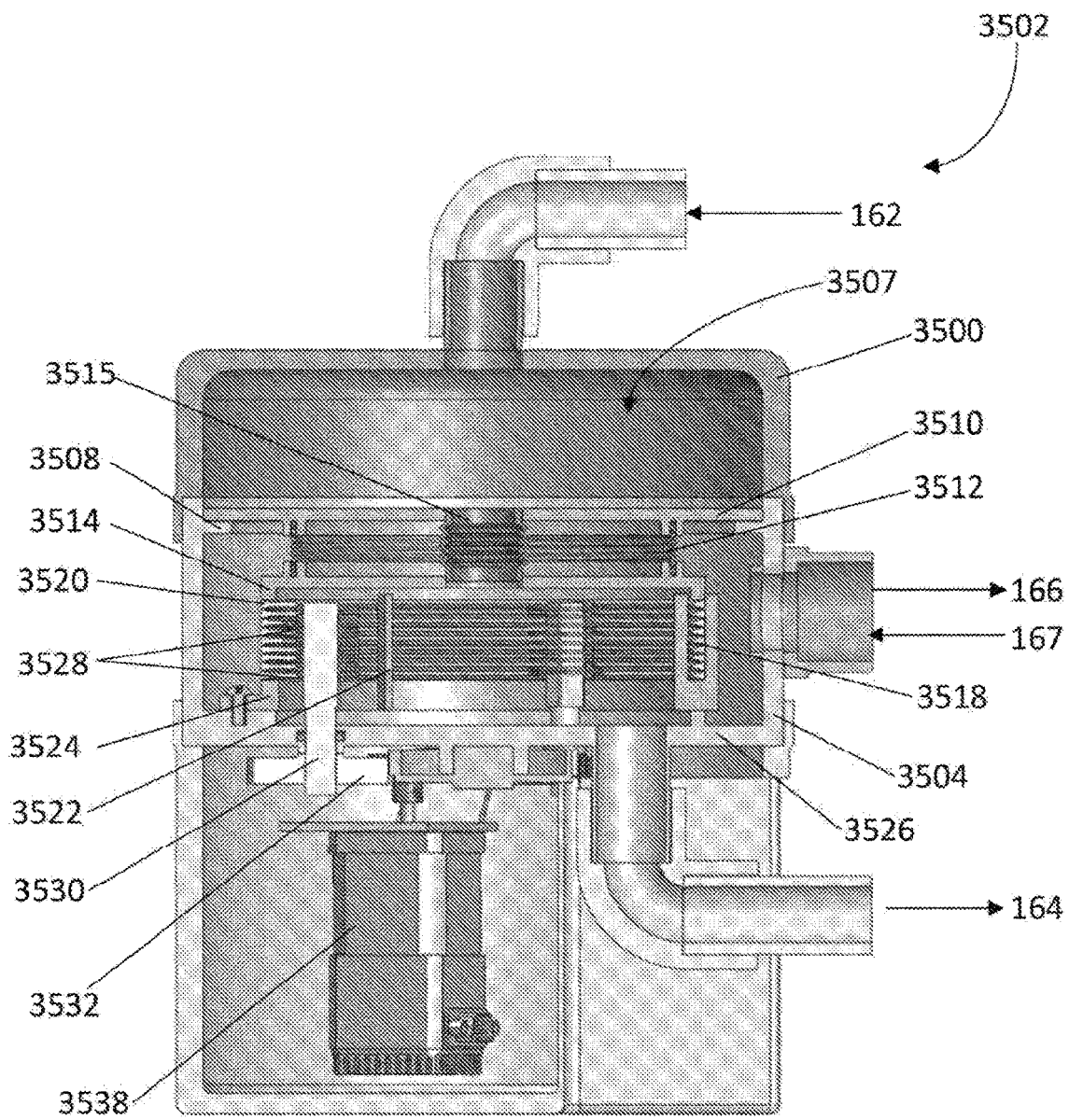
FIG. 36 is a cross sectional view of a primary filter according to one embodiment of the invention.
Figure 38:
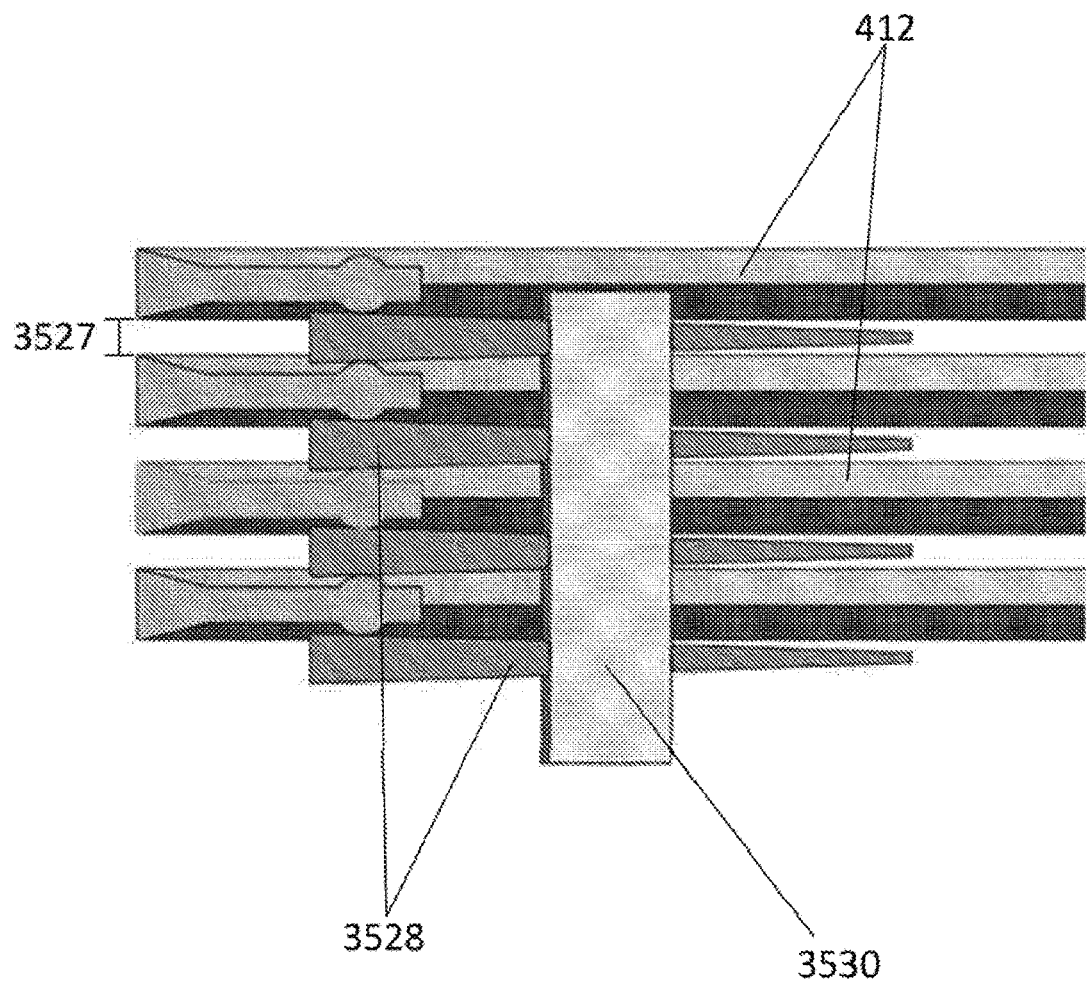
FIG. 38 is a front view of a variable screen filter for a primary filter according to one embodiment of the invention.

As shown in FIG. 36, the primary filter 3502 further includes filter media 3518 that is coaxially disposed within an internal chamber 3507 of the primary filter 3502. The filter media 3518 divides the internal chamber 3307 of the primary filter 3502 between a filtrate side coupled to the cleaning outlet 164, and an inlet side that is coupled to the cleaning inlet 167. In some embodiments, an actuator 3538 is coupled to the filter media 3518 to move at least a portion of the filter media 3518 to vary a dimension of the pores. The actuator 3518 may be connected to the controller 115 in the filter system 100. For example, the controller 115 may cause the actuator 3538 to vary the dimension of the pores in the filter media 3518 based on a signal generated by the sensor 107. Referring to FIG. 38, the dimension of the pores may be defined as a space 3527 between the wedge wire rings in the filter media 3518. In some embodiments, the actuator 3538 is coupled to a rotatable camshaft 3530 having radial projecting cams 3528 positioned between the wedge wire rings. In some embodiments, the cams 3528 have a height that varies along the diameter of the cams 3528 and, when rotated, the dimension of the pores in the filter media 3518 may be altered. For example, the cams 3528 may be rotated to alter the dimension of the pores in the filter media 3518 between a fully-open dimension of the pores, a fully-closed dimension of the pores, and various positions between fully-open and fully-closed by rotating the rotatable camshaft with the actuator.

Referring back to FIG. 36, the main body 3504 may include a bottom support member 3526 that extends the internal diameter of the main body 3504. The main body 3504 also includes an internal radial flange 3508 that is configured above the cleaning inlet 167 and the backwash outlet 166. The internal radial flange 3508 is coupled to a fixed plate 3510 that radially extends the internal diameter of the main body 3504. The fixed plate 3510 is coupled to a moveable plate 3514 by an elastic member 3512. In some embodiments, the elastic member 3512 includes a spring, while in other embodiments the elastic member 3512 includes a deformable polymeric material. A flexible conduit 3515 extends between the fixed plate 3510 and the movable plate 3514 to place the backwash inlet 162 stream in fluid communication with a filter media 3518. The filter media 3518 axially extends between the movable plate 3514 and a retainer 3524 that is coupled to the bottom member 3526. In some embodiments, the filter media 3518 also includes a surface profile 3520 and several support profiles 3522. In some embodiments, the surface profile 3520 includes wedge wire rings that are similar to the embodiments described above. In the illustrated embodiment, the several support profiles 3522 include axial rods that extend between the retainer 3524 and the movable plate 3514 to provide support for the surface profile 3520.

Figure 37:
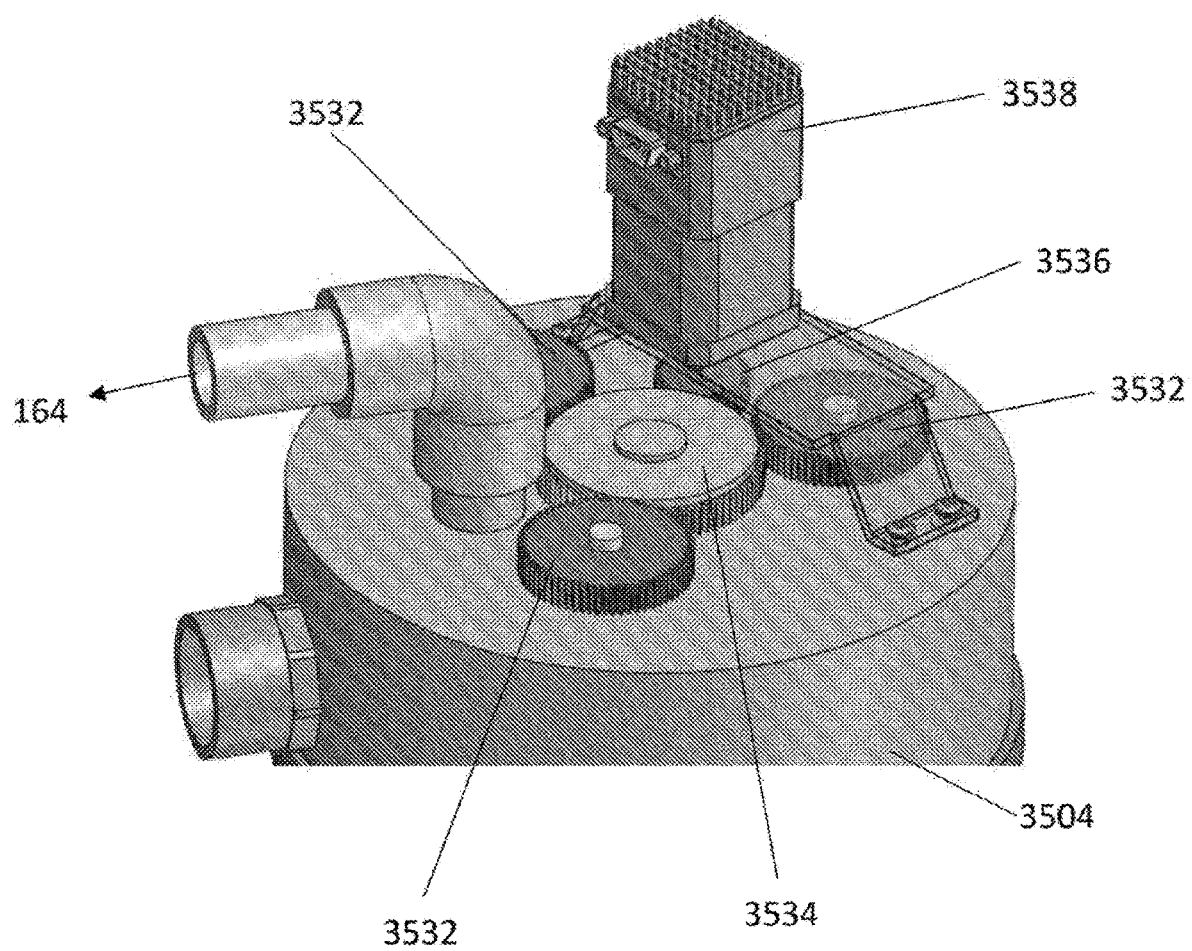
FIG. 37 is a partial perspective view of a primary filter according to one embodiment of the invention.

In some embodiments, one or more cams 3528 are configured to extend radially from a cam shaft 3530 that extends at least the length of the filter screen 3518. The one or more cams 3528 extend radially and are configured to be received between the surface profile 3520 members. The rotatable camshaft 3530 extends through the bottom member 3526 and connects with a driven gear 3532, as shown in FIG. 37. In some embodiments, there are three cam shafts 3530. However, in other embodiments there could be one cam shaft 3530, ten cam shafts 3530, twenty cam shafts 3530, etc. The driven gears 3532 engage with a middle gear 3534 and are further configured to a driving gear 3536 powered by the actuator 3538. In some embodiments, the actuator 3538 is a motor.

As shown in FIG. 38, the one or more cams 3528 have a height that varies along the diameter. In some embodiments, the height of the cams 3528 may vary between 50 mm and 0.9 mm. In other embodiments, the height of the cams 3528 varies between 1.2 mm and 0.9 mm. During operation of the backwash and cleaning cycle, the pore size of the filter media 3518 can be changed by rotating the cam shaft 3526. In some embodiments, the pore size of the filter screen 3518 can vary between 3 and 100 microns.

During operation of the backwash and cleaning cycle, the primary filter 3502 can be in electrical communication with the controller 115 (shown in FIG. 1) to change the pore size of the filter media 3518 based on control variables of the system. In some embodiments, the control variable is the inlet pressure to the primary filter 3502. In this case, the sensor 107 (shown in FIG. 1) sends pressure signals to the controller 115 to change the pore size of the filter media 3518 in response to the pressure signals. In other embodiments, the control variable is the inlet fluid turbidity, the outlet fluid turbidity, the inlet flow rate, the outlet flow rate, the level of the fluid, and the like. The pore size may also be changed based on a second or a third order variation of the above mentioned control variables.

In some embodiments, the controller 115 causes the actuator 3538 to reduce the pore size of the filter media 3518 when the pressure signal approaches a linear state. In some embodiments, the actuator can create a fully-open dimension of the pores and a fully-closed dimension of the pores.

Wedge Plate Variable Screen Mesh

Figure 39:
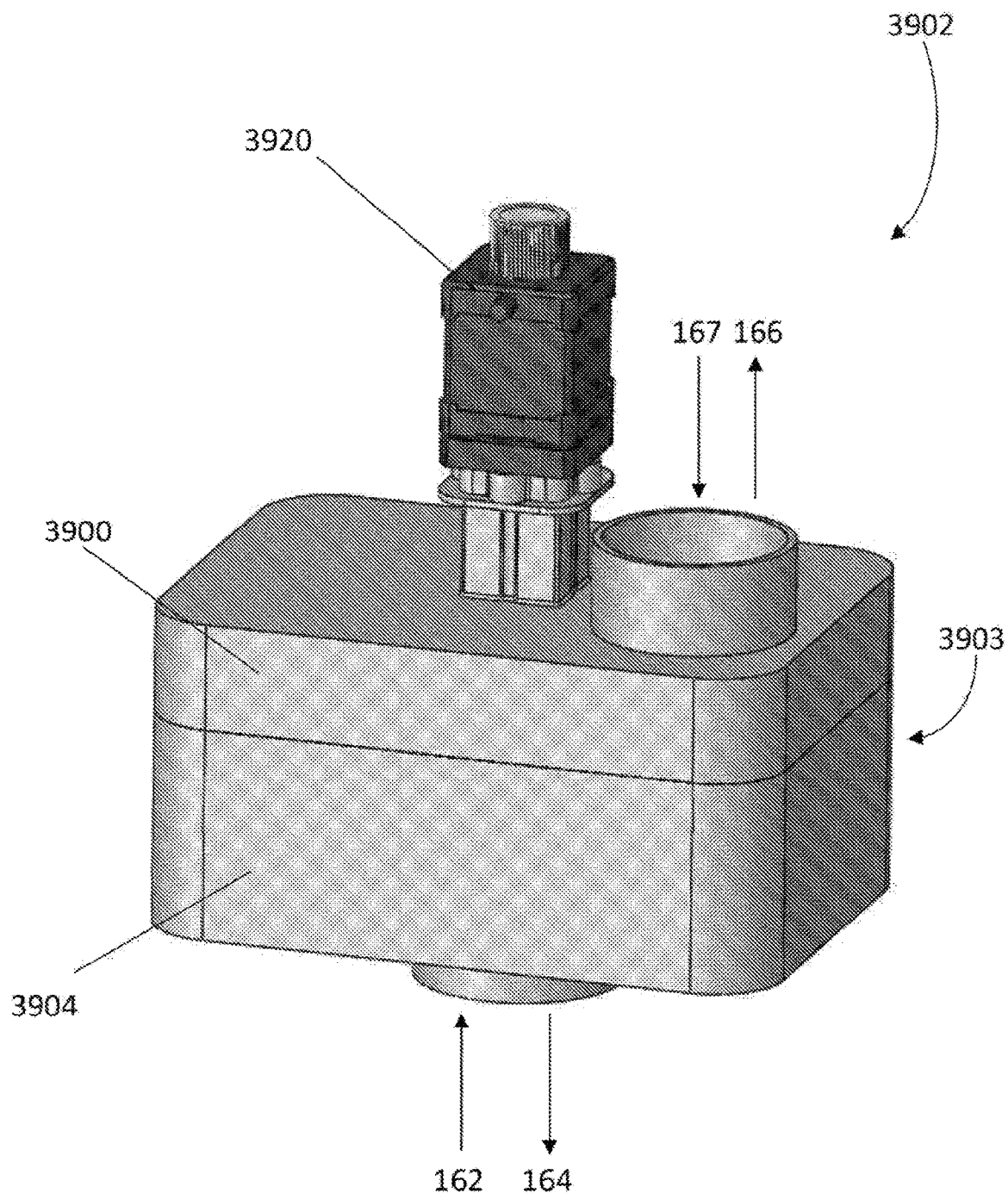
FIG. 39 is a perspective view of a primary filter according to one embodiment of the invention.

FIG. 39 shows a primary filter 3902 according to another embodiment of the invention. The primary filter 3902 includes a housing 3903 having a cleaning inlet 167, a cleaning outlet 164, a backwash inlet 162, and a backwash outlet 166. The housing 3903 includes a filter tank top 3900 and a filter tank bottom 3904. In some embodiments, the filter tank top 3900 includes the cleaning inlet 167 and the backwash outlet 166. In some embodiments, the filter tank bottom 3904 includes the cleaning outlet 164 and the backwash inlet 162.

Figure 40:
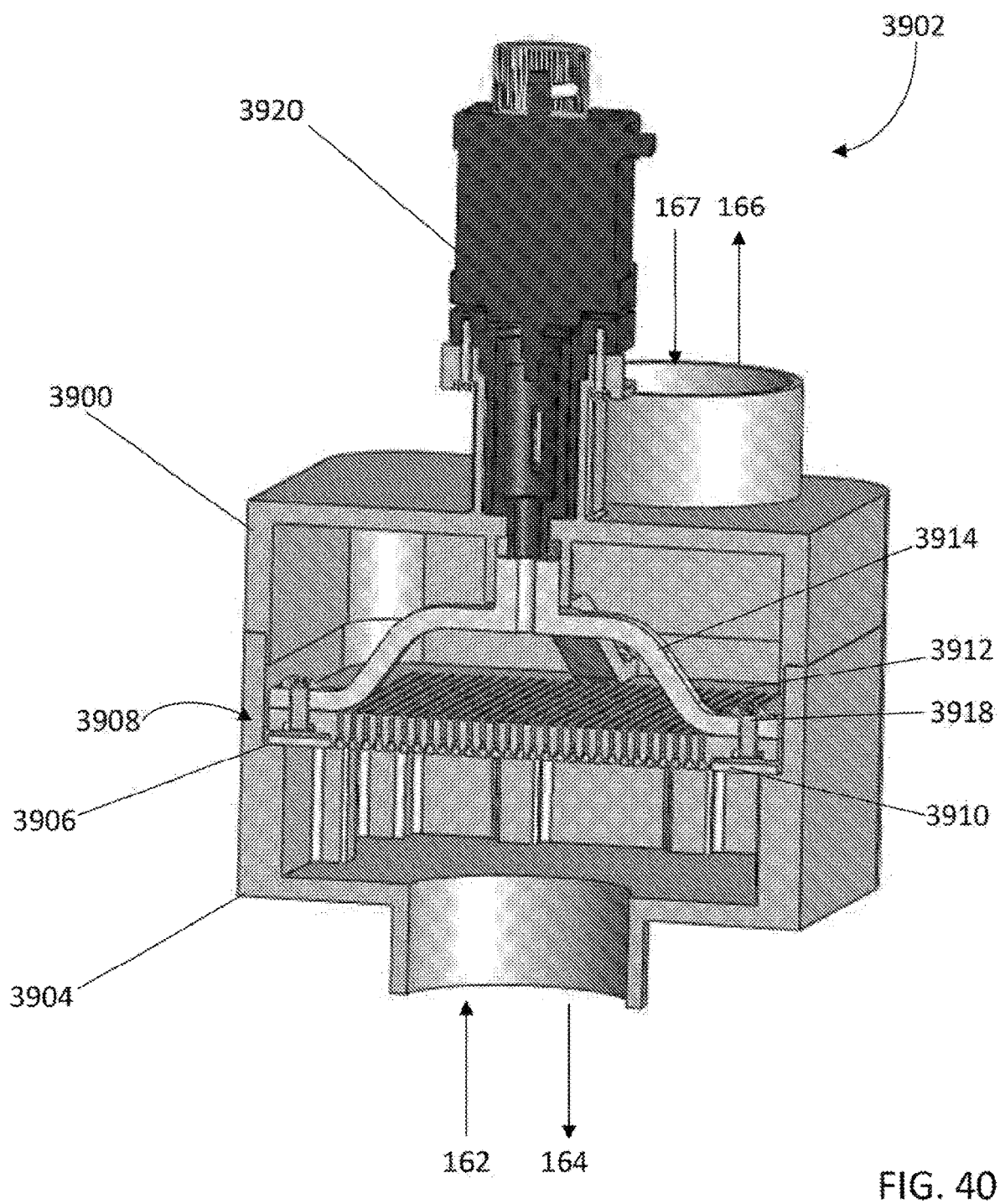
FIG. 40 is a cross sectional view of a primary filter according to one embodiment of the invention.

As shown in FIG. 40, a recess 3906 is configured along the internal surface of the filter tank bottom 3904 that is configured to receive a filter media 3908 that extends the internal diameter of the filter tank bottom 3904. The filter media 3908 also includes a fixed sieve 3910, a moveable sieve 3912, and a holding bracket 3914. The fixed sieve 3910 is coupled to the recess 3906 to form a liquid-tight seal. The moveable sieve 3912 is positioned above the fixed sieve 3910 and is coupled to the holding bracket 3914 through a fastening member 3918. In some embodiments, the fastening member 3918 is a screw, nail, or bolt. The holding bracket 3914 is mounted on the moveable sieve 3912 and is further configured to an actuator 3920 that allows for displacement of the moveable sieve 3912. In some embodiments, the actuator 3920 is a precession linear actuator with a minimum incremental motion of 1 micron.

Figure 41:
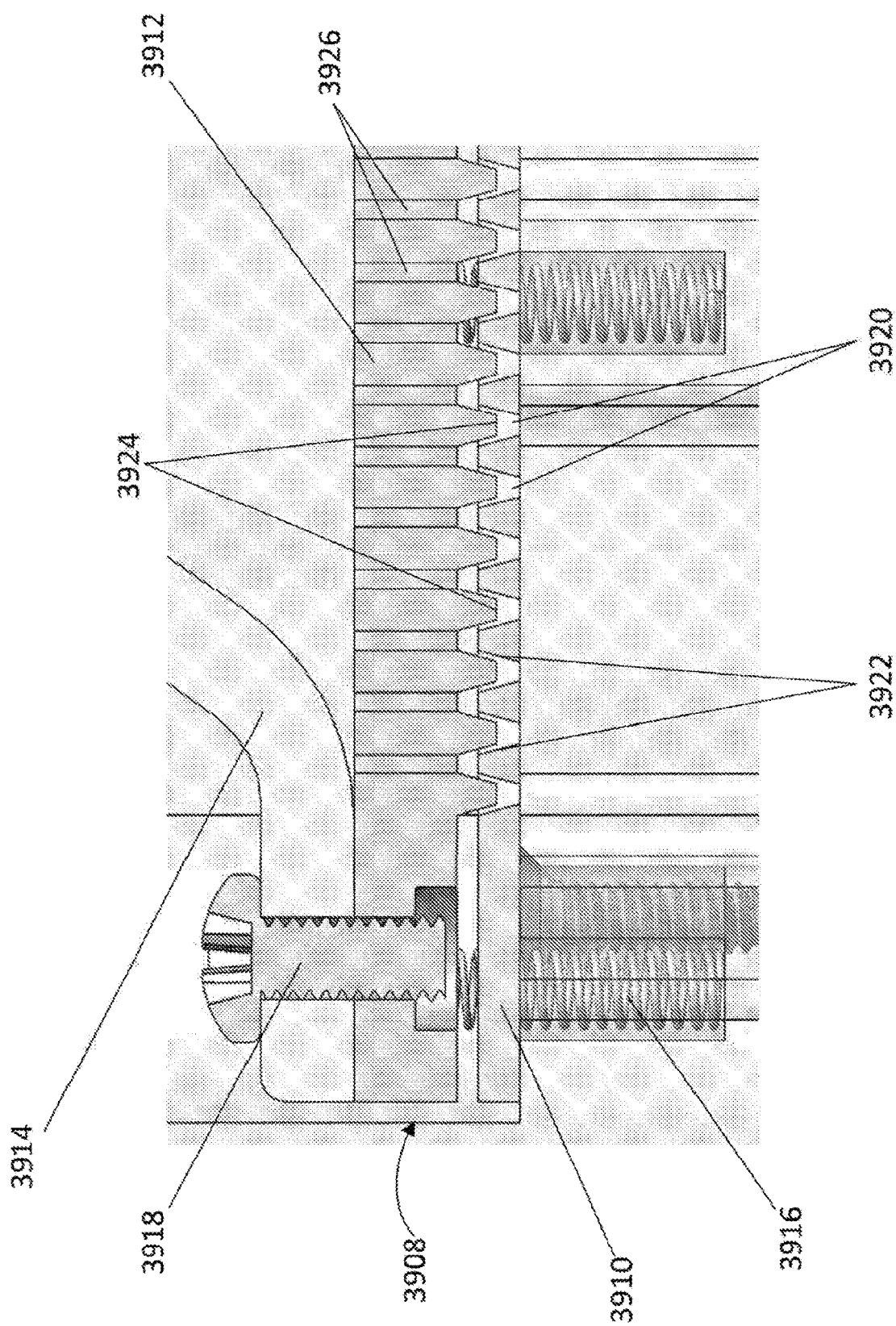
FIG. 41 is a partial cross sectional view of a primary filter according to one embodiment of the invention.

As shown in FIG. 41, the center of the fixed sieve 3910 also includes several first fluid channels 3920 that extend longitudinally therethrough. In some embodiments, the several first fluid channels 3920 include tapered walls 3922 that are configured to receive projections 3924 from the movable sieve 3912. The moveable sieve 3912 is similarly configured with several second fluid channels 3926 that extend longitudinally therethrough. In some embodiments, the dimension of the pores of the filter media 3908 is defined as a space between the tapered walls 3922 and the projections 3924. The controller 115 may be connected to the moveable sieve 3912 to alter the dimension of the pores between a fully-open dimension of the pores, a fully-closed dimension of the pores, and various positions therebetween.

During operation of the backwash and cleaning cycle, the primary filter 3502 can be in electrical communication with the controller 115 (shown in FIG. 1) to change the pore size of the filter media 3518 based on control variables of the system. In some embodiments, the control variable is the inlet pressure to the primary filter 3502. In this case, the sensor 107 (shown in FIG. 1) sends pressure signals to the controller 115 to change the pore size of the filter media 3518 in response to the pressure signals. In other embodiments, the control variable is the inlet fluid turbidity, the outlet fluid turbidity, the inlet flow rate, the outlet flow rate, the level of the fluid source, and the like. In some embodiments, the controller 115 causes the actuator 3538 to reduce the pore size of the filter media 3518 when the pressure signal approaches a linear state. In some embodiments, the actuator can create a fully-open dimension of the pores and a fully-closed dimension of the pores. The actuator 3920 can alter the pore size of the filter media 3908 by raising and lowering the moveable sieve 3912. Springs 3916 can be configured between the fixed sieve 3910 and the movable sieve 3912 to produce a separation force.

Figure 42:
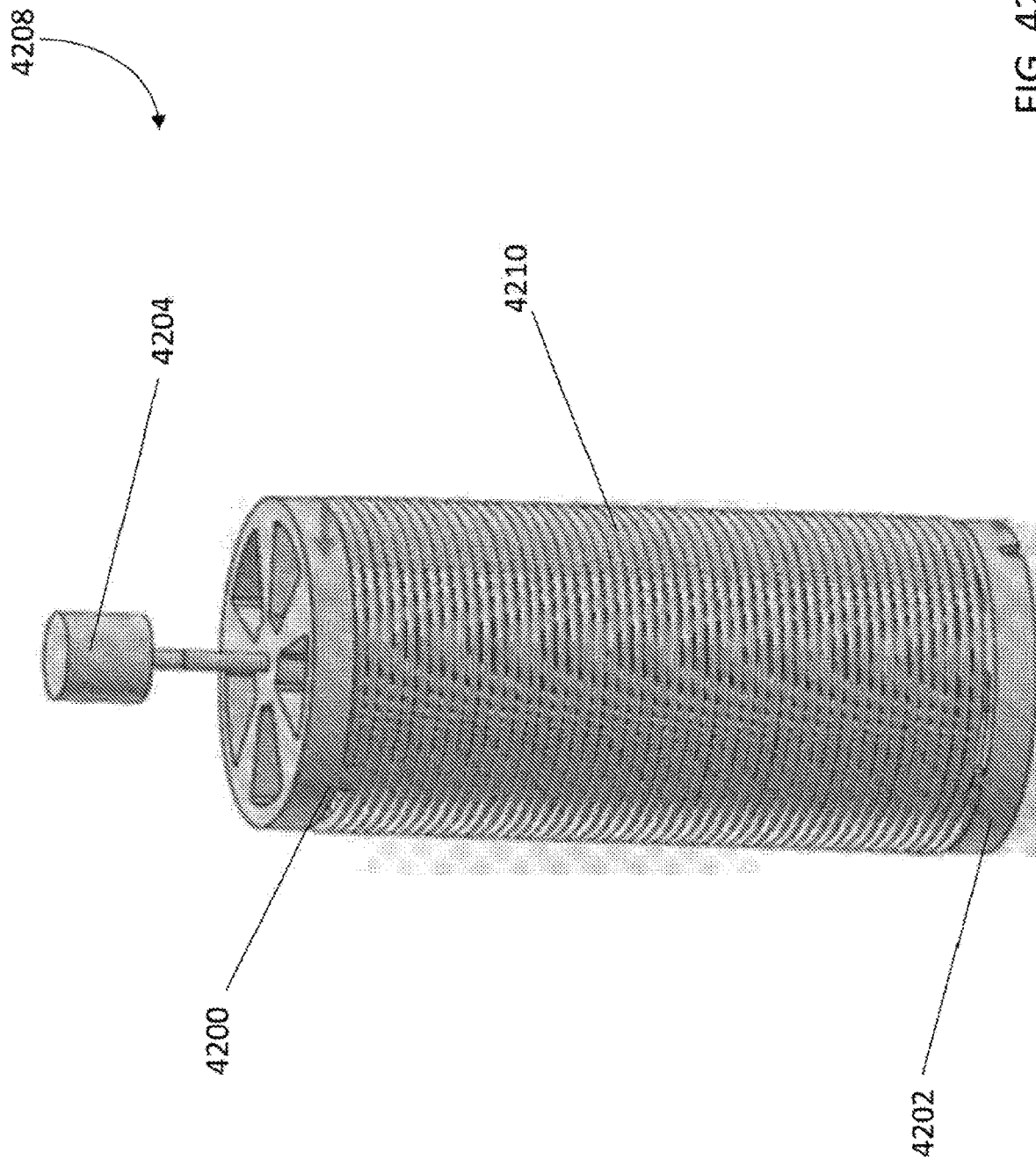
FIG. 42 is a perspective view of a variable mesh filter according to one embodiment of the invention.

FIG. 42 shows the filter media 4208 according to one embodiment of the invention. The filter media 4208 includes a surface profile 4210 configured between a top plate 4200 and a bottom plate 4202. In some embodiments, the surface profile 4210 is a torsion spring, where the pore size of the filter media 4208 is dictated by the micron gaps between the rings of the micron spring. During operation of the cleaning cycle, the pore size of the filter media 4208 can be changed using a rotation member 4204. To change the pore size, the rotation member 4204 rotates the top plate 4200 while the bottom plate 4200 remains in a fixed position. In some embodiments, rotation of the top plate 4200 can be used to compress or relax the surface profile 4210 to alter the pore size of the filter media 4208.

Figure 43:
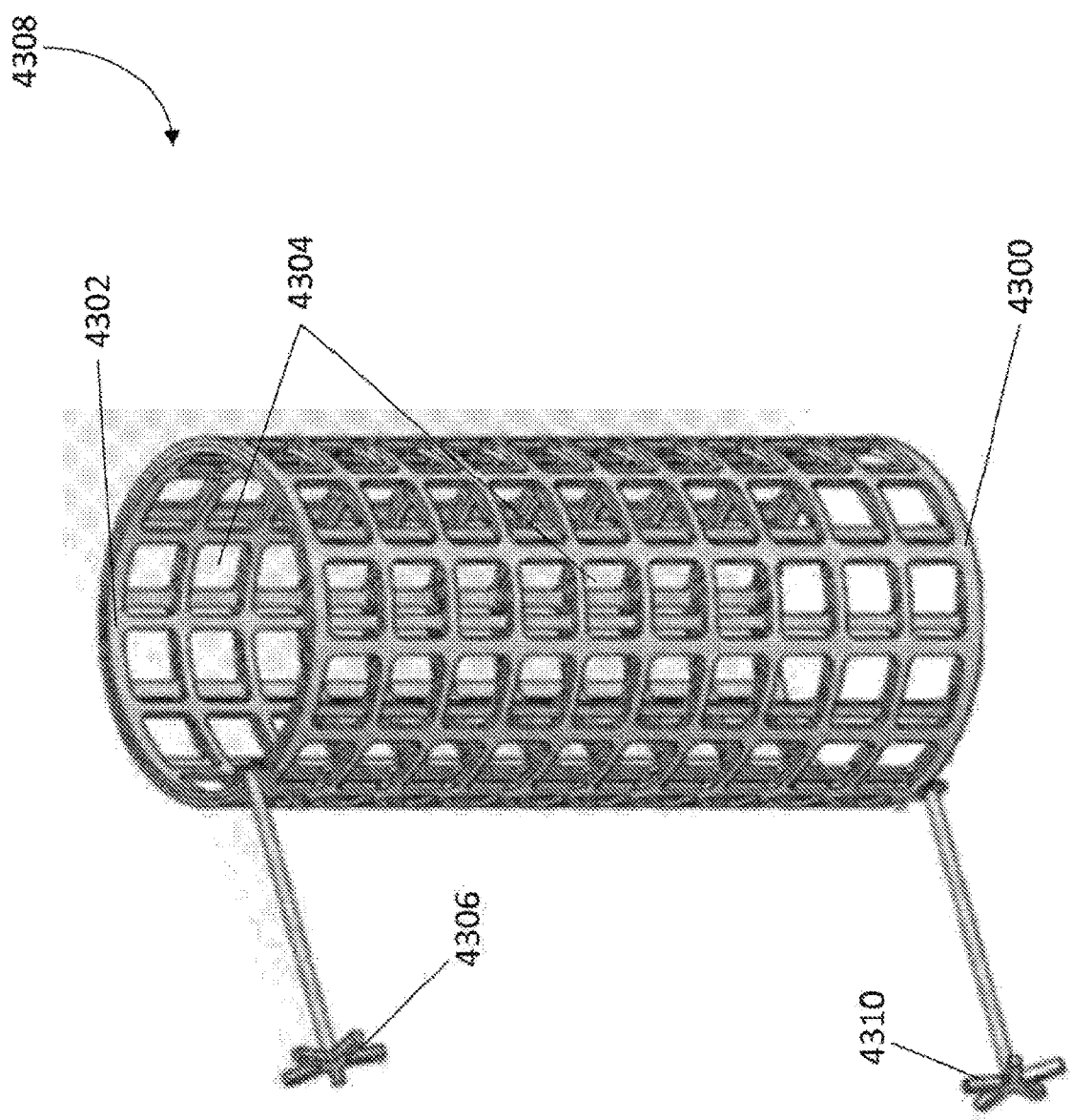
FIG. 43 is a perspective view of a variable mesh filter according to one embodiment of the invention.

FIG. 43 shows a filter media 4308 according to one embodiment of the invention. The filter screen 4308 includes a first rotatable cylinder 4300 and a second rotatable cylinder 4302. The filter media 4308 also includes a first rotating member 4306 configured to the first rotatable cylinder 4302, and a second rotating member 4310 configured to the second rotatable cylinder 4302. The second rotatable cylinder 4302 is configured concentrically within the first rotatable cylinder 4300, and both the first rotatable cylinder 4300 and the second rotatable cylinder 4302 are configured with several apertures 4304 that extend radially therethrough. During operation of the cleaning cycle, the pore size of the filter screen 4308 can be altered by rotating the first rotatable cylinder 4302 and the second rotatable cylinder 4302 using the first rotating member 4306 and the second rotating member 4310, respectively. In some embodiments, the pore size of the filter media 4308 varies between 5 and 150 microns.

Backwash Filter

Figure 44:
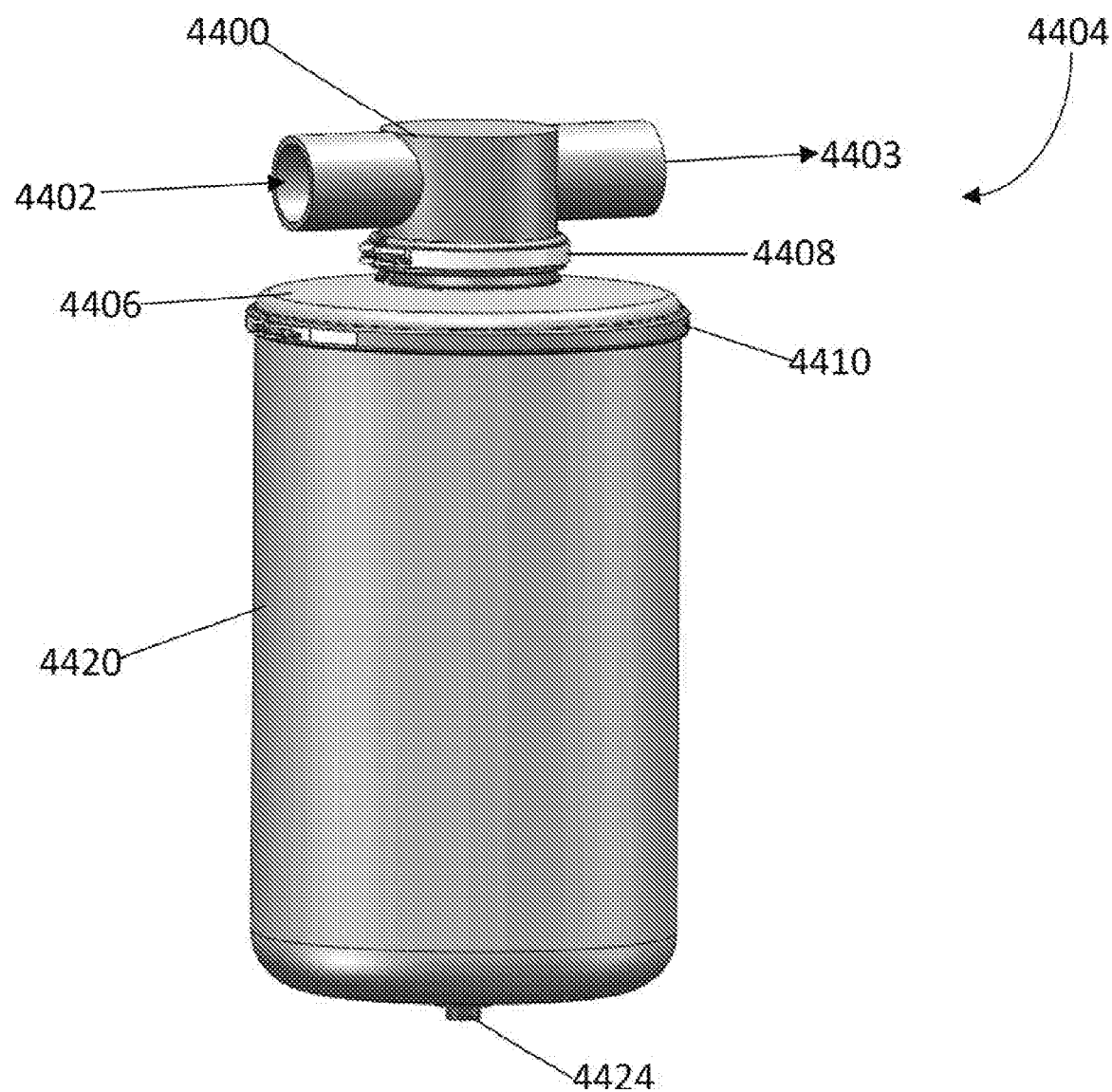
FIG. 44 is a perspective view of a backwash filter according to one embodiment of the invention.

FIG. 44 shows a backwash filter 4404 according to one embodiment of the invention. The backwash filter 4404 removes debris during the backwash cycle that has accumulated on the primary filter 102 during the cleaning cycle. Additionally, the backwash filter 4404 allows for the cleaning of the primary filter 102 with substantially no fluid discharge from the fluid system 100.

As shown in FIG. 44, the backwash filter 4404 includes a manifold 4400 configured with a fluid inlet 4402 and a fluid outlet 4403. The backwash filter 4404 further includes a filter top 4406, a filter bottom 4420, and a drain piece 4424. In some embodiments, the manifold 4400 is secured to the filter top 4406 using a first clamp 4408, and the filter top 4406 is secured to the filter bottom 4420 using a second clamp 4410.

Figure 45:
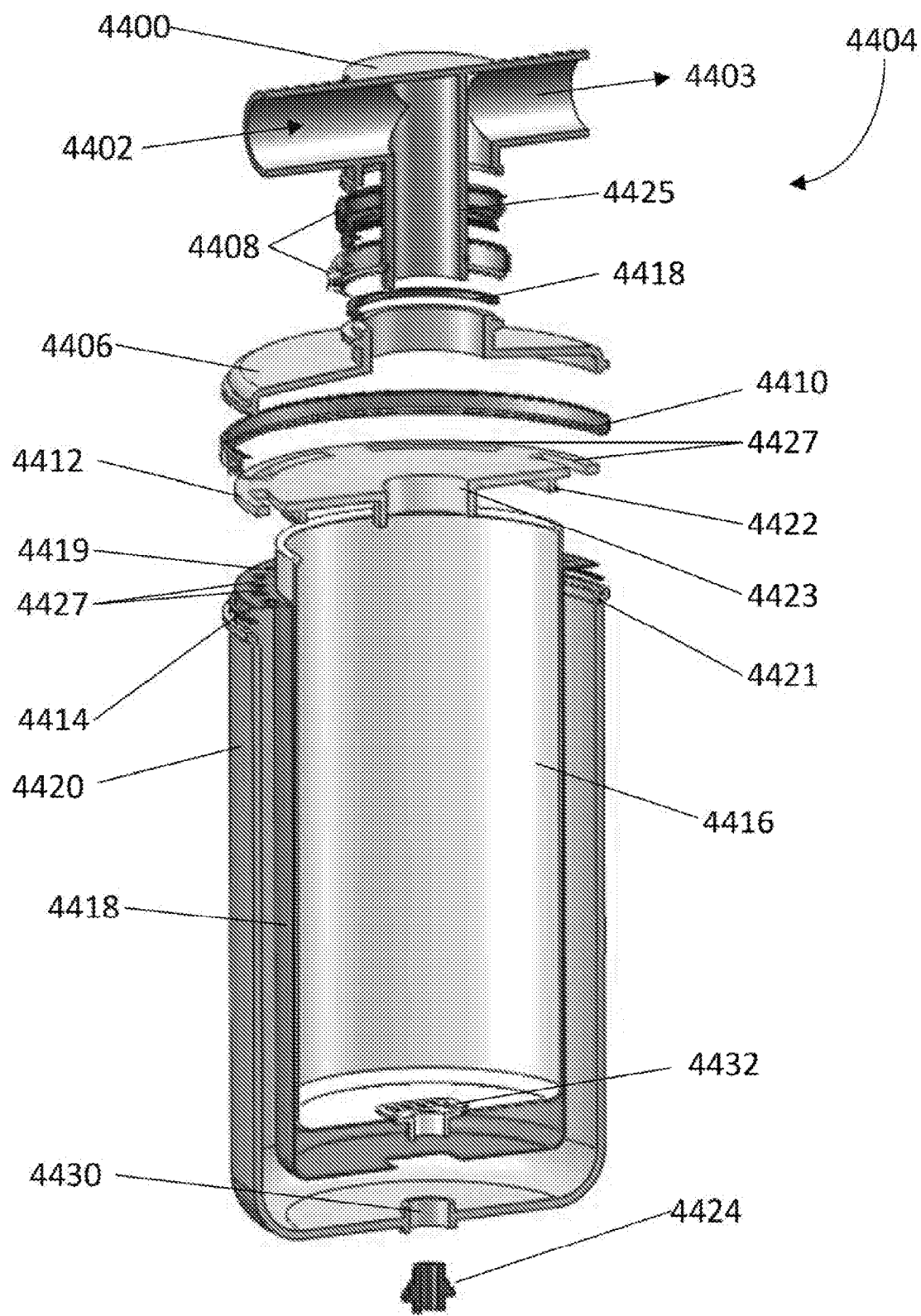
FIG. 45 is a cross sectional and partially exploded view of a backwash filter according to one embodiment of the invention.

FIG. 45 shows that the backwash filter 4404 also includes a strainer 4418 that is coaxially disposed and longitudinally extends within the backwash filter 4404. The strainer 4418 includes an upper radial flange 4419 that is configured to be received by a recess 4421 along the internal surface of the filter bottom 4420. A top fitting 4412 is configured above the strainer 4418. In some embodiments, the top fitting 4412 is a circular plate that extends the internal diameter of the filter bottom 4420. In some embodiments, the top fitting 4412 includes a fluid port 4423 that is configured to receive a conduit 4425 from the manifold 4400 to place the fluid inlet 4402 in fluid communication with the inside of the strainer 4418. In some embodiments, a filter bag 4416 is configured to line the inside surface of the strainer 4418. The filter bag 4416 is secured to the strainer 4418 by an engaging member 4422. In some embodiments, the engaging member 4422 includes a projection that extends axially downward from the bottom face of the top fitting 4412, and another projection that extends radially to secure the filter bag to the strainer 4418.

The upper radial flange 4419 and the top fitting 4412 further include several apertures 4427 to place the fluid outside of the strainer 4418 and filter bag 4416 in fluid communication with the fluid outlet 4403. The filter bottom 4420 also includes a drain port 4430. The drain port 4430 places fluid inside of the filter bag 4416 in fluid communication with the outside of the backwash filter 4404. In some embodiments, the drain port 4430 includes cylindrical walls that axially project into and out of the backwash filter 4404.

Figure 46:
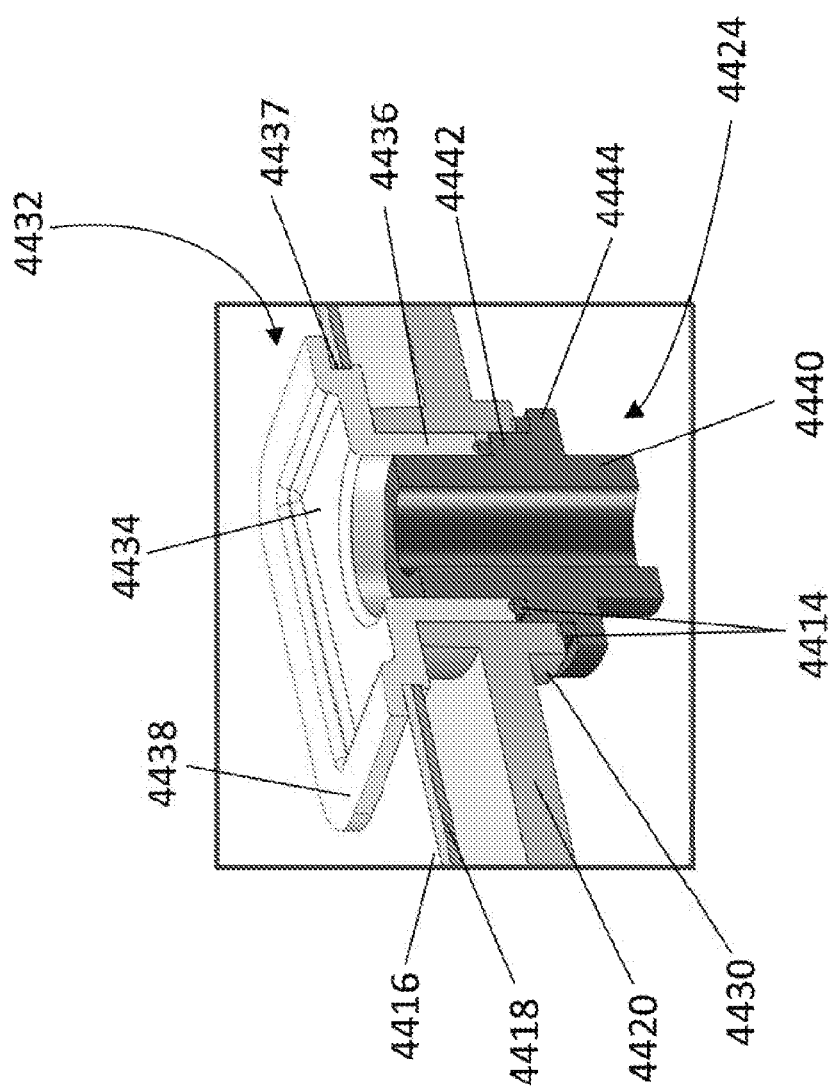
FIG. 46 a perspective view of a drain port of a backwash filter according to one embodiment of the invention.

In some embodiments, the bottom of the filter bag 4416 includes a drain cap 4432. The drain cap 4432 secures the filter bag 4416 to the strainer 4418, and also prevents rotation of the filter bag 4416 during the backwash cycle. As shown in FIG. 46, the drain cap 4432 includes a top member 4434 that extends radially from an axial cylinder 4436. The drain cap 4432 further includes a raised flange 4438 that projects from the top member 4434. The raised flange 4438 and peripheral face of the top member 4434 form a recess 4437 that is configured to receive the filter bag 4416 and the strainer 4418. The axial cylinder 4436 is configured to longitudinally extend along the internal surface of the drain port 4430 to place the filter bag 4416 in fluid communication with the drain port 4430. In some embodiments, the axial cylinder 4436 longitudinally extends half the length of the drain port 4430.

Still referring to FIG. 46, a drain fitting 4424 can also be configured to the drain port 4430. In some embodiments, the drain fitting 4424 includes an axial cylinder 4440 with a first projection 4442 and a second projection 4444. In some embodiments, the axial cylinder 4440 of the drain fitting 4424 is concentrically configured to coaxially extend along the internal surface of drain cap 4432. The first projection 4442 extends radially to connect with the internal wall of the drain port 4430, and the second projection 4444 extends radially to connect with the bottom face of the drain port 4430. Gaskets 4414 are positioned at the top face of the radial projections 4442, 4444 to create a liquid tight seal. In some embodiments, a valve is included in the drain port 4430.

Backwash Filter Operation

During operation of the backwash cycle, fluid containing debris enters the manifold 4400 through the fluid inlet 4402, and is directed to the filter bag 4416. The fluid is cleaned by passing through the filter bag 4416, and exits the strainer 4418 into the main body of the filter bottom 4420. The clean fluid then passes through the several apertures 4427 in the upper radial flange 4419 of the strainer 4418 and the top fitting 4412, and exits the backwash filter 4404 through the fluid exit 4403. In some embodiments, debris can be removed from the backwash filter 4404 by replacing the filter bag 4416. In other embodiments, a filter bag cleaning cycle can be initiated by opening the drain valve and closing the valve to the fluid exit 4403. Fluid can then recirculate through the filter bag 4416 until the entrained debris is removed.

Alternate Backwash Filter Embodiments

Figure 47:
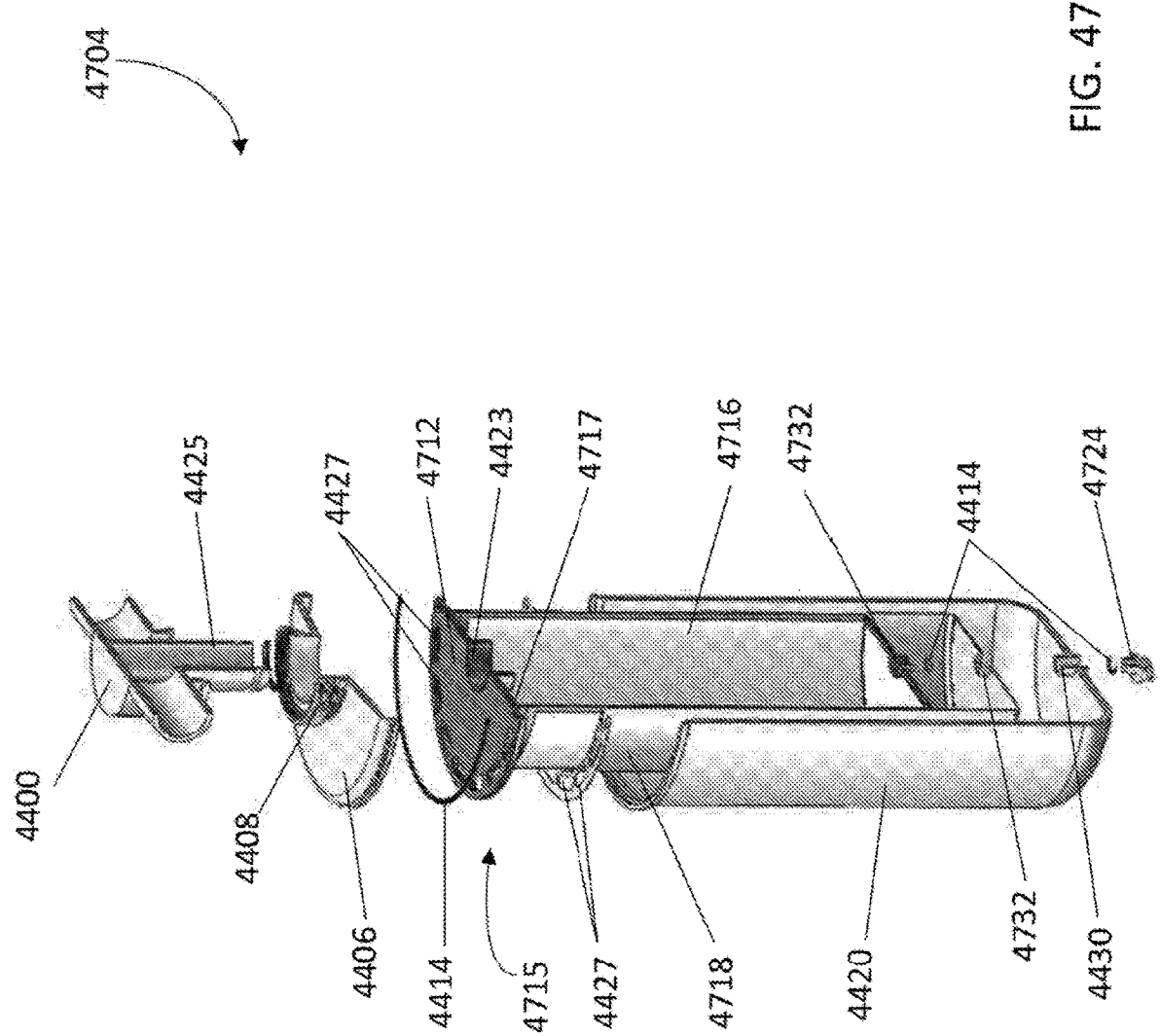
FIG. 47 is a cross sectional and partially exploded view of a backwash filter according to one embodiment of the invention.

FIG. 47 shows another configuration for a backwash filter 4704 according to one embodiment of the invention. The backwash filter 4704 includes similar components described above with respect to the first configuration 4404 as well as some additional components. The backwash filter 4704 includes a manifold 4400 configured with a fluid inlet 4402 and a fluid outlet 4403. The backwash filter 4704 also includes a filter top 4406, a filter bottom 4420, and a drain port 4430. In some embodiments, the manifold 4404 is secured to the filter top 4406 using a first clamp 4408, and the filter top 4406 is secured to the filter bottom 4420 using a second clamp (not shown). In addition, the backwash filter 4704 includes a filter 4715, a strainer 4718, and a drain fitting 4724. The filter 4715 includes a top fitting 4712 and a filter bag 4716. The top fitting 4712 includes similar features as shown in FIG. 46 but also includes a recess 4717 configured to receive the filter bag 4716.

Figure 48:
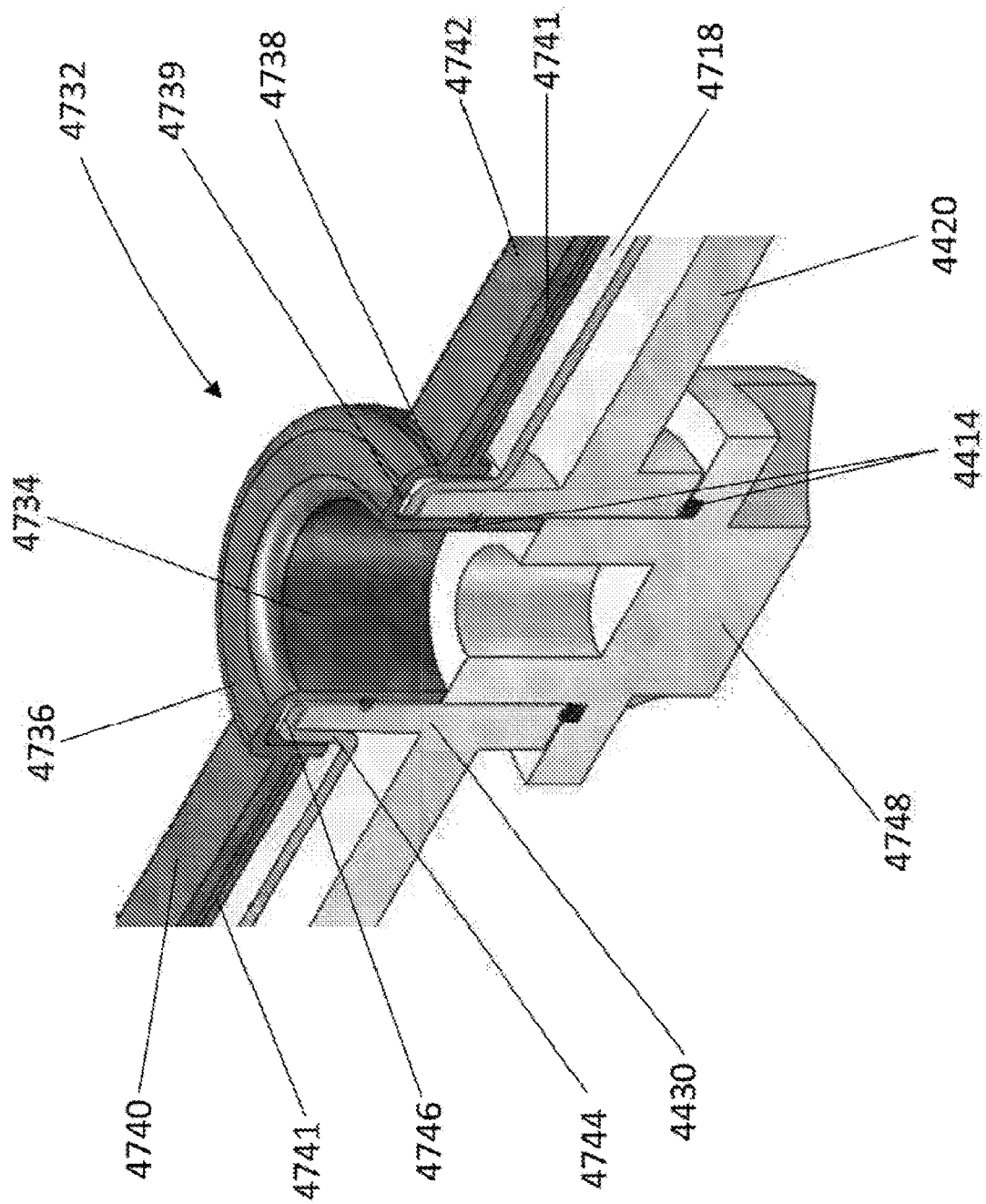
FIG. 48 is a cross sectional and perspective view of a drain fitting for a backwash filter according to one embodiment of the invention.

Referring to FIG. 48, the filter 4715 also includes a modified filter bottom cap 4732 coupled to the bottom of the filter bag 4716. In some embodiments, the filter bottom cap 4732 prevents rotation and folding of the filter 4715 during the backwash cycle. The filter bottom cap 4732 includes an axial cylinder 4734 configured with a top radial flange 4736. The peripheral of the top radial flange 4736 includes an axial projection 4738 that extends down to create a recess 4739 between the axial cylinder 4734 and the axial projection 4738. The axial projection 4738 is further configured with a first and second radial arm 4740 and 4742 that are configured to extend to the inside surface of the strainer 4718. The first and second radial arms 4740 and 4742 include a channel 4741 that runs the length of the arm and is configured to receive the filter bag 4716. The first and second radial arms 4740 and 4742 assist in securing the filter bag 4716 in place during the backwash cycle.

With continued reference to FIG. 48, the filter bottom cap 4732 is also coupled to the drain port 4430 to allow accumulated debris in the filter bag 4416 to exit the backwash filter 4704 during the backwash cleaning cycle. In some embodiments, the axial cylinder 4734 of the bottom cap 4732 is configured concentrically along the inside surface and extends longitudinally to approximately half the length of the drain port 4430. In some embodiments, the bottom surface of the strainer 4718 includes an axial cylinder 4744 that projects upwards. In some embodiments, the axial cylinder 4744 of the strainer 4718 is configured along the outside surface of the drain port 4430, and includes a top radial flange 4746 that extends along the top surface of the drain port 4430. The top radial flange 4746 and axial cylinder 4744 of the strainer 4718 are configured to be received by the recess in the filter bottom cap 4732. In some embodiments, the drain port 4430 can be configured with a drain plug 4748. Gaskets 4414 can be placed at any interface to produce a fluid tight seal.

Backwash Filters Configured with Swing-Type Check Valves

Figure 49:
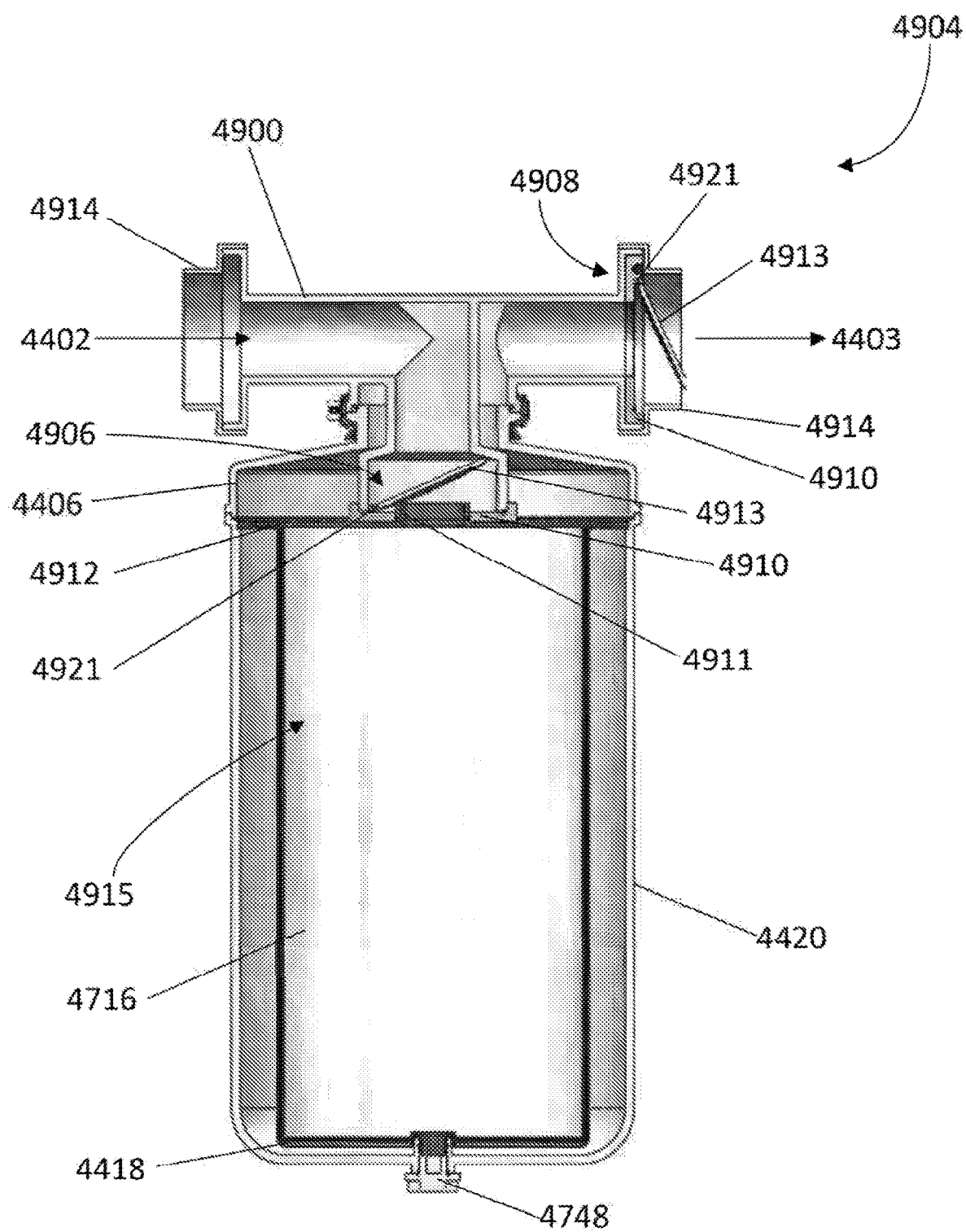
FIG. 49 is a cross sectional view of a backwash filter according to one embodiment of the invention.

FIG. 49 shows another configuration of the backwash filter 4904 that is consistent with various embodiments of the invention. The backwash filter 4904 includes similar components described above as well as some modified or additional components. In particular, the backwash filter 4904 is configured with a first check valve 4906 and a second check valve 4908. The first check valve 4906 prevents fluid from leaking when the filter 4915 is removed during maintenance. The backwash filter 4904 is also configured with a modified top fitting 4912 that includes an engaging member 4911. In some embodiments, the engaging member 4911 includes an axial cylinder that extends longitudinally from the top face of the top fitting 4912.

During operation when the filter 4915 is attached to the manifold 4900, the engaging member 4911 opens the first check valve 4906 positioned at the end of the fluid inlet 4402. In some embodiments, the first check valve 4906 is a swing type check valve that includes a base member 4910 and a disk member 4913. In some embodiments, the base member 4910 is configured around the fluid inlet stream, and is connected to the disk member 4913 by a hinge 4921. When the filter 4915 is removed during maintenance, positive pressure from the fluid inlet 4402 forces the disk member 4913 into the base member 4910 and closes the first check valve 4906, thereby preventing fluid from leaking during maintenance.

With continued reference to FIG. 49, the backwash filter 4904 is also configured with a second check valve 4908 positioned at the fluid outlet 4403. The second check valve 4908 prevents fluid from entering the backwash filter 4904 during the cleaning cycle. Similar to above, the second check valve 4908 includes a base member 4910 connected a disk member 4912 through the hinge 4921.

During operation of the backwash cycle, positive pressure flowing through the fluid outlet 4403 causes the second check valve 4908 to open by forcing the disk member 4913 to pivot along the hinge 4921. During operation of the cleaning cycle, positive pressure forces the disk member 4913 into the base member 4910 causing the second check valve 4908 to close. The manifold 4900 can further include a cap 4914 that is threaded to the inlet and outlet of the manifold 4900. The cap 4914 secures the second check valve 4908 to the manifold 4900.

Backwash Filter with Modified Check Valves

Figure 50:
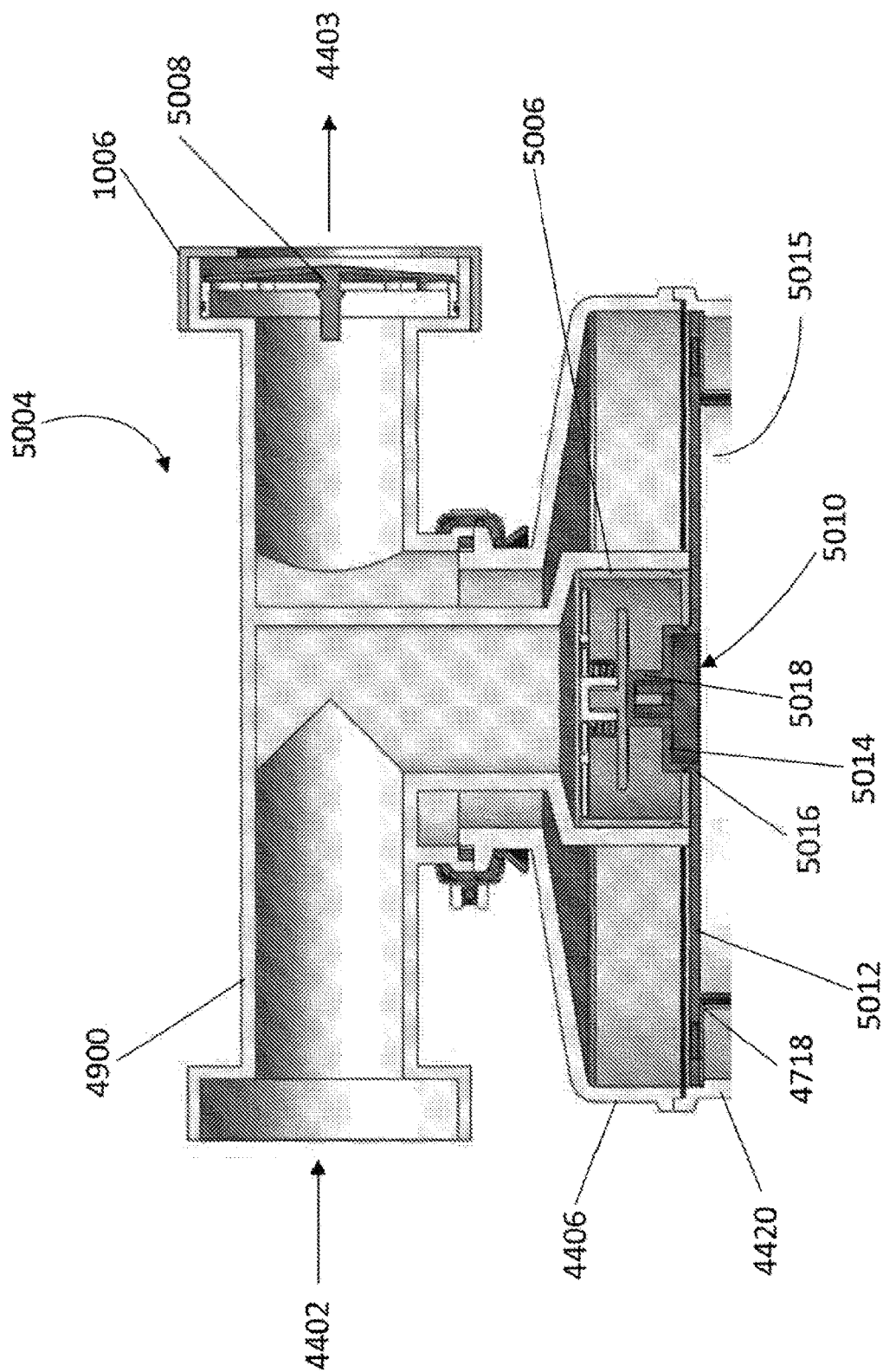
FIG. 50 is a cross sectional view of a backwash filter according to one embodiment of the invention.

FIG. 50 shows another configuration of the backwash filter 5004. The backwash filter 5004 includes similar components described above as well as some modified or additional components. In particular, the backwash filter 5004 includes a first check valve 5006, a second check valve 5008, and a top fitting 5012.

The top fitting 5012 includes an engaging member 5010 that is configured to open the first check valve 5006 during operation of the backwash cycle. In some embodiments, the engaging member 5010 includes a base member 5014 that connects a bottom member 5016 to a top member 5018. The bottom member 5016 is an axial cylinder that extends from the top fitting 5012 to connect with the peripheral edge of the base member 5014. In some embodiments, the top member 5012 is also an axial cylinder with a smaller diameter that extends longitudinally upwards from a central opening in the base member 5014. The top member 5018 includes at least one channel that allows the fluid inlet 4402 to be in fluid communication with the filter bag 4716 (shown in FIG. 47).

Figure 52:
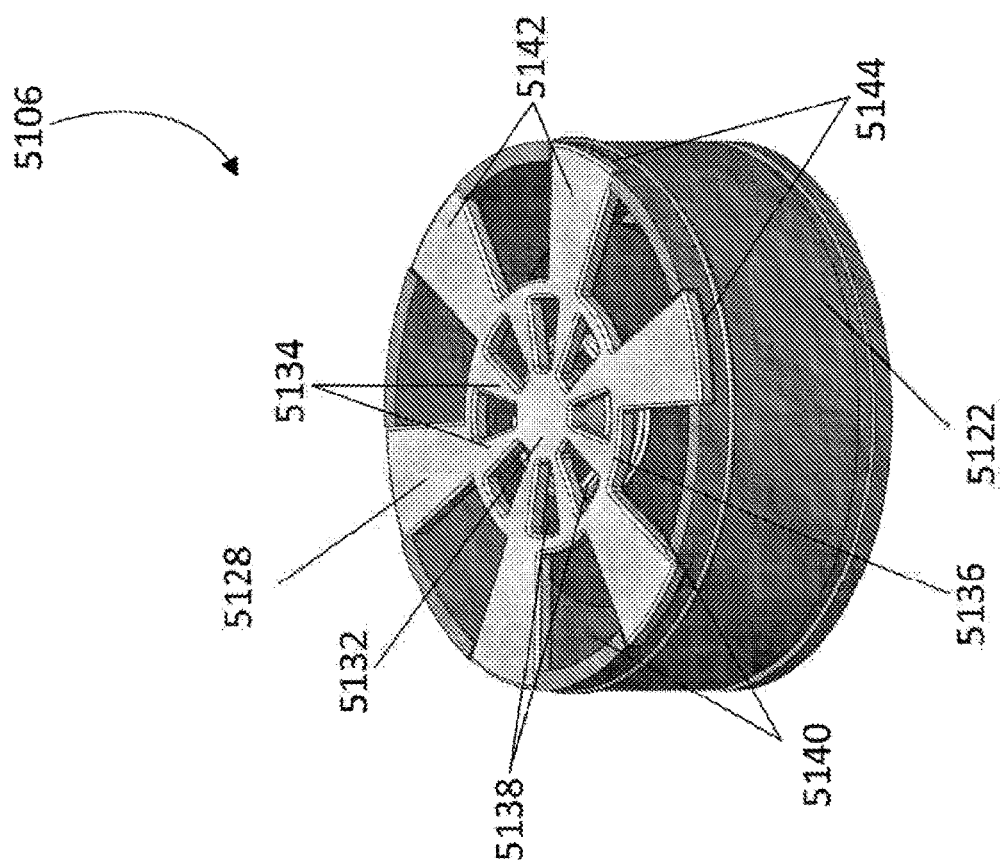
FIG. 52 is a perspective view of a check valve for a backwash filter according to one embodiment of the invention.
Figure 51:
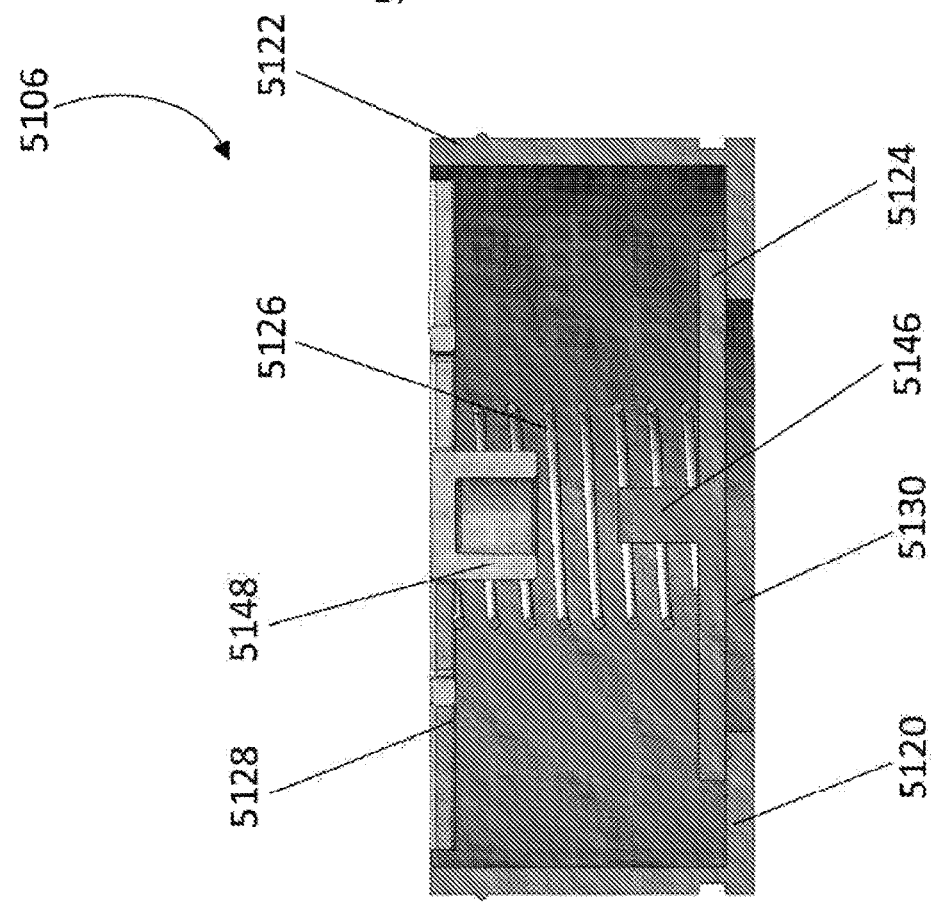
FIG. 51 is a cross sectional view of a check valve for a backwash filter according to one embodiment of the invention.

FIGS. 51-52 show another configuration for a first check valve 5106. The first check valve 5106 includes a cylindrical housing 5122, a top member 5128, a base member 5120, an elastic member 5126, and a pressing member 5124. In some embodiments, the elastic member 5126 assists in biasing the first check valve 5106 in the closed position when the filter 5015 is removed during maintenance.

The cylindrical housing 5122 of the first check valve 5106 axially extends between the top member 5128 and the base member 5120. In some embodiments, the base member 5120 extends radially from the cylindrical housing 5122 to form a fluid port 5130 that allows the passage of fluid. In some embodiments, the top member 5128 is a plate configured with several apertures 5138. In some embodiments, the top member 5128 includes a first plate 5132 positioned at the center that extends radially to define a first radius. The first plate 5132 includes radial projections 5134 that extend between the first plate 5132 and a second plate 5136. The radial projections 5134 are configured to form several apertures 5138. The second plate 5136 also extends radially to define a second radius and several second radial projections 5142 that extend between the second plate 5136 and the top of the cylindrical housing 5122. The second radial projections 5142 are configured to form several second apertures 5140. In some embodiments, the top face of the cylindrical housing 5122 includes a series of grooves 5144 configured to receive the several second radial projections 5142.

In some embodiments, the pressing member 5124 is a plate that is positioned above the fluid port 5130. In some embodiments, the pressing member 5124 has a diameter that is greater than the fluid port 5130, but is smaller than the internal diameter of the cylindrical housing 5122. In some embodiments, the elastic member 5126 is a spring that extends between the top member 5128 and the bottom member 5124. Other elastic members 5126 could include synthetic resins or deformable polymers. The pressing member 5124 is further configured with an engaging member 5146 that includes an axial cylinder that extends longitudinally from the top face of the pressing member 5124. The engaging member 5146 is configured to be received within an axial cylinder 5148 that projects from the bottom face of the top member 5128.

FIGS. 53-54 show the second check valve 5008 including a housing 5310 with a top surface 5312 containing several fluid ports 5314, and an umbrella valve 5316 configured through a central hole 5318. The second check valve 5008 allows fluid to pass during the backwash cycle, but prevents fluid from passing during the cleaning cycle. In some embodiments, the housing 5310 forms an axial cylinder that extends the diameter of the fluid outlet 4403 in the manifold 4900 (shown in FIG. 49). The umbrella valve 5316 includes spherical radial flaps 5040 that extend from the top of a valve stem 5320 to approximately the outer edge of the housing 5310. The valve stem 5320 extends through the central hole 5318 and is retained in the housing by a first retaining tab 5044 and a second retaining tab 5046

FIG. 54 shows the umbrella valve 5316 at rest, where the spherical radial flaps 5040 bear on the housing 5310 to cover the plurality of fluid ports 5314. Operation during the backwash cycle creates a positive pressure at the inlet of the second check valve 5008, which forces the spherical radial flaps 5040 to invert and allows for the passage of fluid. During the cleaning cycle, positive pressure forces the spherical radial flaps 5040 into the housing 5040, preventing the passage of fluid.

Backwash Filter with Modified Check Valve

Figure 55:
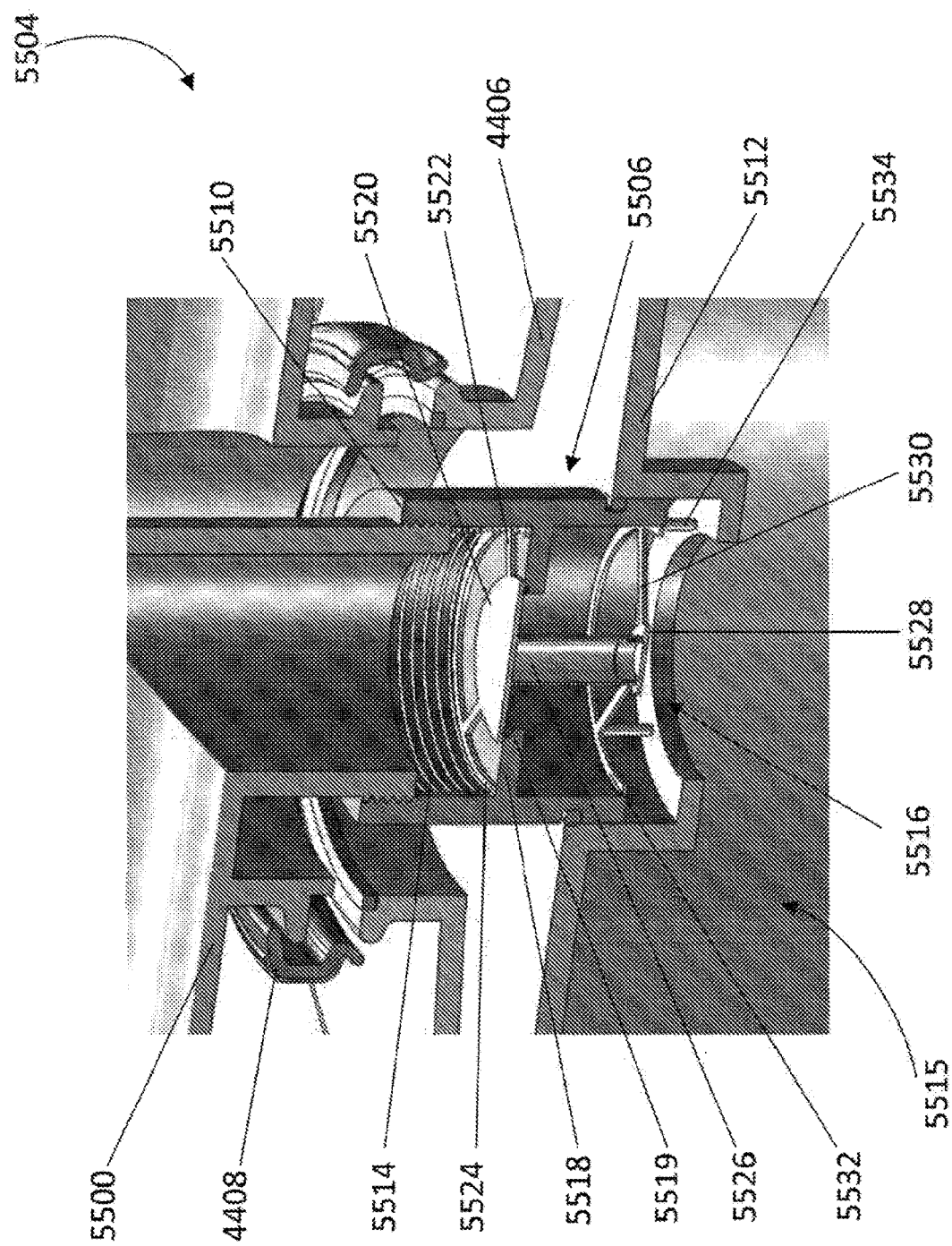
FIG. 55 is a cross sectional view of a check valve for a backwash filter according to one embodiment of the invention.
Figure 56:
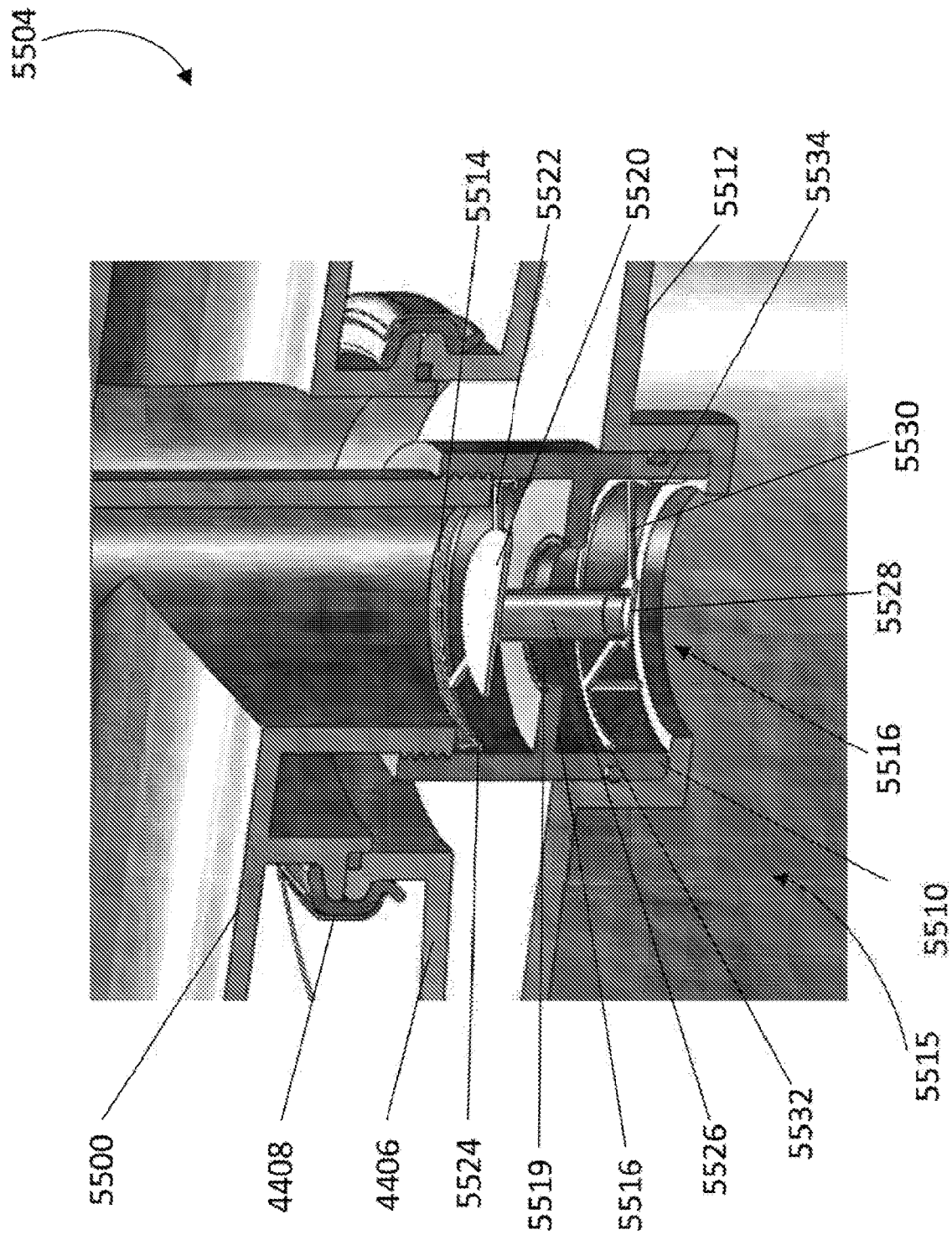
FIG. 56 is a cross sectional view of a check valve for a backwash filter according to one embodiment of the invention.

FIGS. 55-56 show another configuration of the backwash filter 5504. The backwash filter 5504 includes similar components described above as well as some modified or additional components. In particular, the backwash filter 5504 includes a top fitting 5512 and a manifold 5500 that are configured to receive a first check valve 5506.

The first check valve 5506 includes a housing 5510, an elastic member 5514, and a pressing member 5516. The first check valve 5506 allows fluid to pass during the backwash cycle, but prevents fluid from passing when the filter 5515 is removed. In some embodiments, the elastic member 5514 assists in biasing the first check valve 5506 in the closed position when the filter 5515 is removed during maintenance.

In some embodiments, the housing 5510 is an axial cylinder that longitudinally extends between the fluid inlet 4402 (shown in FIG. 44) of the manifold 5500 and the top fitting 5512. In some embodiments, the manifold 5500 is threadably engaged to the top of the housing 5510 in order to secure the first check valve 5506 in the backwash filter 5504. The housing 5510 is further configured with an internal radial flange 5518 that extends radially to define a fluid port 5519. The pressing member 5516 includes a top member 5520 that controls the passage of fluid from the manifold 5500 to the filter 5515, a valve stem 5526, and a base 5528 that interfaces with the top fitting 5512.

The top member 5520 is coupled to the internal radial flange 5518 in the housing 5510 by the elastic member 5514 that extends from the manifold 5500 to the top member 5520. In some embodiments, the top member 5520 is a disk configured to cover the fluid port, and further includes several radial projections 5522 that connect to an annular ring 5524 configured along the internal surface of the housing 5510. In some embodiments, the valve stem 5526 is an axial cylinder that extends between the top member 5520 and the base 5528. In some embodiments, the base 5528 is a disk configured with several radial projections 5530 that connect to an annular ring 5532 configured to the bottom face of the housing 5510. In some embodiments, the annular ring 5532 also includes several legs 5534 that extend axially downwards from the bottom face of the annular ring 5532.

During operation of the backwash cycle, the top fitting 5512 engages the pressing member 5516 to compress the elastic member 5514 and to lift the top member 5520 away from the fluid port 5519. Once the filter 5515 is removed during maintenance, the elastic member 5514 forces the top member 5520 to cover the fluid port, preventing the passage of fluid.

Backwash Filters with Modified Filter Tops

Figure 58:
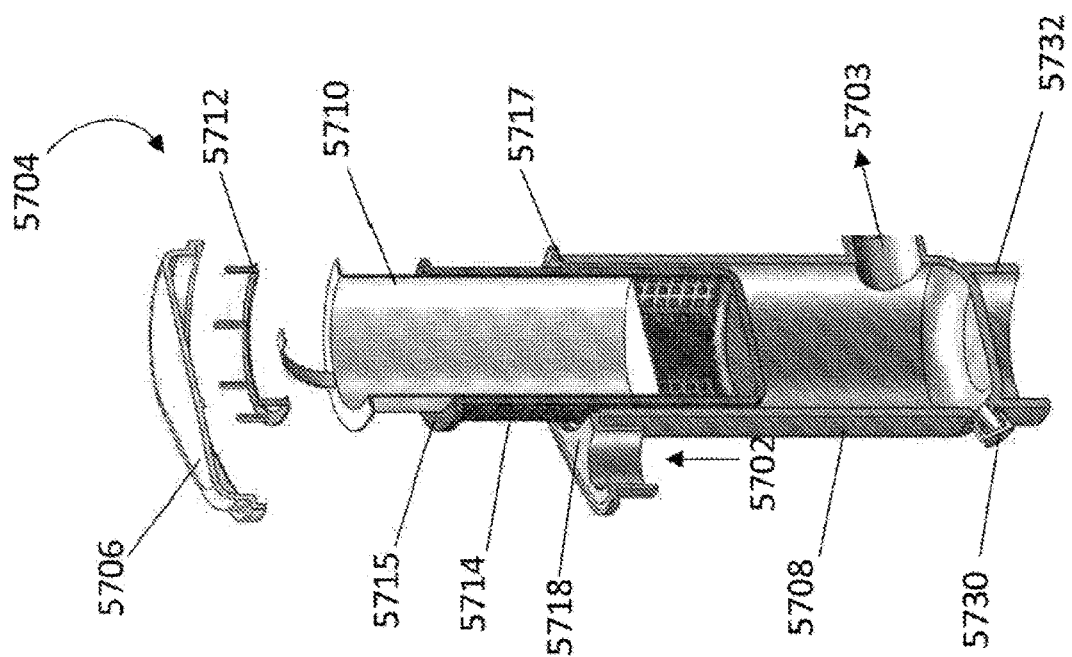
FIG. 58 is a cross sectional and partially exploded view of a backwash filter according to one embodiment of the invention.
Figure 57:
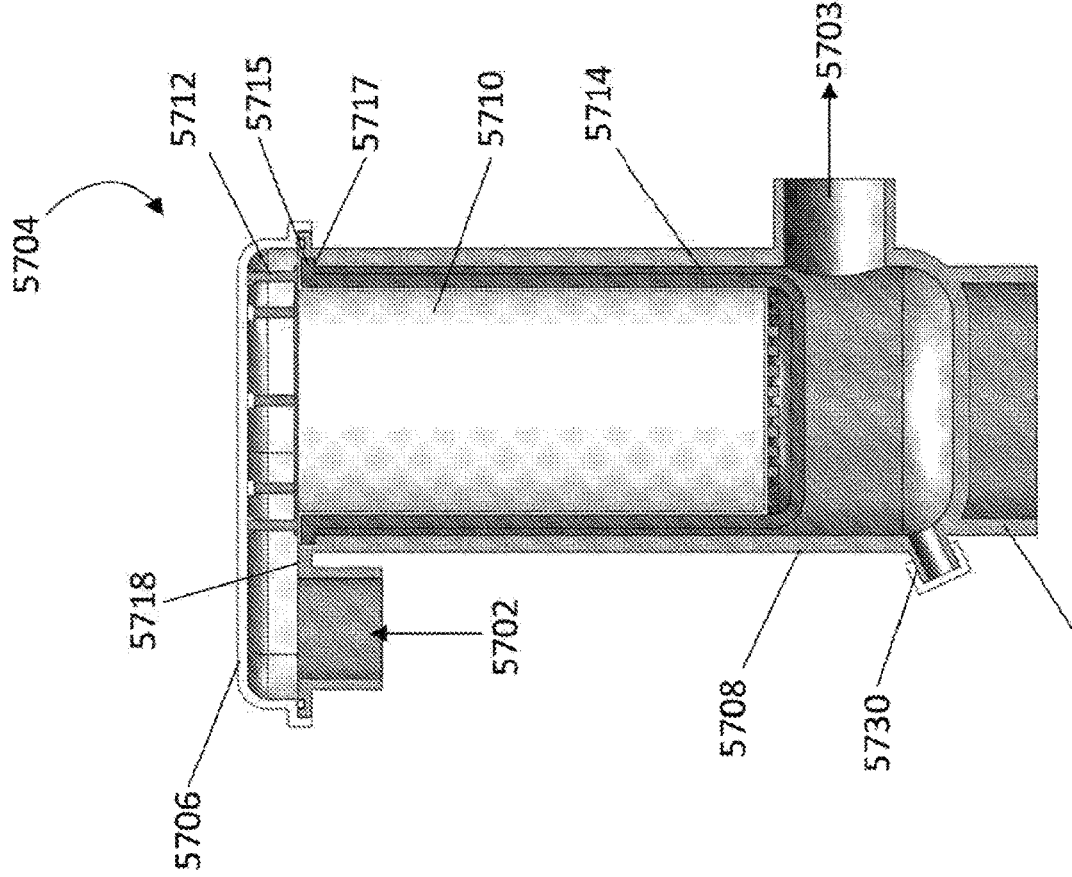
FIG. 57 is a cross sectional view of a backwash filter according to one embodiment of the invention.

FIGS. 57-58 show another configuration of the backwash filter 5704. The backwash filter 5704 attenuates fluid turbulence and the fluid hammer effect by directing an inlet fluid 5702 through a tortuous path. The backwash filter 5704 includes similar components described above as well as some modified or additional components. The backwash filter 5704 includes a filter top 5706, a filter bottom 5708, a drain port 5730, and a stand 5732.

In some embodiments, the filter bottom 5708 includes an axial cylinder that extends between the filter top 5706 and the stand 5732. The filter bottom 5708 includes the fluid inlet 5702 connected by a top radial flange 5718 that places the filter top 5706 in fluid communication with the filter bottom 5708. A strainer 5714 is coaxially disposed within the filter bottom 5708 and includes a filter bag 5710 that lines the inside surface of the strainer 5714. The strainer 5714 also includes a radial flange 5715 that is configured to be received by a recess 5717 in the filter bottom 5708. In some embodiments, the filter bag 5710 is secured to the strainer 5714 by a filter clip 5712. In some embodiments, the filter clip 5712 is an annular ring that rests on the top radial flange 5715 of the strainer 5714 and is includes several axial projections that extend to the filter top 5706 where they are clipped into receiving ports. The filter bottom 5708 includes a fluid outlet 5703 and a drain port 5730. In some embodiments, the stand 5732 is an axial cylinder that extends from the filter bottom 5708 that allows the backwash filter 5704 to be free standing.

Figure 60:
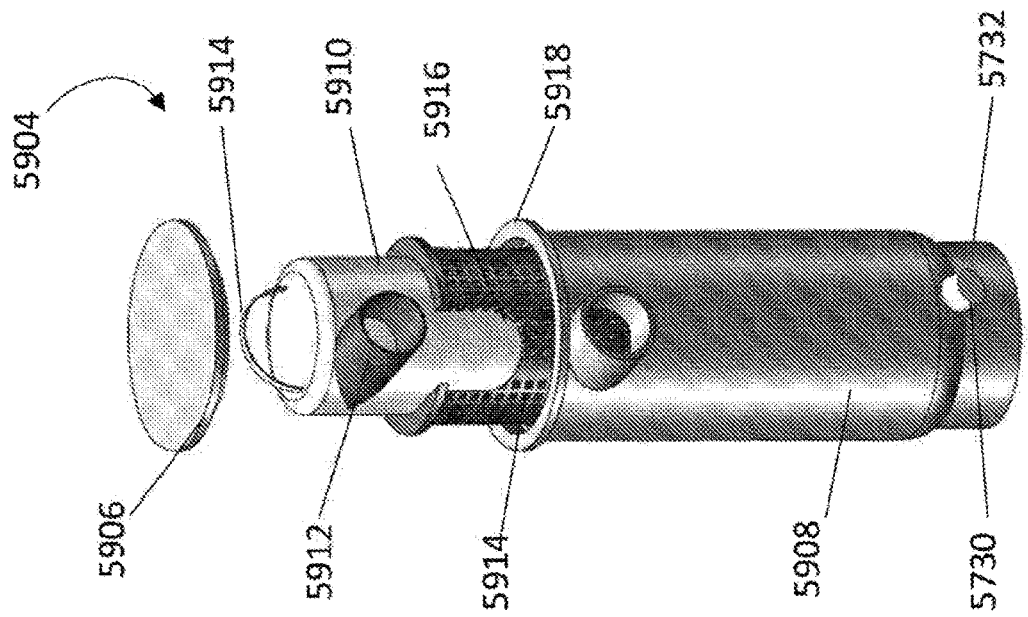
FIG. 60 is a cross sectional and partially exploded view of a backwash filter according to one embodiment of the invention.
Figure 59:
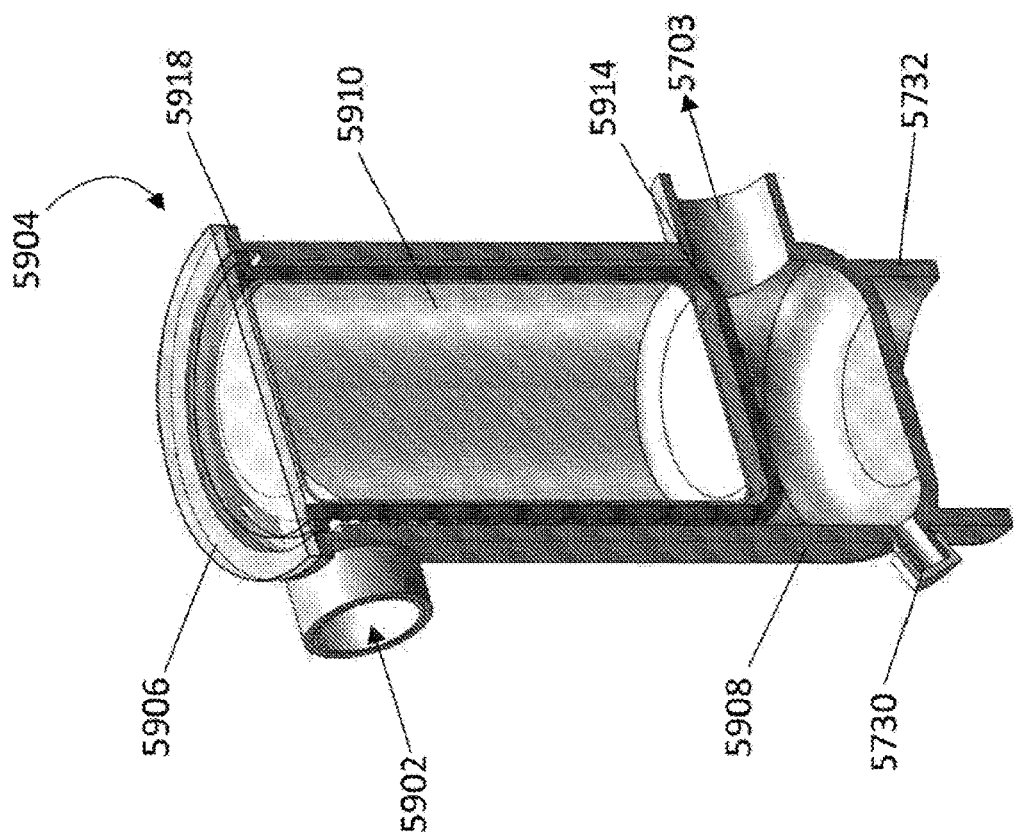
FIG. 59 is a perspective view of a backwash filter according to one embodiment of the invention.

FIGS. 59-60 show another configuration of the backwash filter 5904 that is consistent with various embodiments of the invention. The backwash filter 5904 attenuates fluid turbulence and the fluid hammer effect by directing an inlet fluid 5902 through a tortuous path. The backwash filter 5704 includes similar components described above as well as some modified or additional components. The backwash filter 5904 includes a filter top 5906, a filter bottom 5908, a drain port 5730, and a stand 5732.

A strainer 5914 is coaxially disposed within the filter bottom 5908 and includes a filter bag 5910 that lines the inside surface of the strainer 5914. In some embodiments, the filter bag 5910 includes a fluid inlet port 5912 and a foldable handle 5914. The fluid inlet port 5912 is configured to extend through an aperture 5916 in the strainer 5914 and to be coaxially received by the inlet fluid 5902 positioned on the filter bottom 5908. The backwash filter 5904 also includes a filter top 5906. In some embodiments, the filter top 5906 is a disk that is secured on a top radial flange 5918 of the filter bottom 5908.

FIGS. 61-62 show another configuration of a backwash filter 6104. The backwash filter 6104 attenuates fluid turbulence and the fluid hammer effect by directing an inlet fluid 6102 through a tortuous path. The backwash filter 6104 includes a filter top 6106, a filter bottom 6108, a drain port 5730, and a stand 5732.

The filter bottom 6108 includes a fluid inlet 6102 connected by a top radial flange 6118 that places the filter top 6106 in fluid communication with the filter bottom 6108. A strainer 6114 is coaxially disposed within the filter bottom 6108 and includes a filter bag 6110 that lines the inside surface of the strainer 6114. The filter top 6106 includes a dome portion 6107 that assists in reducing the turbulence of the fluid entering the filter bag 6110. In some embodiments, the filter bag 6110 and the strainer 6114 are threadably engaged to the filter bottom 6108. Gaskets 6122 can be configured within the backwash filter 6104 to form liquid tight seals. In some embodiments, a clamp 6120 can be used to secure the filter top 6106 to the filter bottom 6108.

Backwash Filter with Quick Release Mechanism

Figure 64:
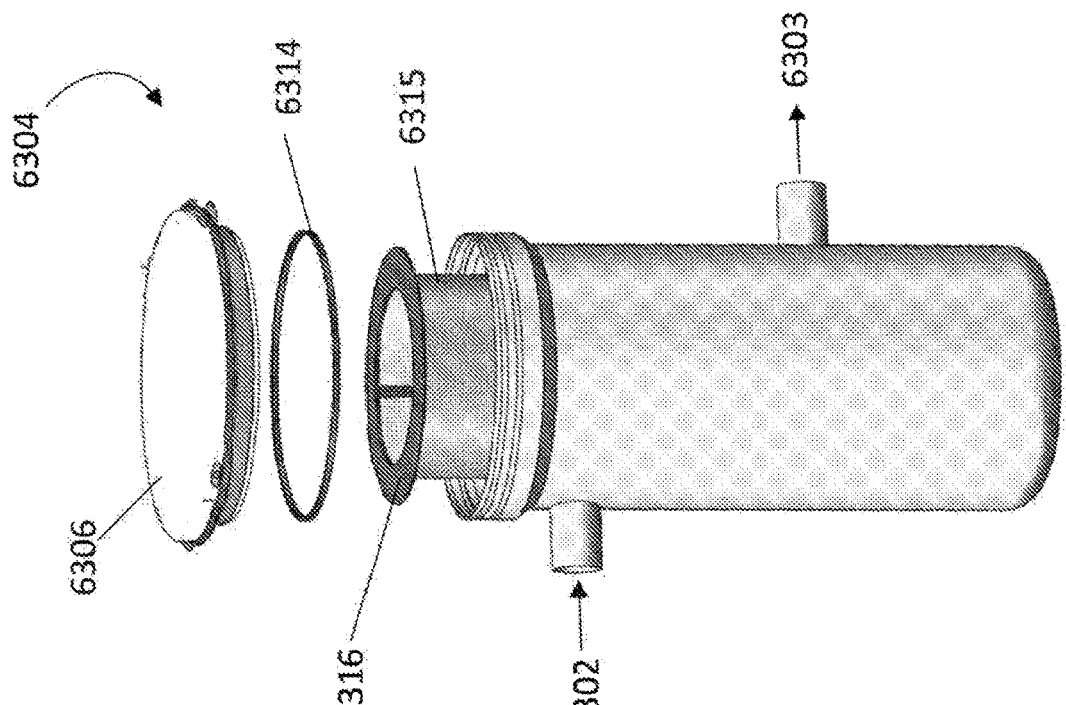
FIG. 64 is a cross sectional and partially exploded view of a backwash filter according to one embodiment of the invention.
Figure 63:
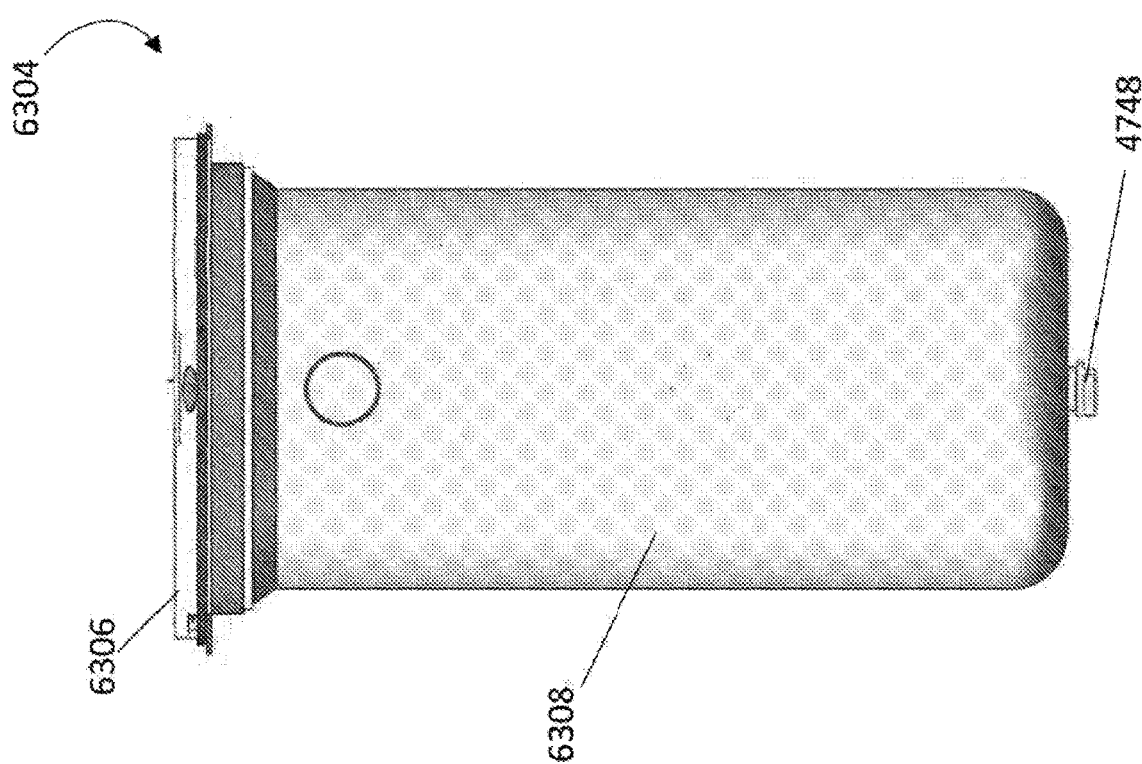
FIG. 63 is a front view of a backwash filter according to one embodiment of the invention.

FIGS. 63-64 show another configuration of a backwash filter 6304. The backwash filter 6304 includes a filter top 6306 that facilitates the removal of a filter bag 6315 during maintenance. The backwash filter 6304 includes a filter bottom 6308 configured with a fluid inlet 6302, a fluid outlet 6303, a filter top 6306, and a drain port 4748.

As shown in FIG. 64, the backwash filter 6304 further includes a filter 6315 that is coaxially disposed and longitudinally extends within the filter bottom 6308. In some embodiments, the filter 6315 includes a top radial flange 6316 that couples to the internal surface of the filter bottom 6308. A gasket 6314 can be configured to the top radial flange 6316 to provide a liquid-tight seal. A strainer used in any of the previous embodiments could also be implemented to provide support for the filter 6315.

Figure 66:
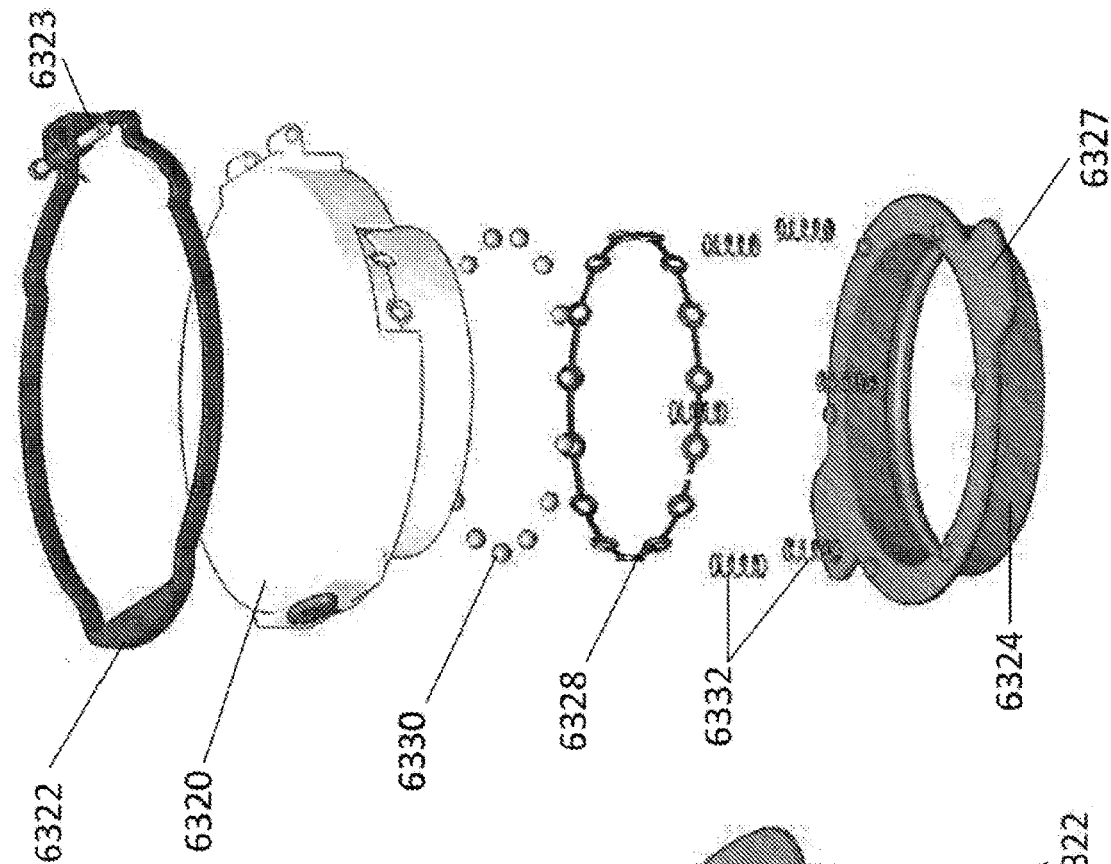
FIG. 66 is a cross sectional and partially exploded view of a filter top for a backwash filter according to one embodiment of the invention.
Figure 65:
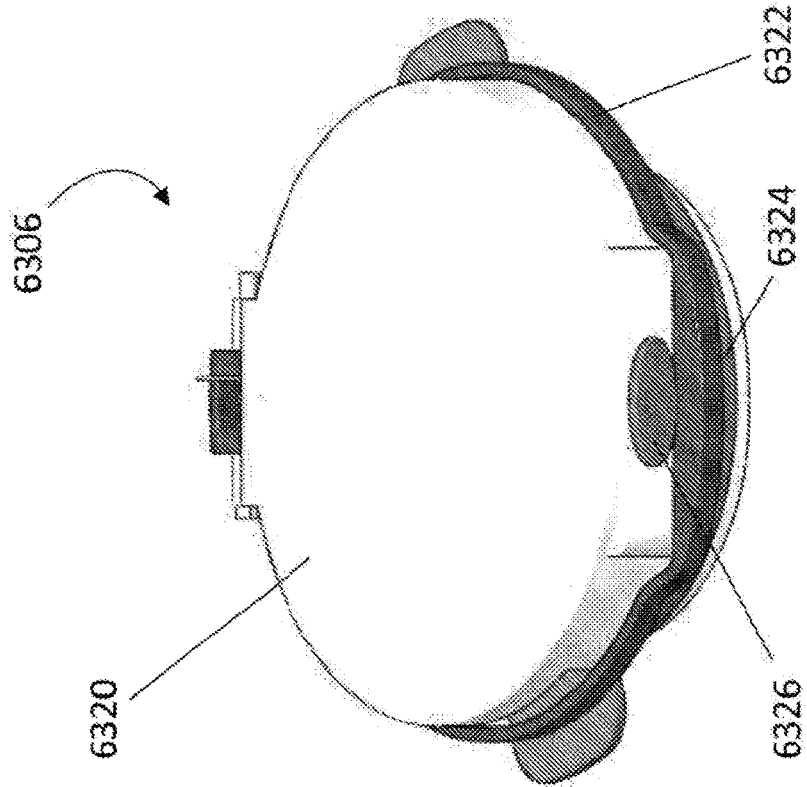
FIG. 65 is a perspective view of a filter top for a backwash filter according to one embodiment of the invention.

FIGS. 65-66 show that the filter top 6306 also includes a housing 6320, a locking member 6322, a slide 6324, and an engaging member 6326. In some embodiments, the filter top 6306 further includes a retaining ring 6328, one or more pressing member 6330, and one or more elastic member 6332, and a hinge joint 6323.

As shown in FIGS. 67-68, the housing 6320 also includes a cylindrical body 6334 that extends longitudinally between a top plate 6336 and a bottom face 6335. The top plate 6336 radially extends beyond the cylindrical body 6334, and further includes a turned down portion 6338. In some embodiments, the locking member 6322 is an annular ring that is connected to the hinge joint 6323 on the external surface of the turned down portion 6338. The locking member 6322 is configured to pivot along the external surface of the housing 6320, and can engage with radial flanges 6327 that extend from the slide 6324. In some embodiments, the slide 6324 is a cylinder configured around the external surface of the main cylindrical body 6334. The one or more elastic members 6332 secure the slide 6324 within the housing 6320 by connecting the top surface of the slide 6324 to the top plate 6336. In some embodiments, the one or more pressing members 6330 are spheres that protrude from the outside surface of the main cylindrical body 6334. The one or more pressing members 6330 are secured to the cylindrical body using the retainer ring 6328. The slide 6324 includes a recess 6340 that is configured to receive the one or more pressing member 6330.

FIGS. 67-68 show the operation of the filter top 6306 of FIGS. 65-66 in the locked condition. In order to lock the top filter 6306, the locking member 6322 is pulled downward to engage the radial flange 6327 of the slide 6324. As the slide 6324 moves down the cylindrical body 6334, the one or more pressing members 6330 force the top of the slide 6324 to project outwards. As a result, the bottom end of the slide 6324 forces the cylindrical body 6334 inward to secure the filter top 6306 to the backwash filter 6304. The filter top can be secured in the locked position by pulling the locking member 6322 over the engaging member 6326. In some embodiments, the engaging member 6326 is a push button.

Figure 70:
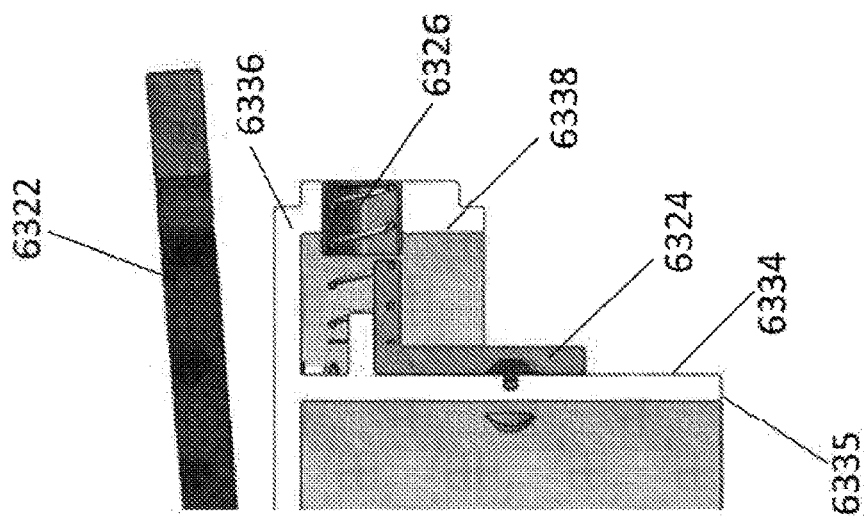
FIG. 70 is a cross sectional view of a filter top for a backwash filter according to one embodiment of the invention.
Figure 69:
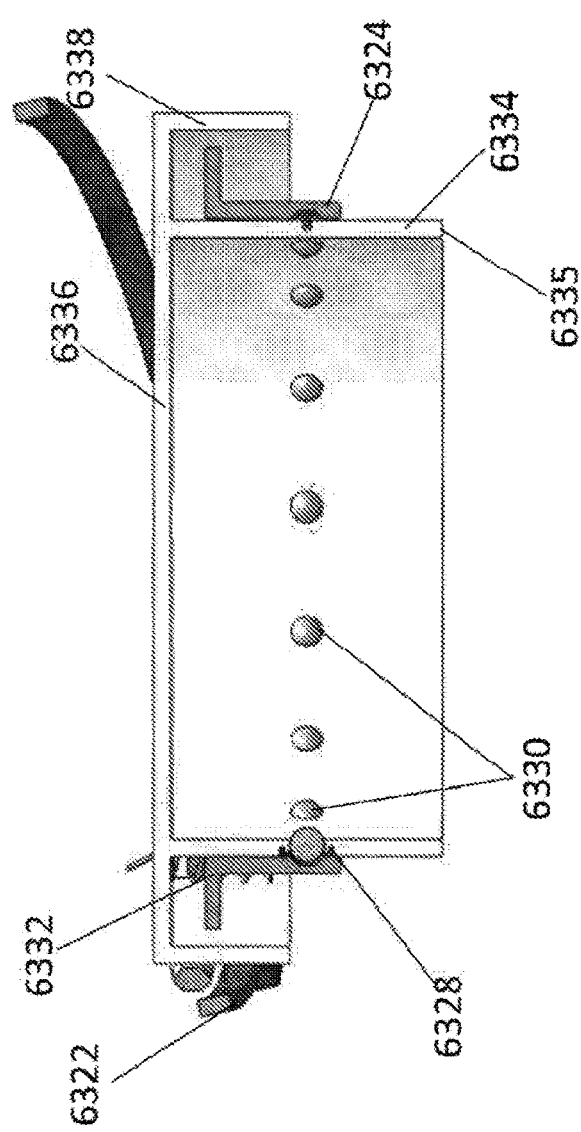
FIG. 69 is a cross sectional view of a filter top for a backwash filter according to one embodiment of the invention.

FIGS. 69-70 show the operation of the filter top 6306 in the open condition. The filter top 6306 is opened by first pressing the engaging member 6326, and pulling the locking member 6322 upward. As the locking member 6322 is moved upward, the one or more elastic members 6332 force the slide 6324 upward until the one or more pressing members 6330 are received by the recess 6340 in the slide 6324. As a result, the inward force on the cylindrical body 6334 is removed, and the filter top 6306 can be opened for the removal of the filter 6315 or maintenance.

Backwash Filters with Debris Compacting Features

Figure 71:
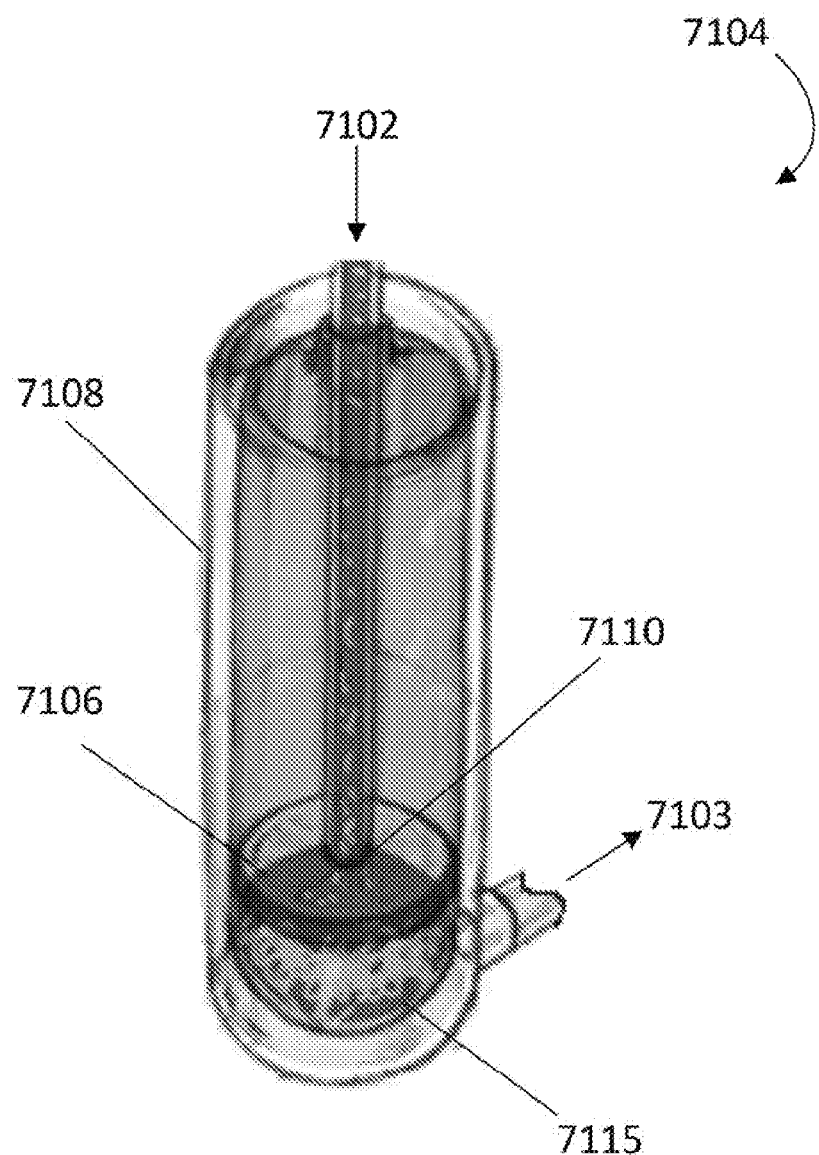
FIG. 71 is a perspective view of a backwash filter according to one embodiment of the invention.

FIG. 71 shows a configuration of a backwash filter 7104. The backwash filter 7104 includes a debris compactor 7106. In some embodiments, the debris compactor 7106 acts to extend the lifetime of the backwash filter 7104 between maintenance cycles. All of the embodiments disclosed below for the debris compactor can be used alone or in combination with any of the preceding backwash filter embodiments.

The backwash filter 7104 includes a cylindrical body 7108 configured with a fluid inlet 7102, a fluid outlet 7103, a filter 7115, and a debris compactor 7106. In some embodiments, the fluid inlet 7102 is configured on the top portion of the cylindrical body 7108. In some embodiments, the filter 7115 is configured to coaxially extend through the fluid inlet 7102, and longitudinally extend the length of the cylindrical body 7108. In some embodiments, the debris compactor 7106 is an annular plate that extends the internal diameter of the cylindrical body 7108 and is configured to slide axially. The debris compactor 7106 includes a central aperture 7110 configured to receive the filter bag 7115. During operation, the debris compactor 7106 rests along the top, inside surface of the cylindrical body 7108 until the controller 115 (shown in FIG. 1) detects that the filter 7115 is sufficiently full of debris. In some embodiments, the controller 115 uses turbidity of the fluid as a control parameter. The debris compactor 7106 is then displaced axially to compact the debris. Once the debris has been compacted, the debris compactor 7106 returns to a rest position.

Figure 72:
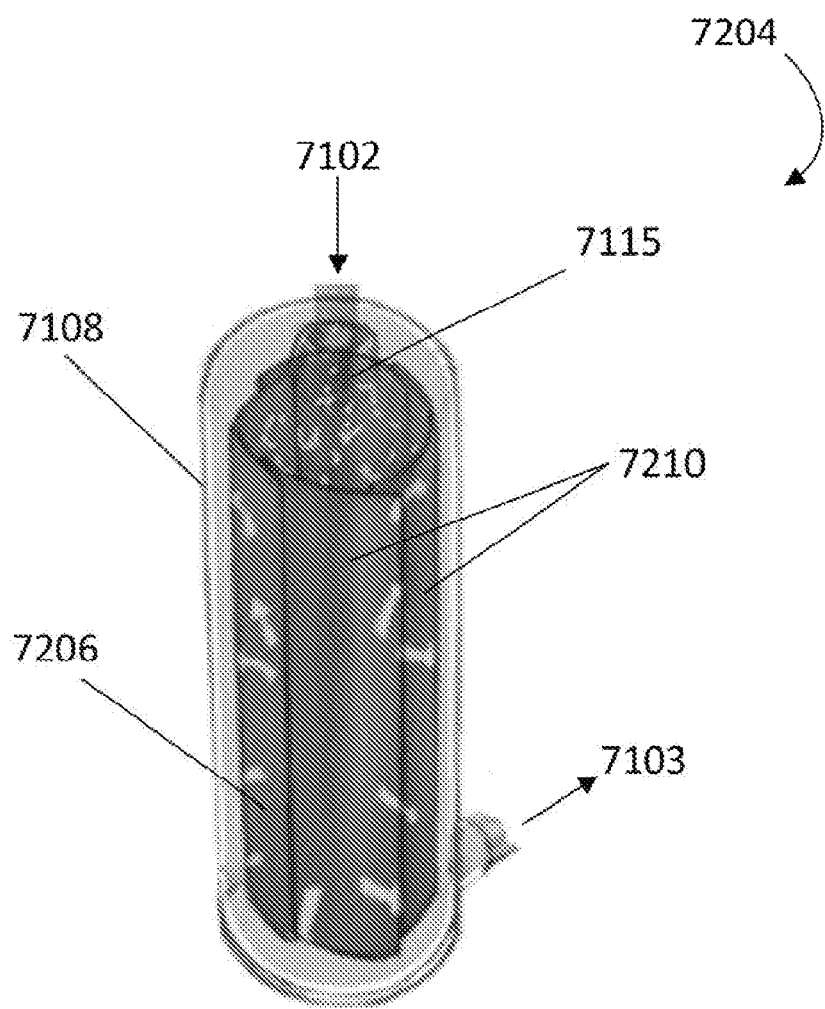
FIG. 72 is a perspective view of a backwash filter according to one embodiment of the invention.

FIG. 72 shows a configuration of a backwash filter 7204. The backwash filter 7204 includes a debris compactor 7206. In some embodiments, the debris compactor 7206 includes several filter sheets 7210 that are configured to form an axial cylinder around the filter 7115 within the cylindrical body 7108. During operation, the debris compactor 7206 rests along inside surface of the cylindrical body 7108 until a controller 115 (shown in FIG. 1) detects that the filter 7115 is sufficiently full of debris. In some embodiments, the controller 115 uses turbidity of the fluid as a control parameter. The debris compactor 7206 is then displaced radially to compact the debris. Once the debris has been compacted, the debris compactor 7206 returns to the rest position.

Figures 73, 74:
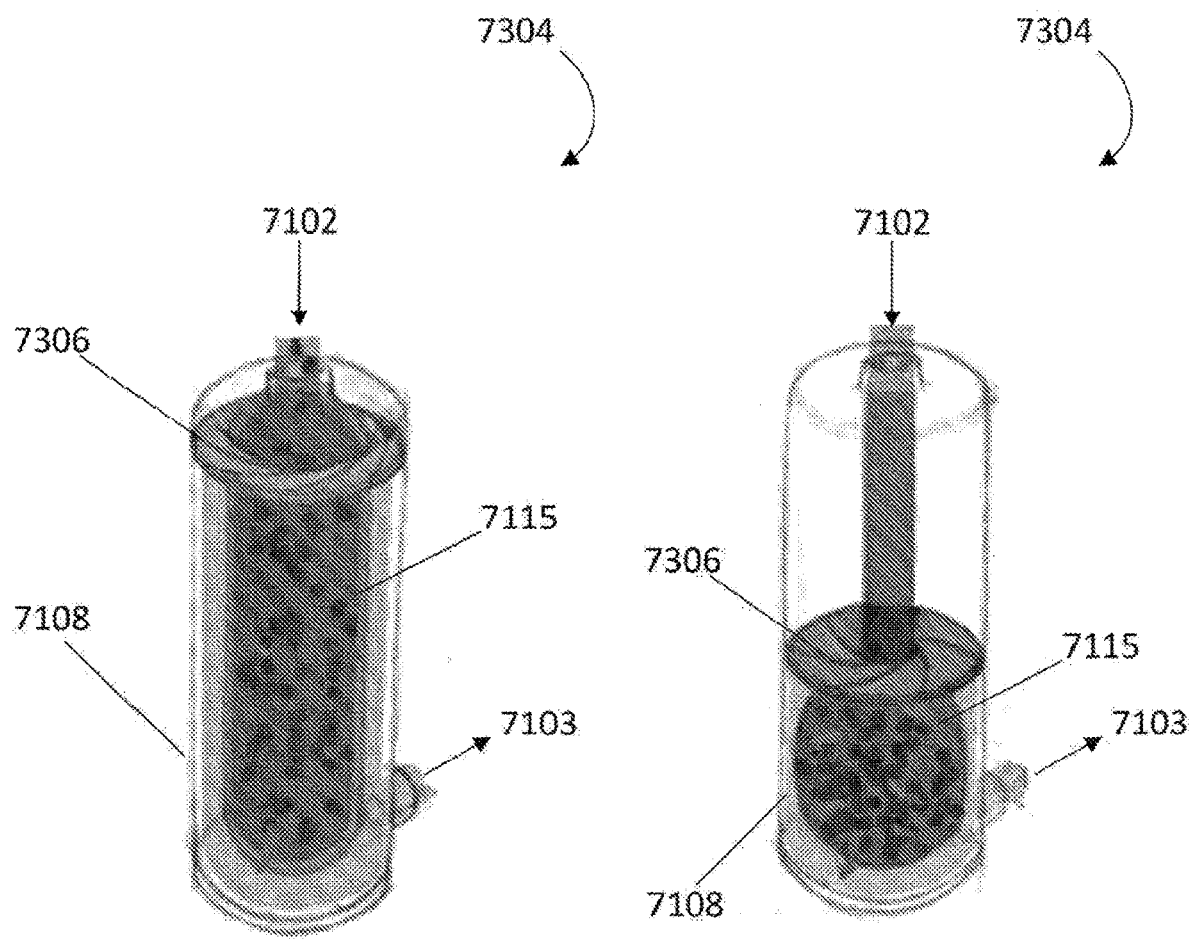
FIG. 73 is a perspective view of a backwash filter according to one embodiment of the invention.
FIG. 74 is a perspective view of a backwash filter according to one embodiment of the invention.

FIGS. 73-74 shows a configuration of a backwash filter 7304. The backwash filter 7304 includes a debris compactor 7306. In some embodiments, the debris compactor 7306 includes is annular disk that is configured around the filter bag 7115. The debris compactor 7306 is also configured to actuate radially to squeeze the filter bag 7115 and to slide axially to compact the debris within the cylindrical body 7308. During operation, the debris compactor 7306 rests along the top, inside surface of the cylindrical body 7108 until a controller 115 (shown in FIG. 1) detects that the filter 7315 is sufficiently full of debris. In some embodiments, the controller 115 uses turbidity of the fluid as a control parameter. The debris compactor 7306 then actuates radially to squeeze the filter bag, and is displaced axially to compact the debris. Once the debris has been compacted, the debris compactor 7306 returns to a rest position.

Figure 75:
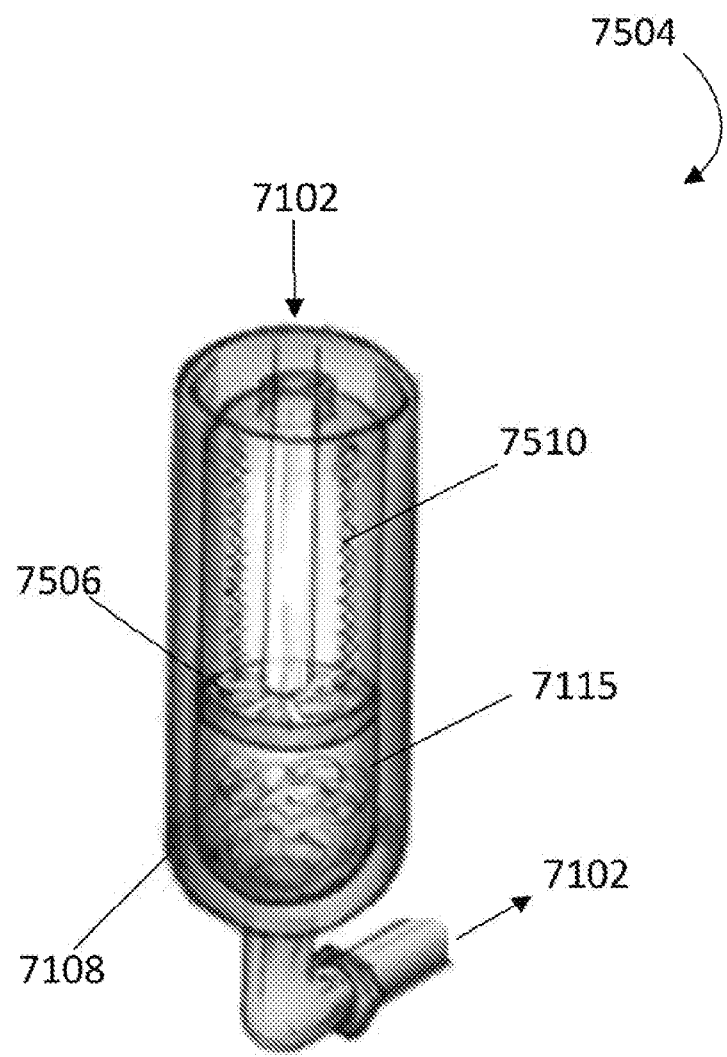
FIG. 75 is a perspective view of a backwash filter according to one embodiment of the invention.

FIG. 75 shows a configuration of a backwash filter 7504. The backwash filter 7504 includes a debris compactor 7506. In some embodiments, the debris compactor 7506 is an annular disk that is configured within the filter 7115. The debris compactor 7506 is also configured to slide axially to compact the debris within the filter 7115. In some embodiments, a spring press 7510 may be used to actuate the debris compactor 7506 to slide axially. During operation, the debris compactor 7506 rests along the top, inside surface of the cylindrical body 7108 until a controller 115 (shown in FIG. 1) detects that the filter 7115 is sufficiently full of debris. In some embodiments, the controller 115 uses turbidity of the fluid as a control parameter. The debris compactor 7506 then actuates axially to compact the debris. Once the debris has been compacted, the debris compactor 7506 returns to a rest position.

Figure 76:
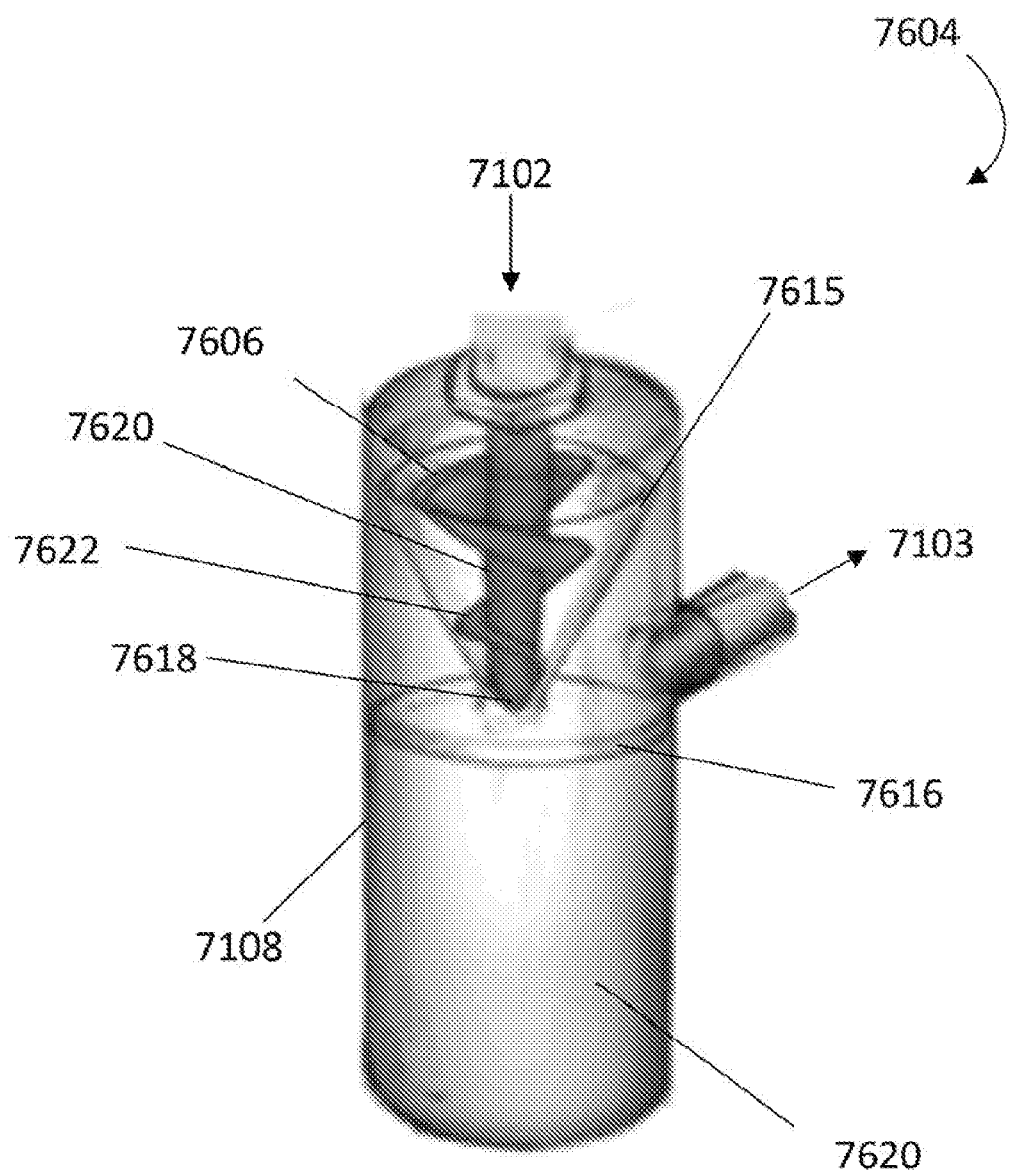
FIG. 76 is a perspective view of a backwash filter according to one embodiment of the invention.

FIG. 76 shows a configuration of a backwash filter 7604. The backwash filter 7604 includes a debris compactor 7606. In some embodiments, the debris compactor 7606 includes an auger 7620 configured to rotate along the internal surface of a filter 7615. The filter 7615 is further configured to a base 7716 that extends the internal diameter of the cylindrical body 7108. In some embodiments, the filter 7615 is a static mesh screen configured in a conical shape, where the round base of the static mesh screen filter is connected to the upper portion of the cylindrical body 7108 and tapers to a mastication outlet 7618 at the base 7616. The base 7616 further includes a debris bag 7620 that extends from the peripheral edge of the base 7620 to the bottom of the cylindrical body 7108. The auger 7620 includes several blades 7622 that are configured along the internal surface of the filter 7615 so that debris can be compacted and crushed along the surface of the static mesh screen.

During operation, the debris compactor 7606 rotates within the filter 7615 to crush and compact debris along the internal surface of the filter 7615, while filtered fluid passes through the sieve in the filter 7615. The debris continues to be crushed and compacted as it travels downwards along the filter 7615 until the debris reaches the mastication outlet 7618 at the central point of the filter 7615 where crushed debris is transferred to the debris bag 7620.

Figure 78:
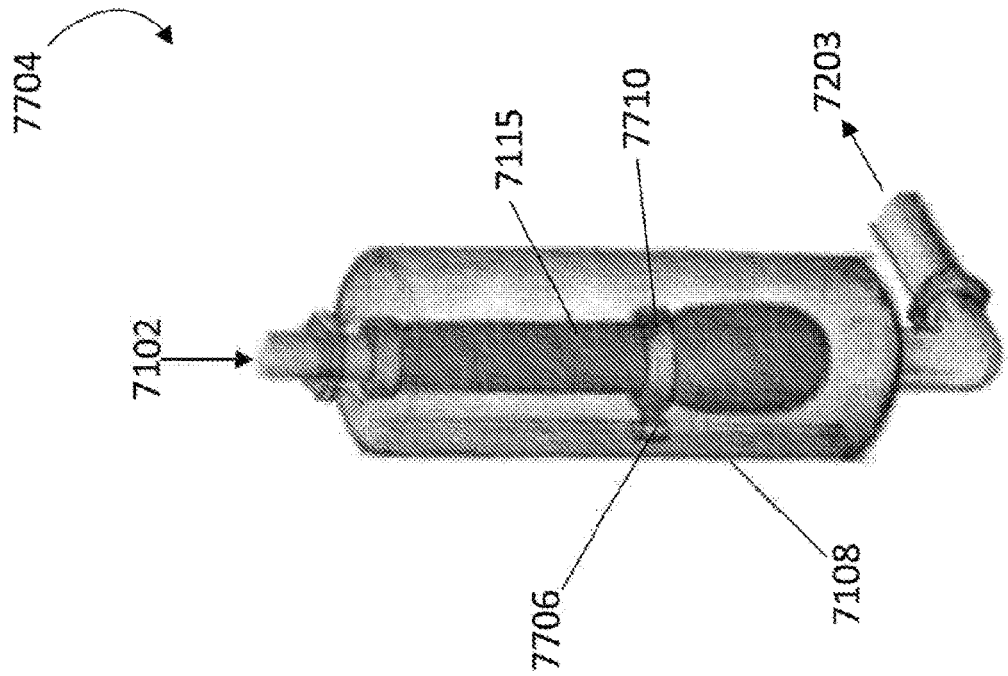
FIG. 78 is a perspective view of a backwash filter according to one embodiment of the invention.
Figure 77:
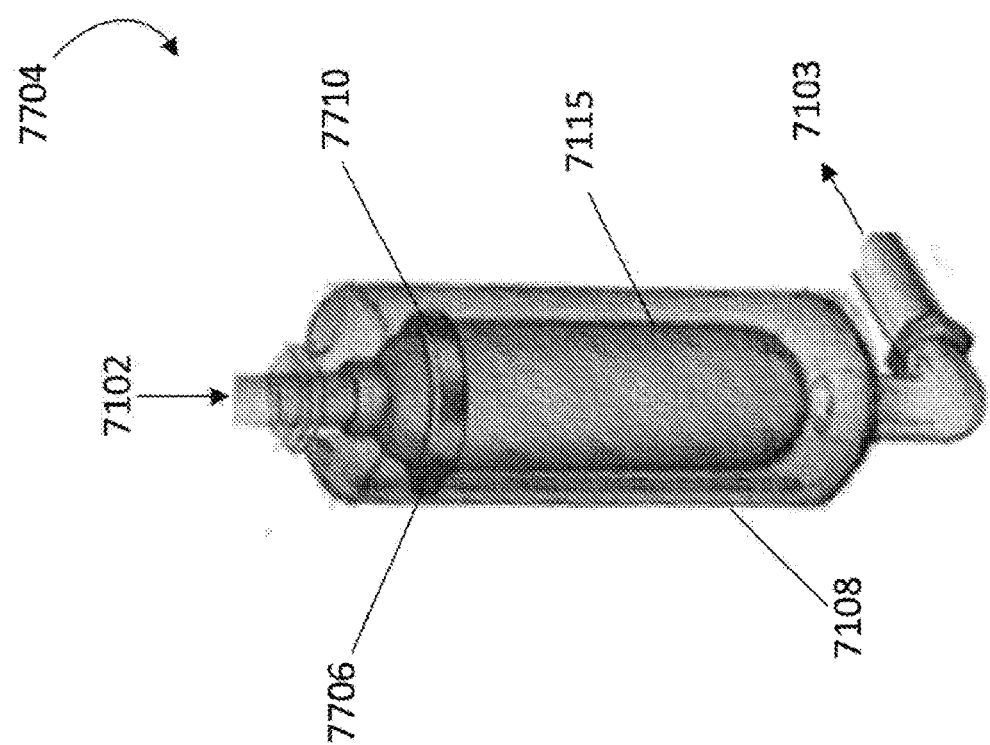
FIG. 77 is a perspective view of a backwash filter according to one embodiment of the invention.

FIGS. 77-78 shows a configuration of a backwash filter 7704. The backwash filter 7704 includes a debris compactor 7706. The debris compactor 7706 includes a clamp 7710 that is configured around the filter 7115. The debris compactor 7706 is also configured to actuate radially to squeeze the filter 7115, and to slide axially to compact the debris within the cylindrical body 7108. During operation, the debris compactor 7706 rests along the top, inside surface of the cylindrical body 7108 until the controller 115 (shown in FIG. 1) detects that the filter 7115 is sufficiently full of debris. In some embodiments, the controller 115 uses turbidity of the fluid as a control parameter. The debris compactor 7706 then actuates radially to squeeze the filter bag, and is further displaced axially to compact the debris. Once the debris has been compacted, the debris compactor 7706 returns to the rest position.

Water Circulation Unit—Filter System

For some filter applications, such as pool filtration, the current state of the art requires large filter tanks that take up appreciable space and require disassembly of the filter tank for manual cleaning or replacement of the filter. As will be detailed below, certain embodiments of the invention can provide an energy-efficient filter system that takes up minimal space, and results in a substantially no-fluid-loss cleaning cycle. The filter system further provides a simplified method of replacing the backwash filter during maintenance.

Figure 80:
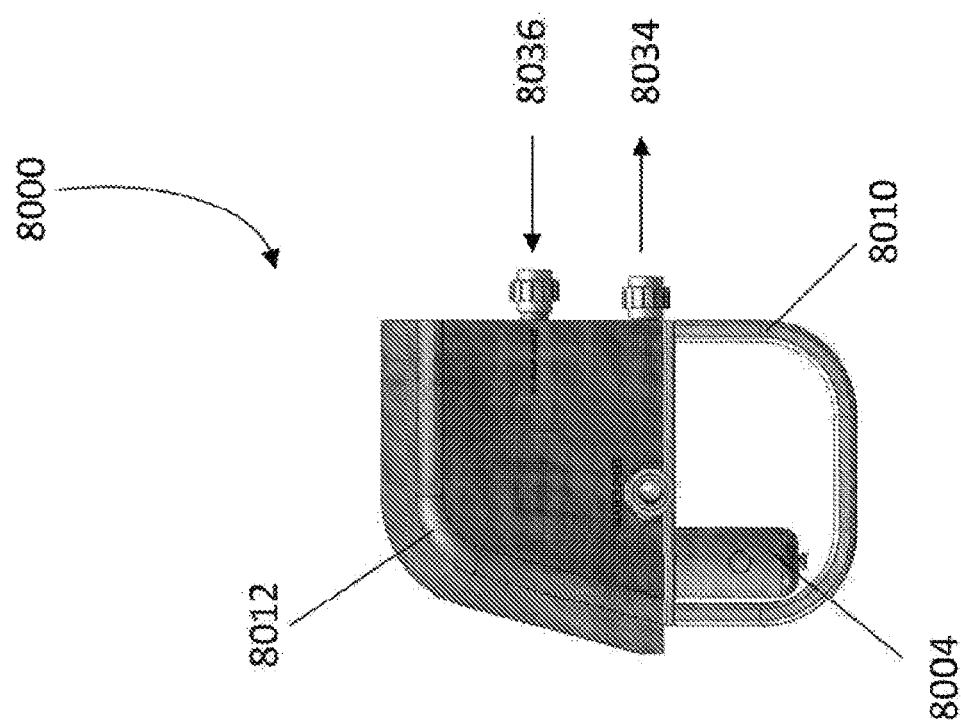
FIG. 80 is a side view of a filter system according to one embodiment of the invention.
Figure 79:
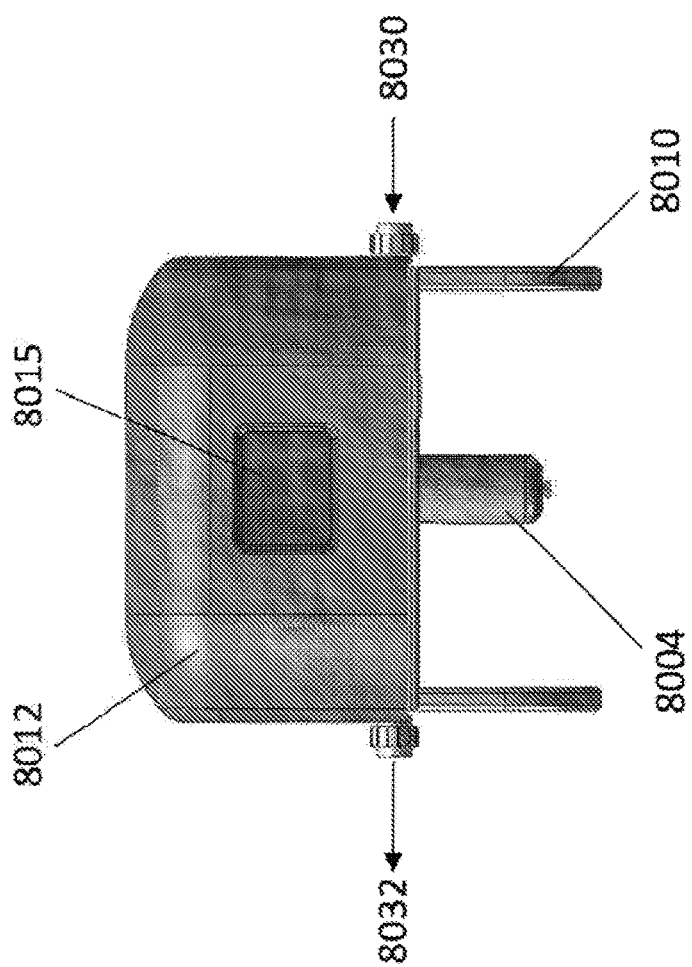
FIG. 79 is a front view of a filter system according to one embodiment of the invention.
Figure 81:
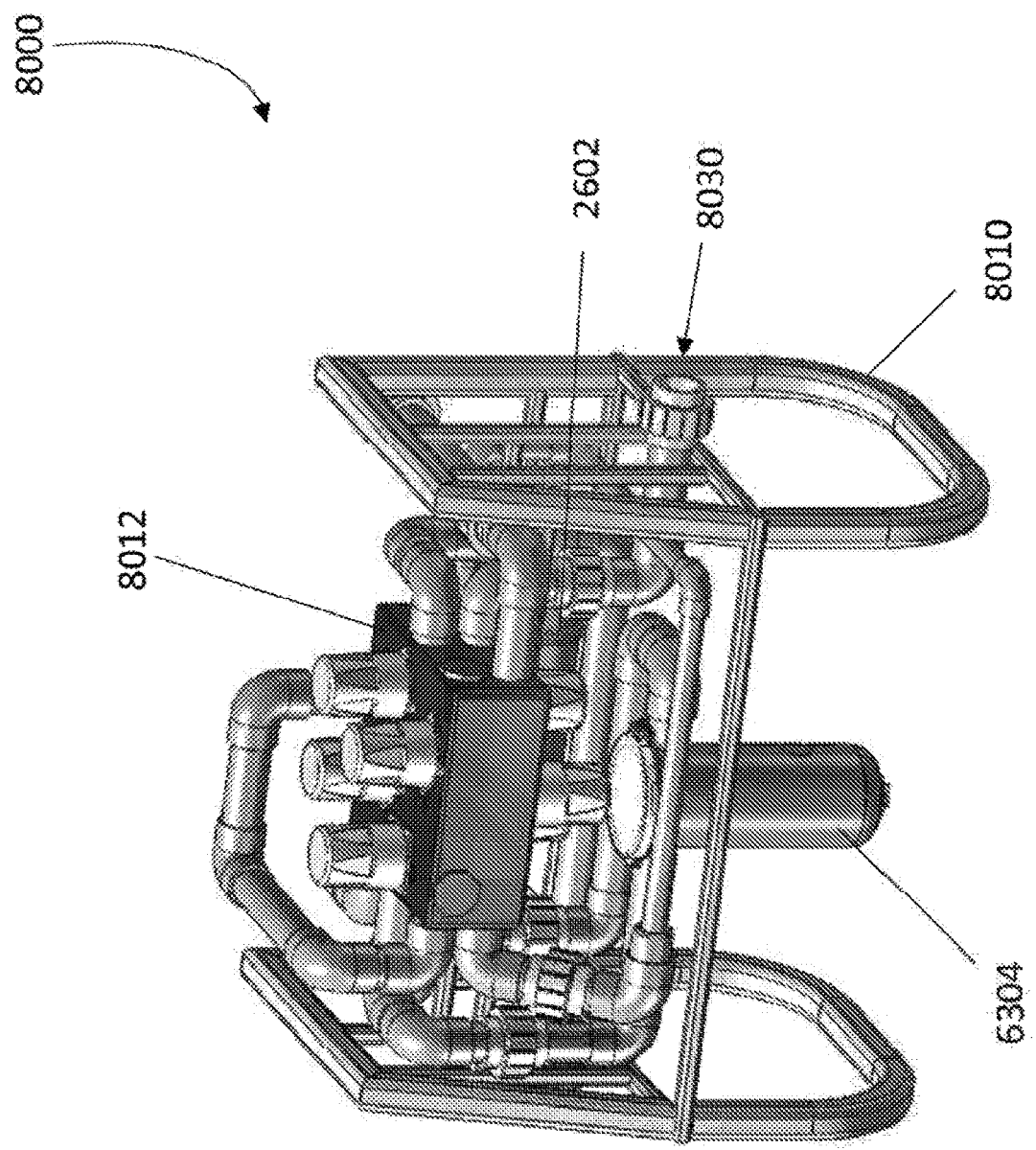
FIG. 81 is a perspective view of a filter system according to one embodiment of the invention.

FIGS. 79-80 show a configuration of a filter system 8000. The filter system 8000 includes a skid 8010 that provides support for the system, and a shroud 8012 that is configured with a controller 8015, a fluid inlet 8030, a fluid outlet 8032, a pump inlet 8034, and a pump outlet 8036. FIG. 81 shows that the filter system 8000 further includes a primary filter 2602, a backwash filter 6304, a sensor 107 (as shown in FIG. 1), and a fluid circulation unit 8012. In some embodiments, the controller 8015 is in electrical communication with the fluid circulation unit 8012 to direct the flow of fluid between a cleaning cycle, a purge cycle, and a backwash cycle. The controller 8015 can further be in electrical communication with the sensor 107, the primary filter 2602, and the backwash filter 6304.

Figure 82:
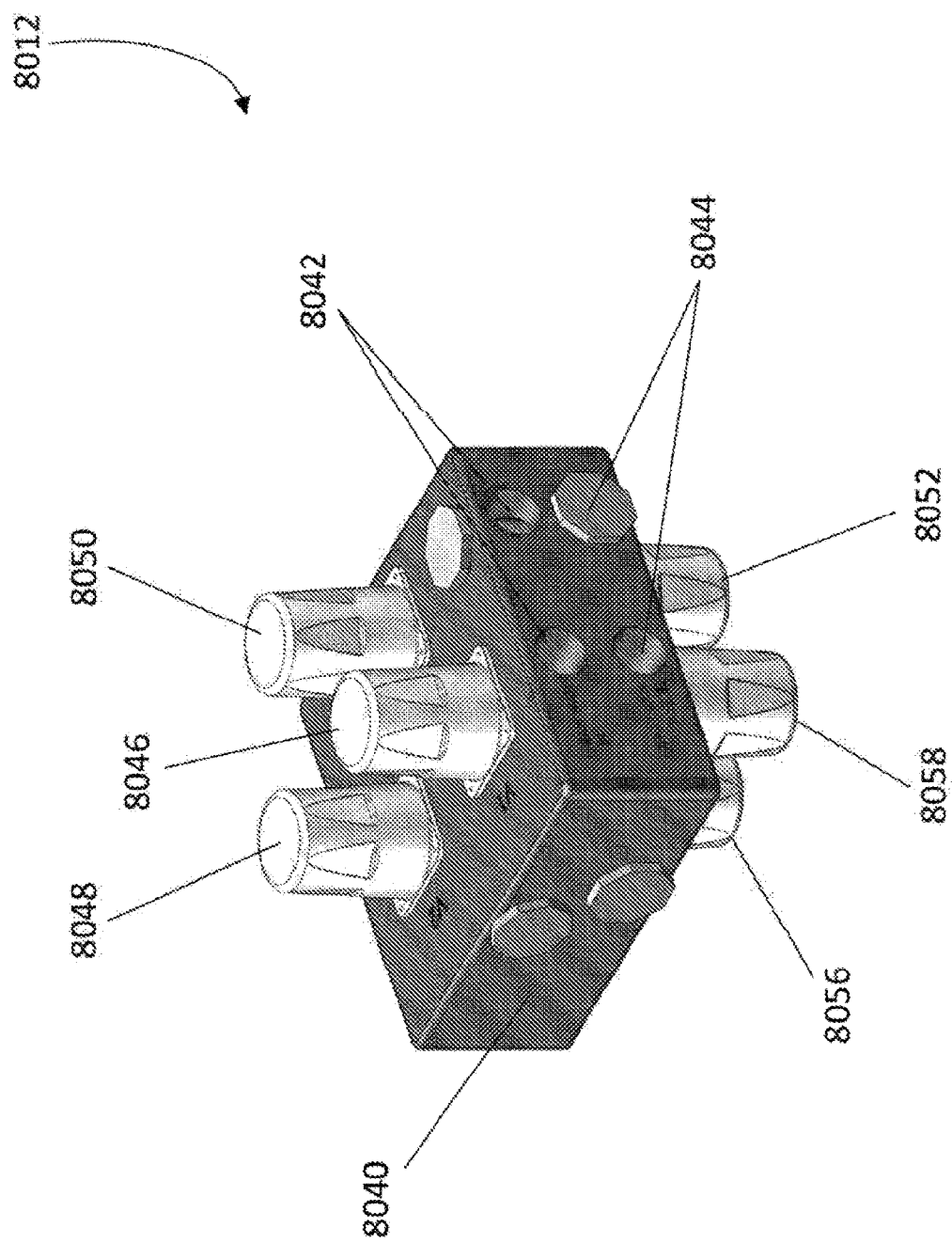
FIG. 82 is a perspective view of a fluid circulation unit according to one embodiment of the invention.

FIG. 82 shows the fluid circulation unit 8012 includes a housing 8040 configured with a first layer of connection ports 8042 and a second layer of connection ports 8044 that form channels that extend through the housing 8040. The housing 8040 is also configured with several diverter valves that control the direction of flow through the fluid circulation unit 8012. The diverter valves include substantially similar configurations and operation as those disclosed in FIGS. 8-9. In some embodiments, the first layer of connection ports 8042 are configured with a first diverter valve 8046, a second diverter valve 8048, and a third diverter valve 8050. In some embodiments, the second layer of connection ports 8044 are configured with a fourth diverter valve 8052, a fifth diverter valve 8054 (see FIG. 83), a sixth diverter valve 8056, and a seventh diverter valve 8058. The primary filter 2602, backwash filter 6304, and a pump 114 (as shown in FIG. 1) can be connected to the fluid circulation unit 8012 by external piping.

Figure 83:
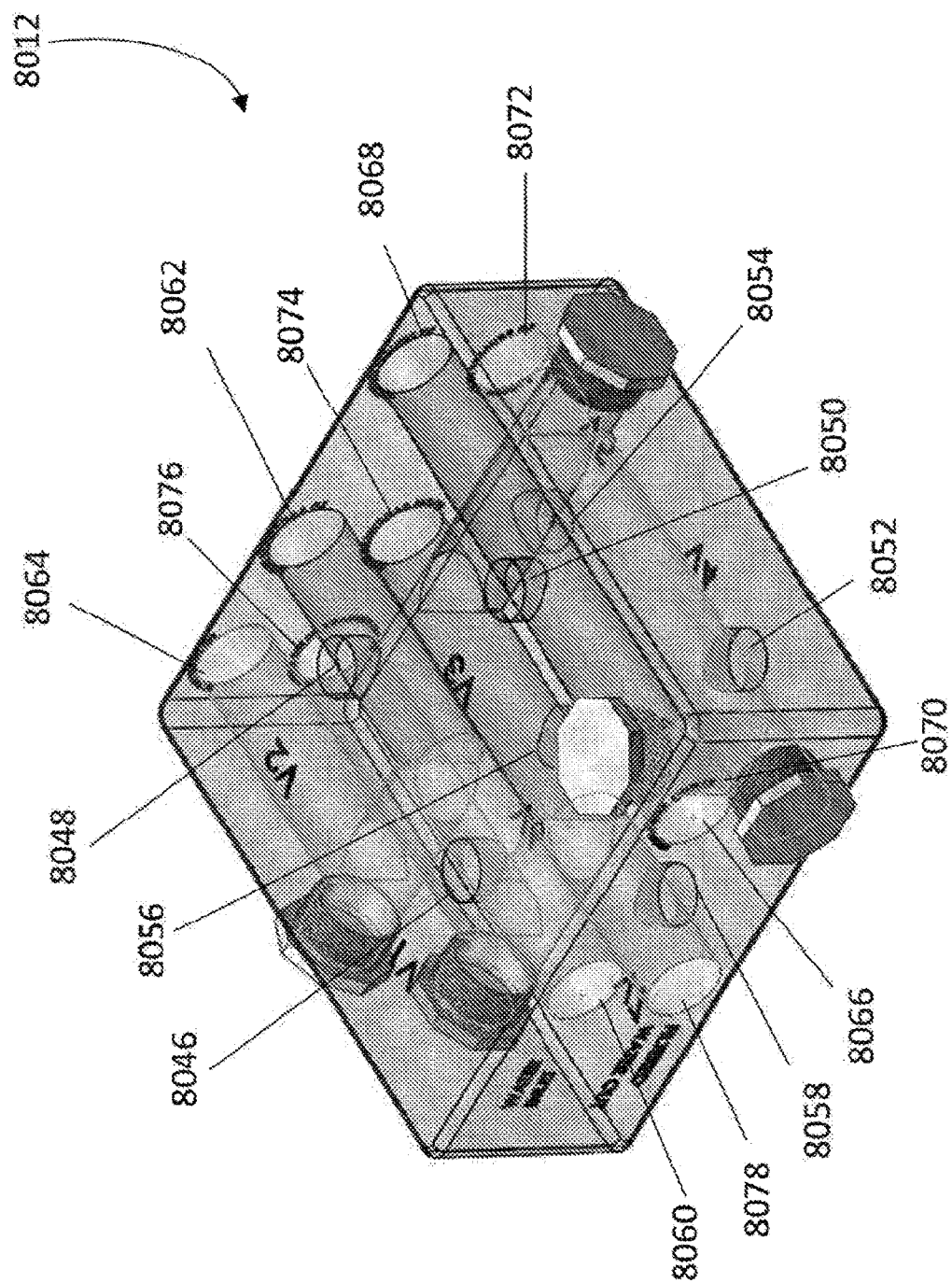
FIG. 83 is a perspective view of a fluid circulation unit according to one embodiment of the invention.

FIG. 83 shows the first layer of connection ports 8042 includes a fluid inlet port 8060 that is in fluid communication with a backwash filter outlet port 8062 and a pump inlet port 8064. The first diverter valve 8046 is configured in the fluid circulation unit 8012 to regulate the flow of fluid through the inlet port 8060, and the second diverter valve 8048 is configured to regulate the flow of fluid through the backwash port 8064. The first layer of connection ports 8042 further includes a pump outlet port 8066 that is in fluid communication with a primary filter backwash port 8068 and the second layer of connection ports 8044. The first and second layer of connection ports 8042 and 8044 are connected by an axial conduit 8070. The third diverter valve 8050 is configured to regulate the flow of fluid through the primary filter backwash port 8068.

In some embodiments, the fluid that passes through the axial conduit 8070 to the second layer of connection ports 8044 is first directed to a primary filter cleaning port 8072. The flow to the primary filter cleaning port 8072 is regulated by the fourth diverter valve 8052. In some embodiments, the primary filter cleaning port 8072 is also in fluid communication with a backwash filter inlet port 8074, and the flow to the backwash filter inlet port 8074 is regulated using the fifth diverter valve 8054. The backwash filter inlet port 8074 is further in fluid communication with a primary filter cleaning outlet port 8076 and fluid outlet port 8078. The flow between the backwash filter inlet port 8074 and the primary filter cleaning outlet port 8076 is regulated by the sixth diverter valve 8056, and the flow between the primary filter cleaning outlet port 8076 and the fluid outlet port 8078 is regulated by the seventh diverter 8058.

Two Piece Manifold Unit—Filter System

FIGS. 84-85 show another configuration of a filter system 8500. The filter system 8500 includes a housing 8510 that is configured with a controller 8515, a fluid inlet 8530, a fluid outlet 8532, a pump inlet 8534, and a pump outlet 8536. In some embodiments, the housing 8510 includes a removable lid 8512 that facilitates access to the backwash filter 6304.

Figure 87:
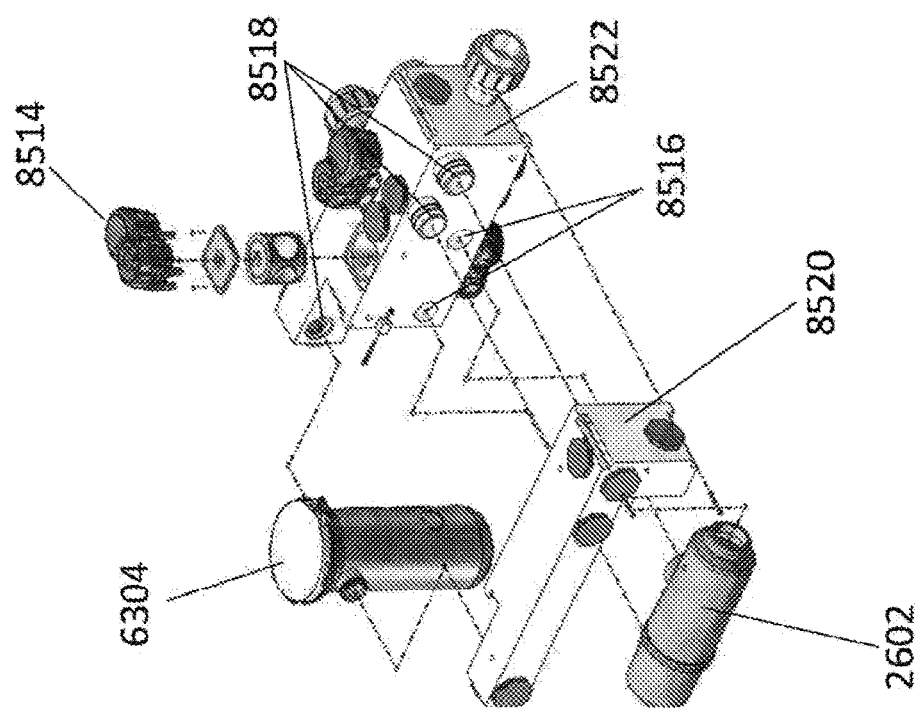
FIG. 87 is a partially exploded view of a filter system according to one embodiment of the invention.
Figure 86:
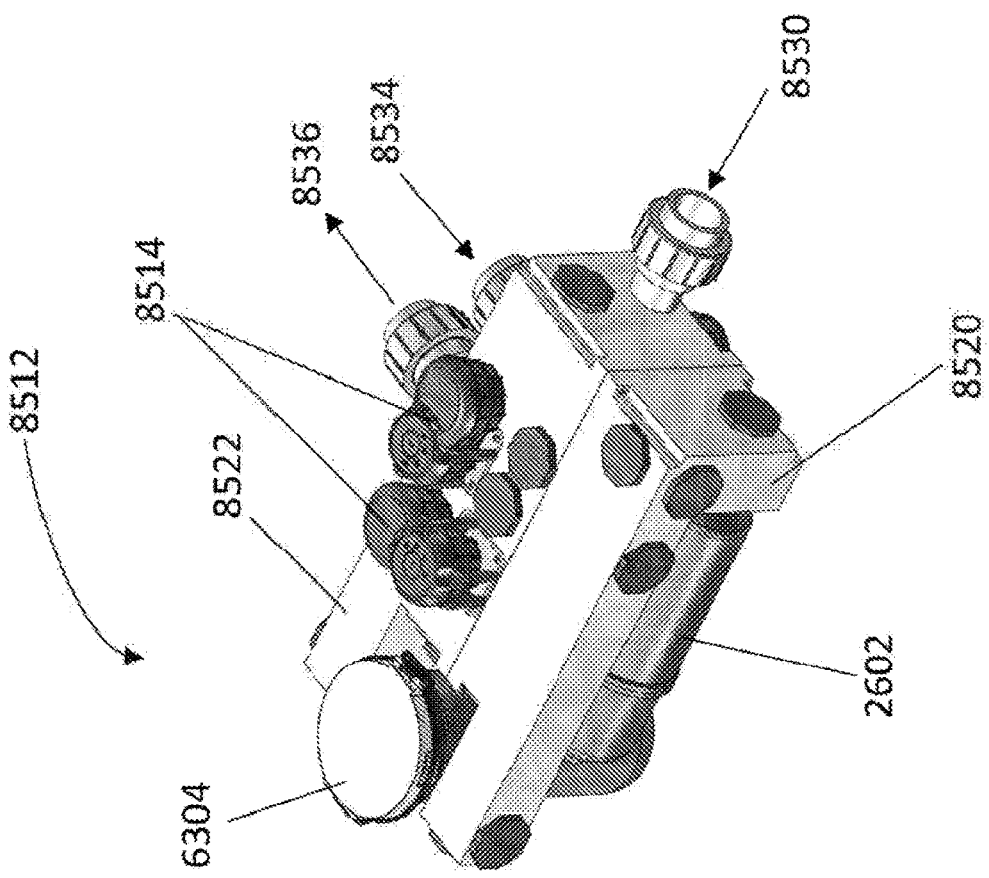
FIG. 86 is a perspective view of a filter system according to one embodiment of the invention.

FIGS. 86-87 show that the filter system 8500 further includes a manifold assembly 8512 that is coupled to the primary filter 2602, the backwash filter 6304, and the sensor 107 (shown in FIG. 1). The manifold assembly 8512 also includes at least one valve 8514 that includes similar components and operation as those disclosed in FIGS. 8-9. The valve 8514 is in electrical communication with the controller 8515 to control the direction of flow within the filter system 8500.

In some embodiments, the manifold assembly 8512 includes a first layer of fluid channels 8516 and a second layer of fluid channels 8518 that are configured between a first manifold 8520 and a second manifold 8522. The first manifold 8520 and the second manifold 8522 are configured to form a recess that receives the backwash filter 6304 so that the backwash filter 6304 is in fluid communication with the first layer of fluid channels 8518. The primary filter 2602 of the filter system 8500 is mounted along the bottom face of the first manifold 8520 to place the primary filter 2602 in fluid communication with the second layer of fluid channels 8516. In some embodiments, four self-actuating diverter valves are used to control the fluid flow through the manifold assembly 8512.

Figure 88:
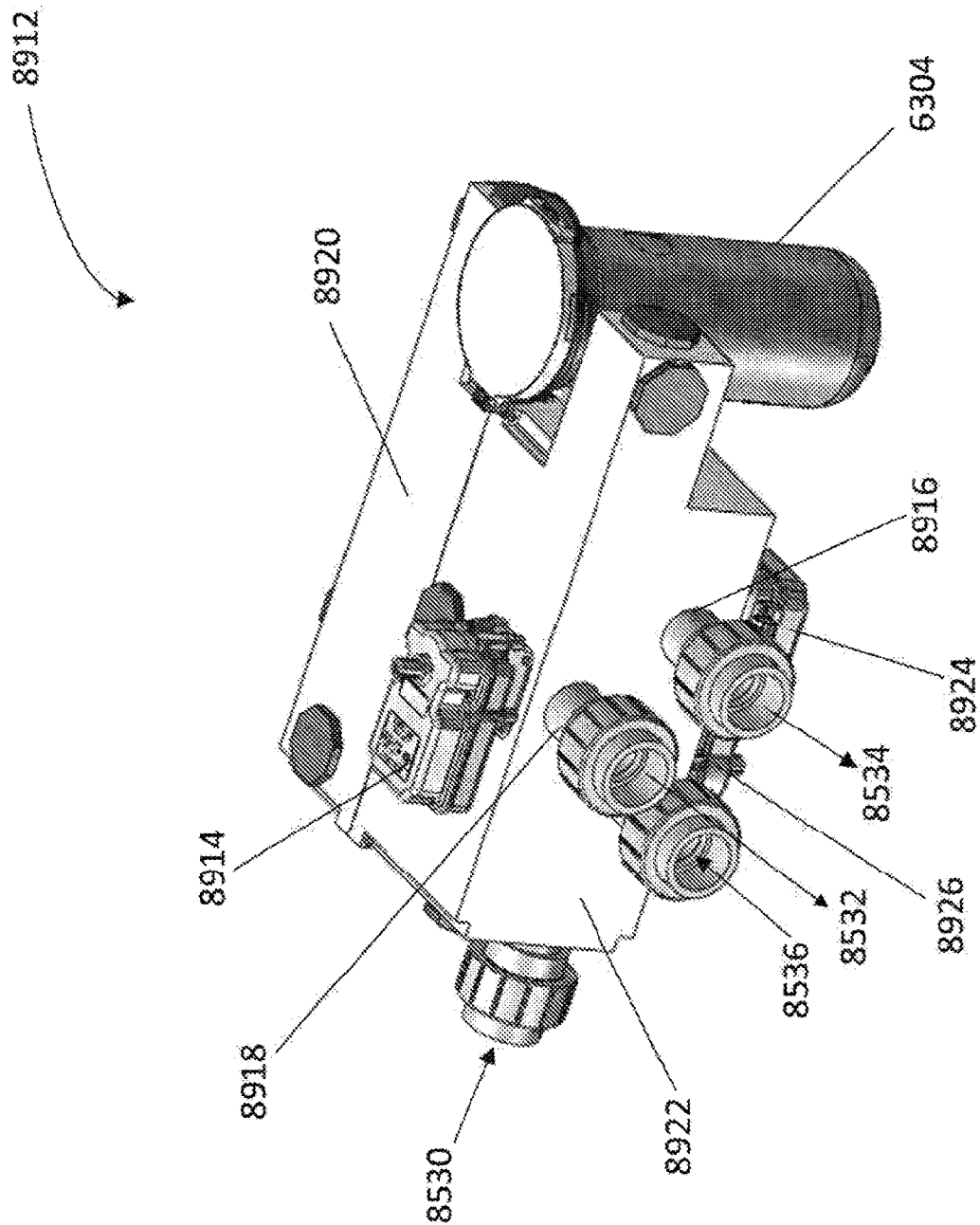
FIG. 88 is a perspective view of a filter system according to one embodiment of the invention.

FIG. 88 shows a similarly configured manifold assembly 8912. The manifold assembly 8912 includes a first layer of fluid channels 8918 and a second layer of fluid channels 8516 that are configured between a first manifold 8920 and a second manifold 8922. The flow through the first layer of fluid channels 8918 is controlled by a first diverter valve 8914 configured on the top face of the second manifold 8922. Similarly, the flow through the second layer of fluid channels 8516 is controlled by a second diverter valve 8924 and a third diverter valve 8926 configured on the bottom face of the second manifold 8922. The flow path through the manifold assembly 8912 is shown in FIGS. 89-90.

FIG. 89 shows the second layer of fluid channels 8916 that extend through the manifold assembly 8912. During the cleaning cycle, fluid containing debris enters the second layer of fluid channels 8916 through the fluid inlet 8530 where the second diverter valve 8924 then directs the flow to the pump inlet 8534. The fluid containing debris is transported to the pump 114 (shown in FIG. 1) and returns to the manifold assembly 8912 through the pump outlet 8536. The third diverter valve 8926 then directs the flow to the cleaning inlet 167 of the primary filter 2602. The fluid containing debris is filtered, and exits through the cleaning outlet 164. Clean fluid exiting the primary filter 2602 is transported from the first layer of fluid channels 8918 to the second layer of fluid channels 8916 by a first axial conduit 8920.

FIG. 90 shows the second layer of fluid channels 8516 that extend through the manifold assembly 8912. After the clean fluid is transported to the second layer of fluid channels 8916 by the first axial conduit 8920, the clean fluid is then directed by a first diverter valve 8914 to the fluid outlet 8532 and returned to the fluid source.

In order to transition from the cleaning cycle to the backwash cycle, the flow is first closed to the fluid inlet 8530 using the second diverter valve 8924. The third diverter valve 8926 then directs the fluid flow towards the backwash inlet 162 of the primary filter 2602, and the first diverter valve 8914 directs the fluid towards the fluid inlet 6302 of the backwash filter 6304. Although these steps are listed sequentially, the controller 8515 can execute these commands simultaneously.

During the backwash cycle, fluid is recirculated through the manifold assembly 8912 to transport debris that has become entrained on the primary filter 2602 to the backwash filter 6304. During operation, fluid enters the manifold assembly 8912 through the pump outlet 8536 where the third diverter valve 8918 directs the fluid towards the backwash inlet 162 of the primary filter 2602. Fluid then exits the primary filter 2602 through the backwash outlet 166 where it is transported from the first layer of fluid channels 8516 to the second layer of fluid channels 8518 through an axial second conduit 8922. Once in the second layer of fluid channels 8518 the fluid is directed to the backwash filter 6304 by a first diverter valve 8914. The fluid is filtered and returned to the first layer of fluid channels 8516 by a third axial conduit 8924. The fluid is then directed to the pump inlet 8534 by the second diverter valve 8916 so that it can be recirculated through the system.

Sanitation Member or UV Light in Primary Filter

Figure 91:
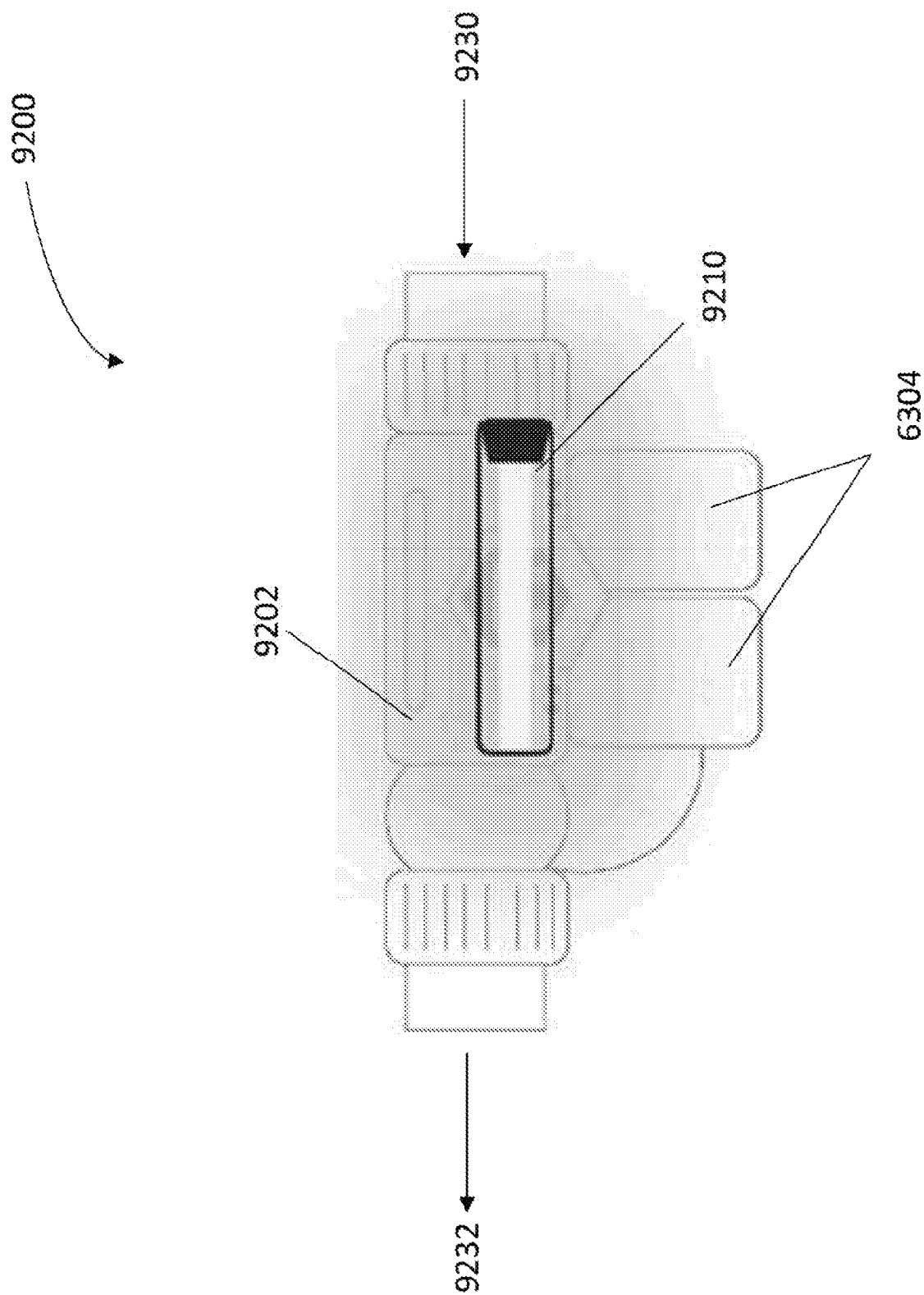
FIG. 91 is a perspective view of a fluid circulation unit according to one embodiment of the invention.

FIG. 91 shows a filter system 9200. The filter system 9200 includes a primary filter 9202, a sanitation member 9210, a fluid inlet 9230, a fluid outlet 9232, and a backwash filter 6304. The primary filter 9202 includes substantially similar features as disclosed in FIG. 26, but is further configured with a sanitation member 9210. In some embodiments, the sanitation member 9210 is an ultraviolet lamp such as a pulsed-xenon lamp that emits between 160 to 300 nm. In some embodiments, the pulsed-xenon lamp emits near 230 nm. The sanitation member 9210 can irradiate UV light to make the environment inhospitable to microorganisms such as bacteria, viruses, molds and other pathogens.

Other Embodiments of Variable Filter Media

Figure 92:
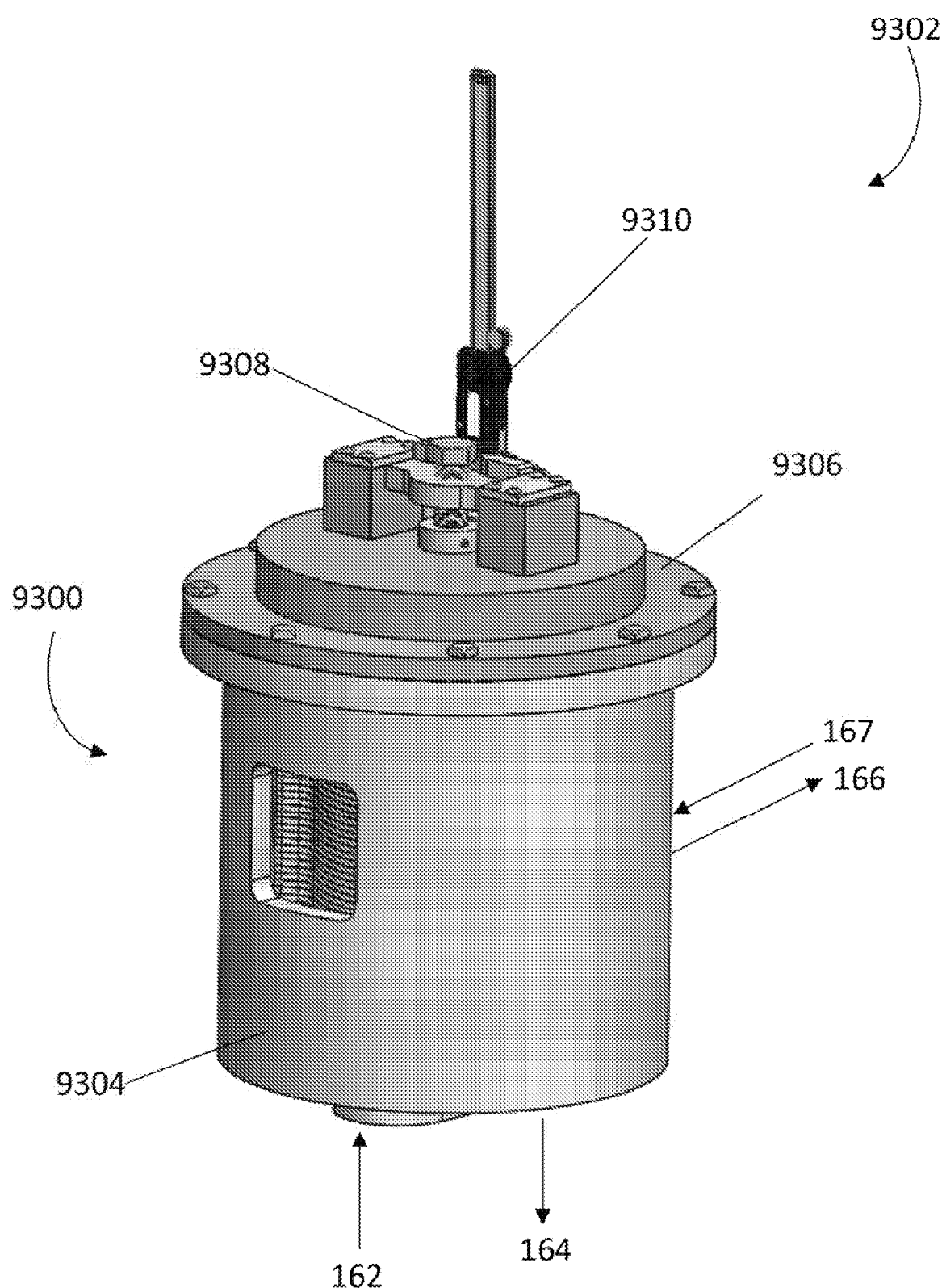
FIG. 92 is a perspective view of a primary filter according to one embodiment of the invention.

FIG. 92 shows a primary filter 9302 according to one embodiment of the invention. The primary filter 9302 includes a housing 9300 having a cleaning fluid inlet 167, a cleaning fluid outlet 164, a backwash inlet 162, and a backwash outlet 166. The housing 9300 includes a filter tank bottom 9304 and a filter tank top 9306. In some embodiments, the filter tank top 9306 includes a lead screw 9308 and an actuator 9310. The actuator 9310 may be configured to variably change a pore size of a filter media 9312 positioned within the housing 9300. The actuator 9310 may displace the lead screw to vary the pore size of the filter media 9312. The actuator 9310 may also display the pore size of the filter media 9312.

Figure 93:
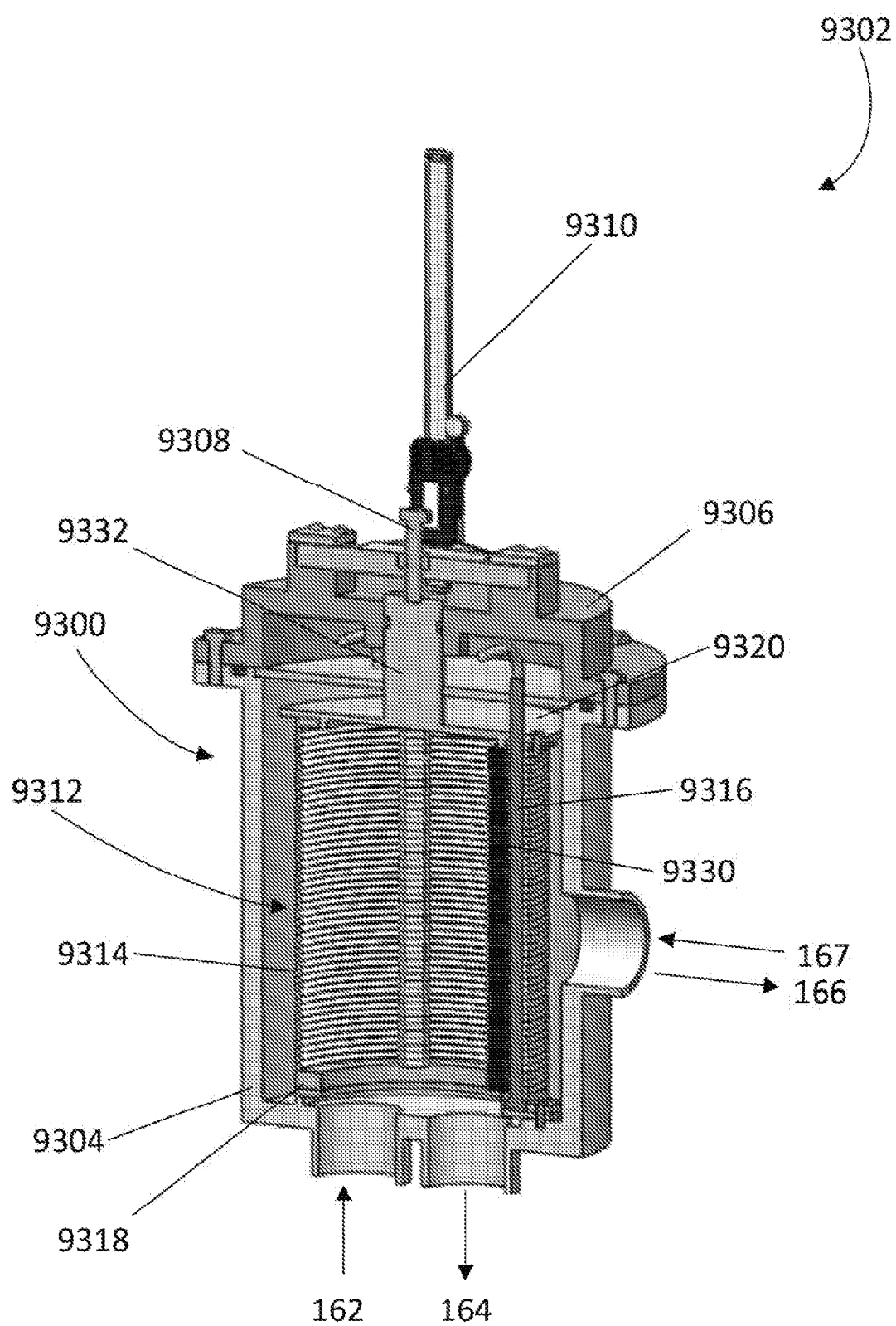
FIG. 93 is a cross sectional view of a primary filter according to one embodiment of the invention.
Figure 94:
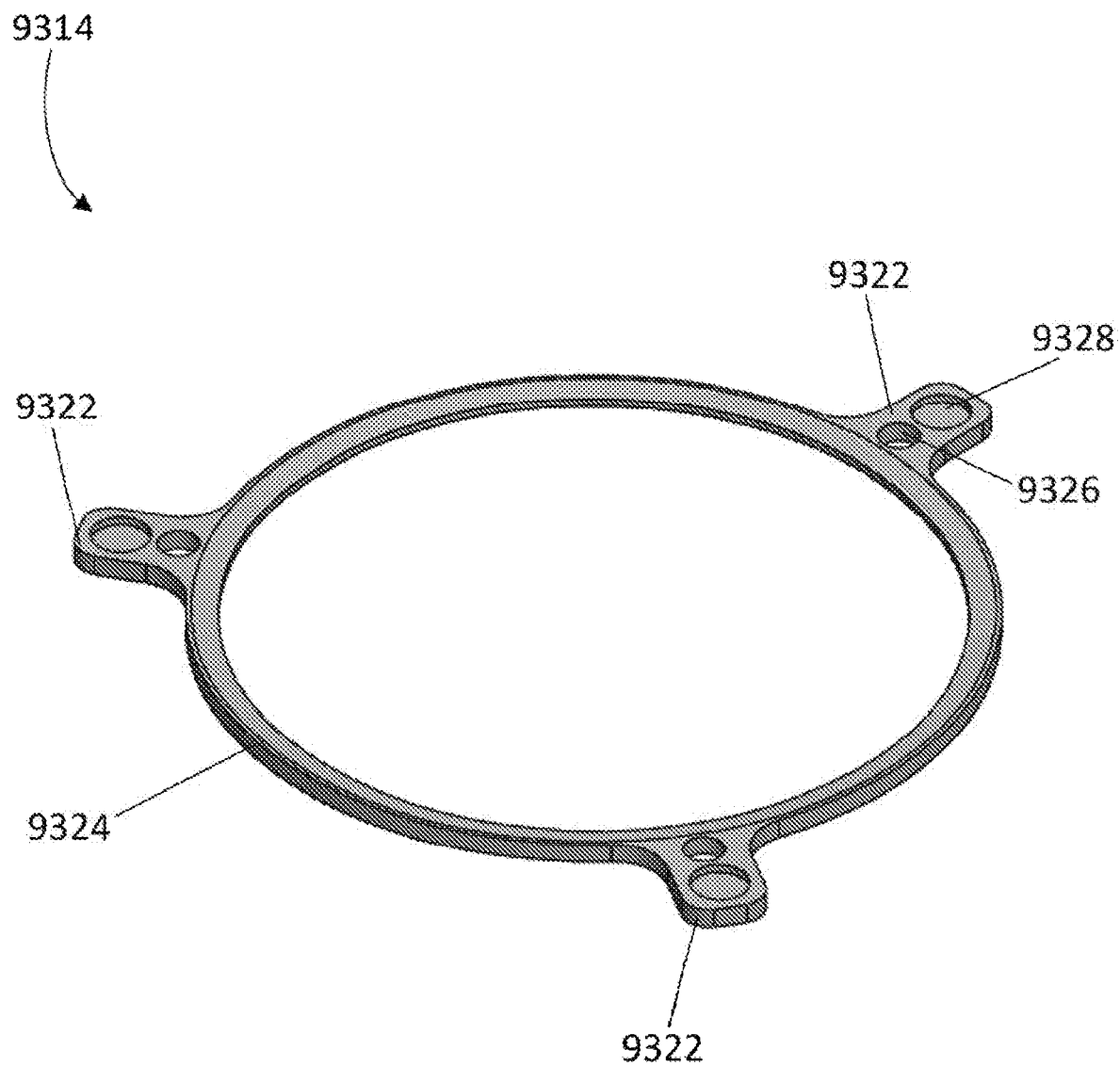
FIG. 94 is a perspective view of a wedge wire ring to be used in a primary filter according to one embodiment of the invention.

As shown in FIG. 93, the filter media 9312 is configured to be coaxially disposed within the housing 9300 and divides an internal chamber of the housing 9300 between a filtrate side coupled to the cleaning outlet 164 and an inlet side coupled to the cleaning inlet 167. In some embodiments, the filter media 9312 is configured to extend from a retainer 9318 positioned on a bottom surface of the housing 9300 to a moveable plate 9320 positioned on the top face of the filter media 9312. The moveable plate 9320 being axially displaceable along the length of the housing 9300. The filter media 9312 includes a surface profile 9314 and a support profile 9316. In some embodiments, the surface profile 9314 includes several wedge wire rings. FIG. 94 shows one non-limiting example of a surface profile 9314 member. In some embodiments, the surface profile 9314 includes several tabs 9322 that project radially from a ring member 9324. The tabs 9322 may include an aperture 9326 that is configured to receive the support profile 9316, and a recessed portion 9328 that is configured to receive a magnet 9330 (as shown in FIG. 93).

Referring to FIGS. 93 and 94, the support profile 9316 may include an axial rod that is thread through the aperture 9326 in the surface profile 9314. Although a single axial rod is illustrated, multiple support profiles 9316 may be configured in the housing 9300. In some embodiments, the surface profile 9314 may be configured to move axially along the support profile 9316. The poles of the magnets 9330 may be configured to exert a magnetic force to drive separation between the surface profile 9314 members.

The pore size of the filter media 9312 may be altered by displacing the movable plate 9320 using the actuator 9310. A pressing member 9332 may be configured to connect the actuator 9310 to the surface of the moveable plate 9320. In some embodiments, the pressing member 9332 may include an axial cylinder. In some embodiments, the actuator 9310 engages a lead screw 9308 that is configured to linearly displace the pressing member 9332. In other embodiments, the actuator may utilize a cam mechanism. In other embodiments, the actuator 9310 may include a hydraulic actuator, pneumatic actuator, electric actuator, or any like actuator capable of displacing the pressing member 9332 and the movable plate 9320.

During operation of the backwash and cleaning cycle, the primary filter 9302 can be in electrical communication with the controller 115 (shown in FIG. 1) to change the pore size of the filter media 9312 based on control variables of the system. In some embodiments, the control variable is the inlet pressure to the primary filter 9302. In this case, the sensor 107 (shown in FIG. 1) sends pressure signals to the controller 115 to change the pore size of the filter media 9312 by engaging the actuator 9310. The actuator 9310 may be linearly extended to decrease the pore size, and may be retracted to increase the pore size of the filter media 9312. In some embodiments, the controller 115 causes the actuator 9310 to reduce the pore size of the filter media 9312 when the pressure signal approaches a linear state. In some embodiments, the actuator 9310 can create a fully-open dimension of the pores, a fully-closed dimension of the pores, and positions therebetween.

Figure 95:
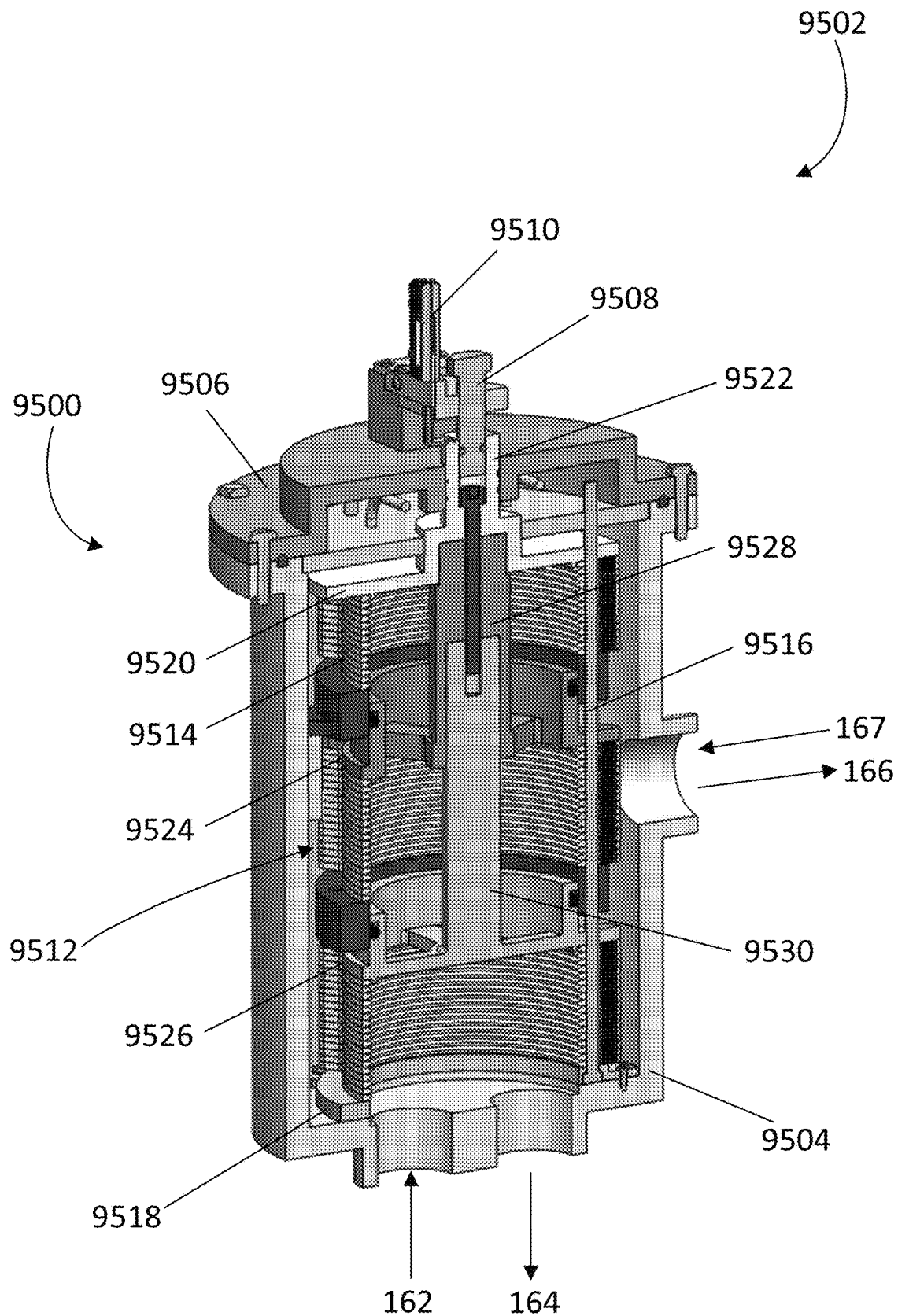
FIG. 95 is a perspective view of filter media to be used in a primary filter according to one embodiment of the invention.

FIG. 95 shows a primary filter 9502 according to one embodiment of the invention. The primary filter 9502 includes a housing 9500 having a cleaning fluid inlet 167, a cleaning fluid outlet 164, a backwash inlet 162, and a backwash outlet 166. The housing 9500 includes a filter tank bottom 9504 and a filter tank top 9506. In some embodiments, the filter tank top 9500 includes a lead screw 9508 and an actuator 9510. The actuator 9510 may be configured to variably change a pore size of a filter media 9512 positioned within the housing 9500. The actuator 9510 may displace the lead screw 9508 to vary the pore size of the filter media 9512. The actuator 9510 may also display the pore size of the filter media 9512.

As shown in FIG. 95, the filter media 9512 is configured to be coaxially disposed within the housing 9500. In some embodiments, the filter media 9512 is configured to extend from a retainer 9518 positioned on a bottom surface of the housing 9500 to a first moveable plate 9520 configured on a top face of the filter media 9512. The filter media 9512 includes a surface profile 9514 used for reducing debris from an inlet fluid stream, and a support profile 9516 for supporting the filter media 9512 within the housing 9500. The surface profile 9514 and the support profile 9516 are similar to the embodiments described above, where the surface profile 9514 members include wedge wire rings configured with several magnets that drive separation between the surface profile 9514 members.

The pore size of the filter media 9512 may be altered using the actuator 9510 to axially displace the several moveable plates positioned within the housing 9500. In one embodiment, a first pressing member 9522 is configured to extend between a top face of the first moveable plate 9520 to the actuator 9508. The actuator 9510 may actuate axially to displace the first pressing member 9522, and in turn, control the pore size the filter media 9512. In some embodiments, the filter media 9512 is further configured with a second moveable plate 9524 and a third moveable plate 9526. In this instance, a second pressing member 9528 is configured to extend from the first moveable plate 9520 to the second moveable plate 9524, and a third pressing member 9530 is configured to extend from the second moveable plate 9524 to the third moveable plate 9526. The second moveable plate 9524 and the third moveable plate 9526 may then be displaced by the actuator 9510 to control the pore size of the filter media 9512. Although the illustrated embodiment shows three moveable plates, it is to be appreciated that the primary filter 9502 may be configured with two moveable plates, five moveable plates, ten moveable plates, etc.

A suitable actuator 9510 may include a screw that is configured to linearly displace the pressing members. In other embodiments, the actuator 9510 may include a hydraulic actuator, pneumatic actuator, electric actuator, or any of the like capable of displacing the pressing members and the several moveable plates. Suitable pressing members may include axial cylinders connected in series between the moveable plates.

During operation of the backwash and cleaning cycle, the primary filter 9502 can be in electrical communication with the controller 115 (shown in FIG. 1) to change the pore size of the filter media 9512 based on control variables of the system. In some embodiments, the control variable is the inlet pressure to the primary filter 9502. In this case, the sensor 107 (shown in FIG. 1) sends pressure signals to the controller 115 to change the pore size of the filter media 9512 by engaging the actuator 9510. The actuator 9510 may be linearly extended to decrease the pore size, and may be retracted to increase the pore size of the filter media 9512. In some embodiments, the controller 115 causes the actuator 9510 to reduce the pore size of the filter media 9512 when the pressure signal approaches a linear state. The actuator 9510 may create a fully-open dimension of the pores, a fully-closed dimension of the pores, and positions therebetween.

In one embodiment, the filter media 9512 may comprise independent pore sizes based on the positioning of the several moveable plates within the filter media 9512. For example, the pore size of filter media 9512 between the second moveable plate 9522 and the third moveable plate 9524 may be different than the pore size of filter media 9512 between the second moveable plate 9522 and the first moveable plate 9524. The independent pore sizes may be adjusted based on the initial positioning of the first moveable plate 9522, the second moveable 9524, and the third moveable plate 9526 within the filter media 9512.

Electromagnetic Concept

Figure 96:
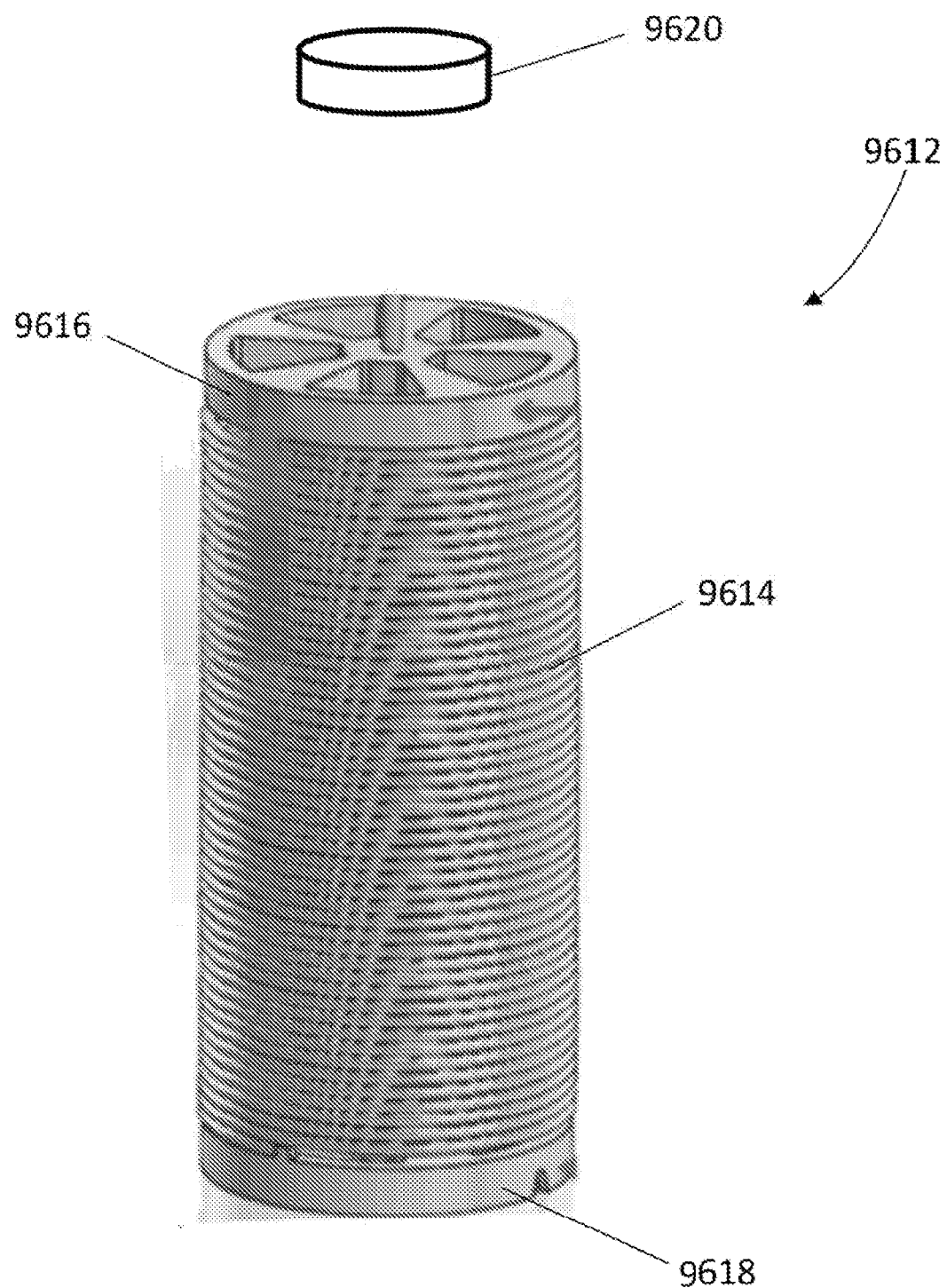
FIG. 96 is a perspective of a primary filter according to one embodiment of the invention.

FIG. 96 shows a filter media 9612 according to one embodiment of the invention. The filter media 9612 includes a surface profile 9614 configured between a top member 9616 and a bottom member 9618. In some embodiments, the pore size of the filter media 9612 may be varied by compressing and extending the filter media 9612 through interaction with a magnetic device 9620. In some embodiments, the surface profile 9614 includes a spring. The spring may be formulated with materials that produce a magnetic moment capable of interacting with the magnetic device 9620. In some embodiments, the magnetic device 9620 includes a magnet that may be positioned above the filter media 9612 so that the magnetic moment of the filter media 9612 interacts with an external magnetic field of the magnetic device 9620. In other embodiments, the magnetic device includes an electromagnet. The magnetic device 9620 may be then be displaced closer and further away from the filter media 9612 to reduce and increase the pore size of the filter media 9612, respectively. In one non-limiting example, the magnetic device 9620 may be displaced using an actuator.

Figure 97:
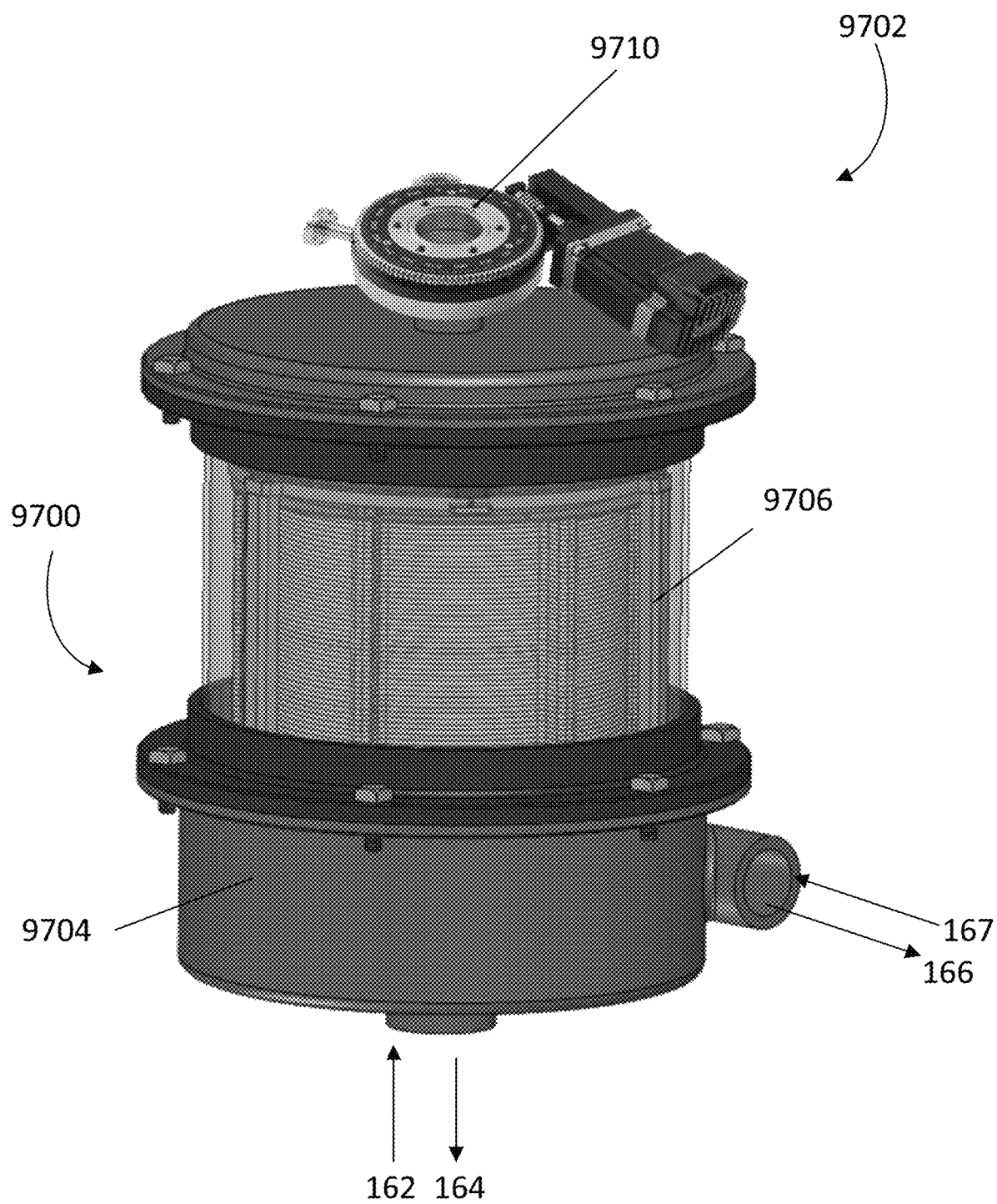
FIG. 97 is a perspective view of a primary filter according to one embodiment of the invention.

FIG. 97 illustrates a primary filter 9702 according to one embodiment of the invention. The primary filter 9702 includes a housing 9700 having a cleaning fluid inlet 167, a cleaning fluid outlet 164, a backwash inlet 162, and a backwash outlet 166. The housing 9700 includes a filter tank bottom 9704 and a filter tank top 9706. A portion of the filter tank top 9706 may be transparent. A transparent top may assist an operator to assess when the filter media in the primary filter 9702 needs to be cleaned. In some embodiments, the filter tank top 9706 includes an actuator 9710 that extends through the filter tank top 9706 and is coupled to the filter media 9712 disposed therein. The actuator 9710 may variably change a dimension of the pores of the filter media 9712 positioned within the housing 9700. The actuator 9710 may displace the lead screw to vary the pore size of the filter media 9712. The actuator 9710 may also display the pore size of the filter media 9712.

Figure 98:
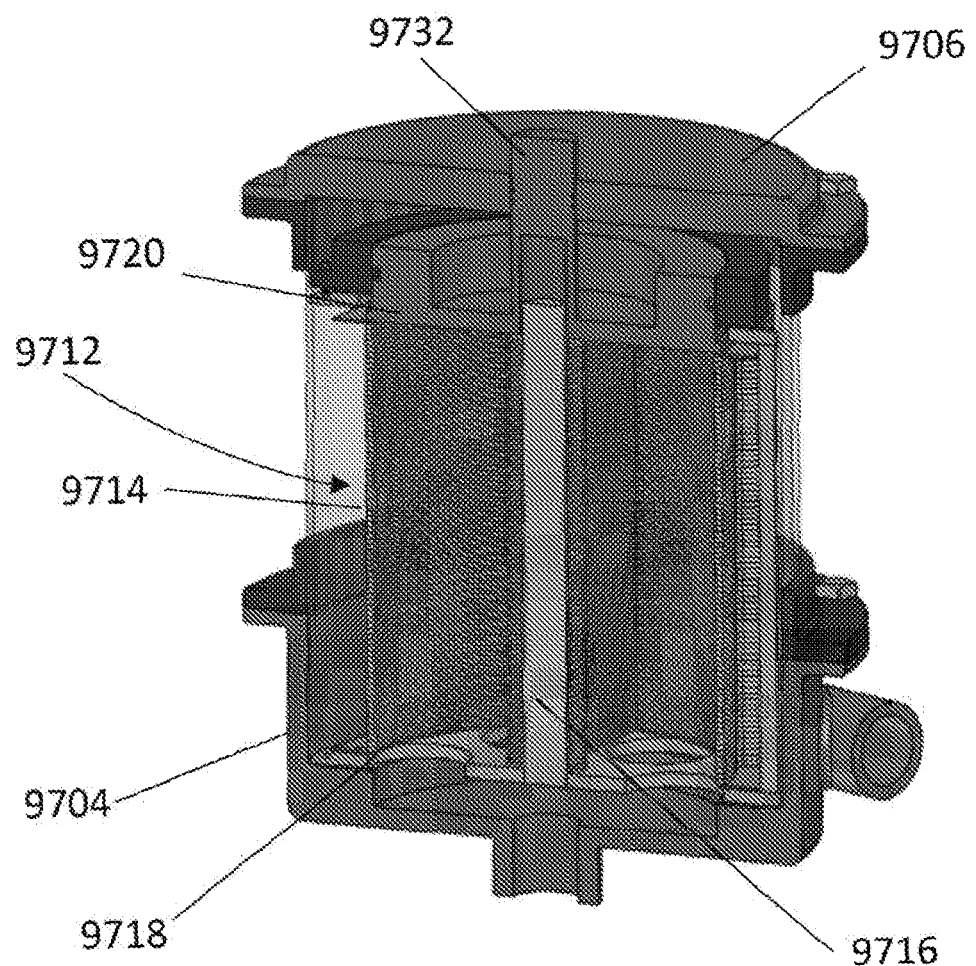
FIG. 98 is a cross sectional view of a primary filter according to one embodiment of the invention.

As shown in FIG. 98, the filter media 9712 is configured to be coaxially disposed within the housing 9700 and divides an internal chamber of the housing 9700 between a filtrate side coupled to the cleaning outlet 164 and an inlet side coupled to the cleaning inlet 167. In some embodiments, the filter media 9712 is configured to extend from a retainer 9718 positioned on a bottom surface of the housing 9700 to a moveable plate 9720 positioned on the top face of the filter media 9712. In some embodiments, a gasket 9711 is positioned between the top face of the filter media 9712 and the pressing member 9720. The moveable plate 9720 is axially displaceable along the length of the housing 9700. The filter media 9712 includes a surface profile 9714 and a support profile 9716. In some embodiments, the surface profile 9714 includes several wedge wire rings, and the support profile 9716 includes an internal sliding rod that extends the length of the filter media 9712.

Figure 99:
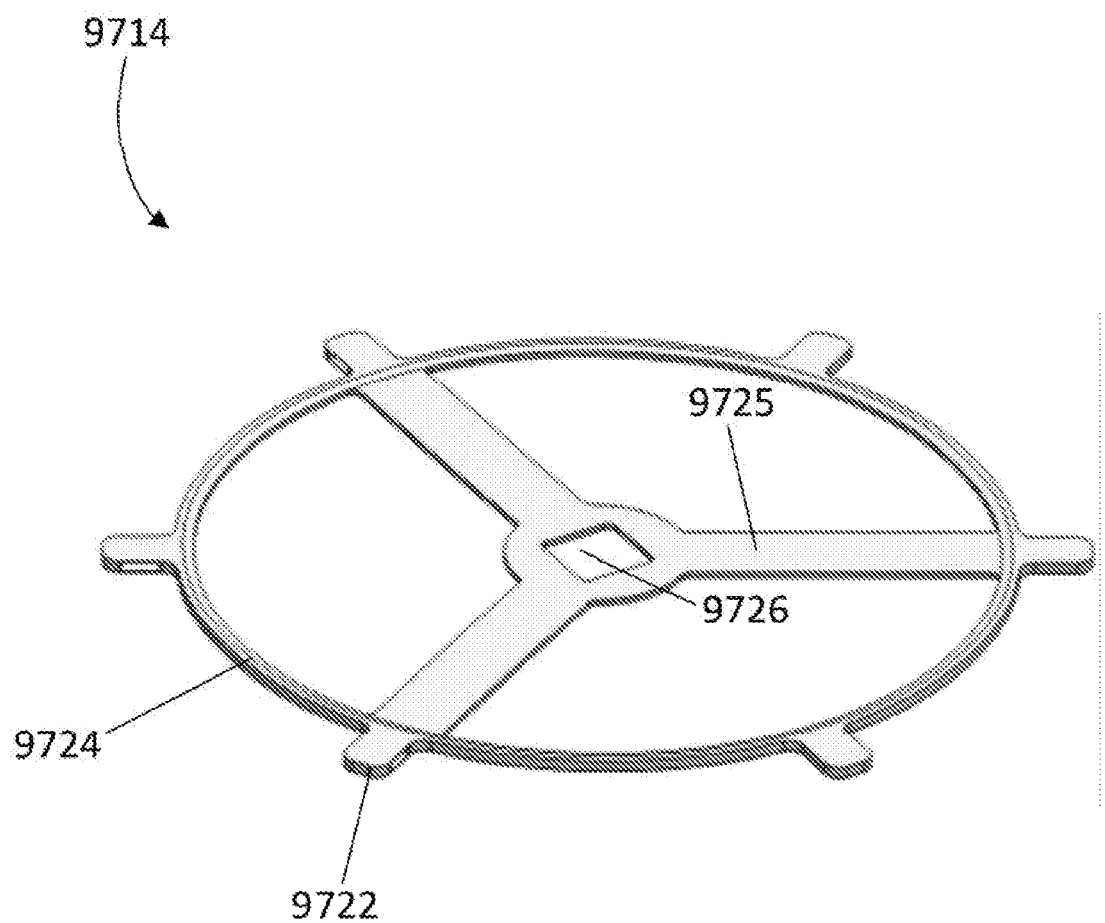
FIG. 99 is a perspective view of a wedge wire ring to be used in a primary filter according to one embodiment of the invention.
Figure 100:
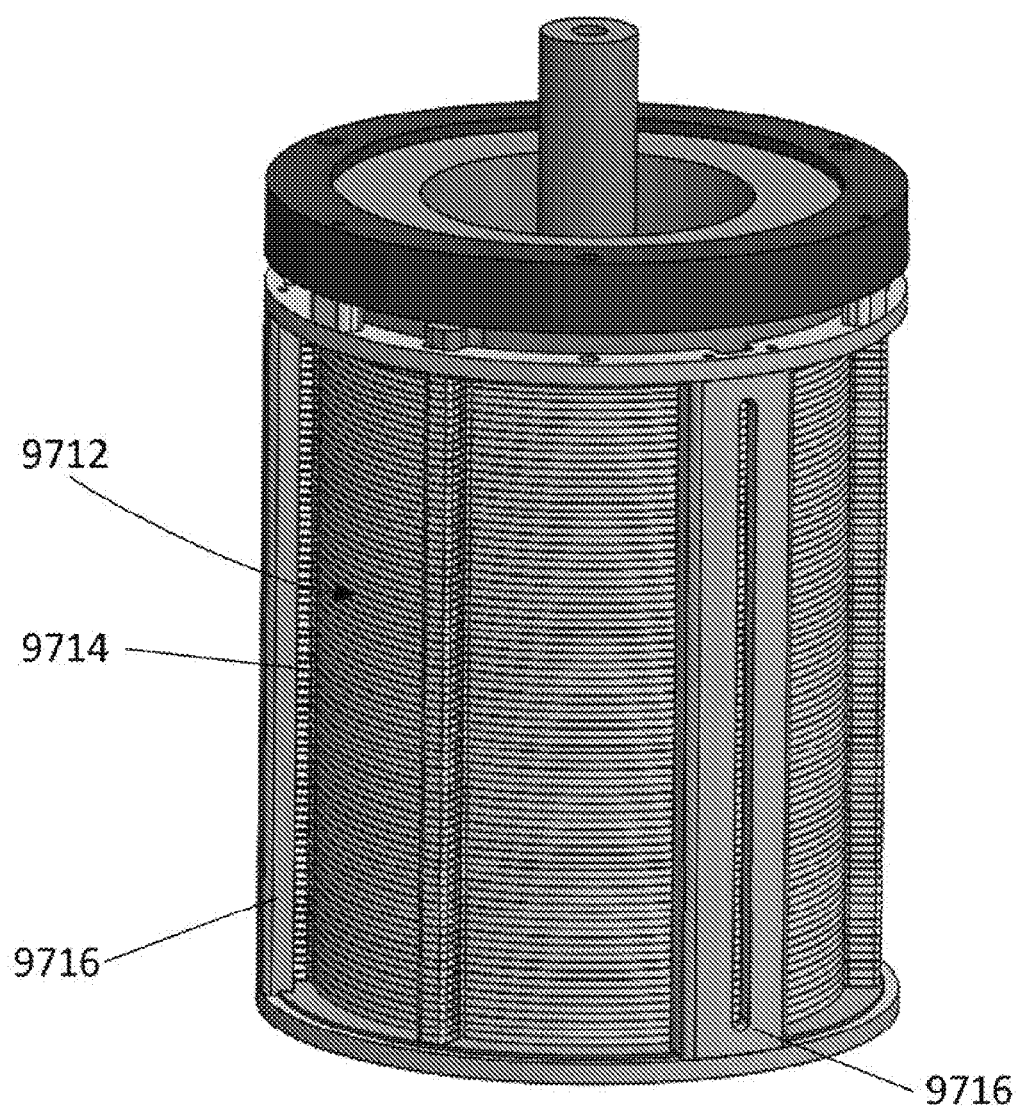
FIG. 100 is a perspective view of an alternative embodiment for a portion of the primary filter of FIG. 97.

FIG. 99 illustrates one embodiment of a surface profile 9714 member. The surface profile 9714 includes several tabs 9722 that project radially from a ring member 9724. The tabs 9722 may include a recessed portion that receives a magnet, while in other embodiments, the tabs 9722 enclose an embedded magnet embedded. In one embodiment, the ring member 9724 includes six tabs 9722 equally placed at equal angles on the periphery, each having a magnet embedded within the tab 9722. The magnets 9730 repel each other due to the polarity of the magnets. The repletion creates a space between the ring members 9724 and defines a dimension of the pores. The surface profile 9714 further includes one or more support beams 9725 that extend from the periphery of the ring 9724 towards the center to form an aperture 9726 configured to receive the support profile 9716. In some embodiments, the aperture 9726 forms a square shape and is configured to receive a square support profile 9716. The square support profile helps to prevent rotation of the surface profile 9714. Referring to FIG. 100, an alternative arrangement for the surface profile 9714 and support profile 9716 is illustrated. In this arrangement, the support profile 9716 includes guiding members that extend the length of the filter media 9712 and are positioned around the periphery of the filter media 9712 in the housing 9700. The support profile 9716 is configured to receive one or more of the tabs 9722 from the surface profile 9714 to provide support while allowing the surface profile 9714 to move axially along the housing 9700. The external support profile 9716, as shown in FIG. 100, may be used as an alternative to the internal support profile 9716 as shown in FIG. 9716. In some embodiments, both the external and internal support profile 9716 are used to support the surface profile 9714.

Referring to FIG. 98, the pore size of the filter media 9712 may be altered by displacing the movable plate 9720 using the actuator 9710. A pressing member 9732 may be configured to connect the actuator 9710 to the surface of the moveable plate 9720. In some embodiments, the pressing member 9732 may include an axial cylinder. In some embodiments, the actuator 9710 engages a lead screw that is configured to linearly displace the pressing member 9732. In other embodiments, the actuator may utilize a cam mechanism. In other embodiments, the actuator 9710 may include a hydraulic actuator, pneumatic actuator, electric actuator, or a suitable actuator capable of displacing the pressing member 9732 and the movable plate 9720.

During operation of the backwash and cleaning cycle, the primary filter 9702 can be in electrical communication with the controller 115 (shown in FIG. 1) to change the pore size of the filter media 9712 based on control variables of the system. In some embodiments, the control variable is the inlet pressure to the primary filter 9702. In this case, the sensor 107 (shown in FIG. 1) sends pressure signals to the controller 115 to change the pore size of the filter media 9712 by engaging the actuator 9710. The actuator 9710 may be linearly extended to decrease the pore size, and may be retracted to increase the pore size of the filter media 9712. In some embodiments, the controller 115 causes the actuator 9710 to reduce the pore size of the filter media 9712 when the pressure signal approaches a linear state. In some embodiments, the actuator 9710 can create a fully-open dimension of the pores, a fully-closed dimension of the pores, and positions therebetween.

Figure 102:
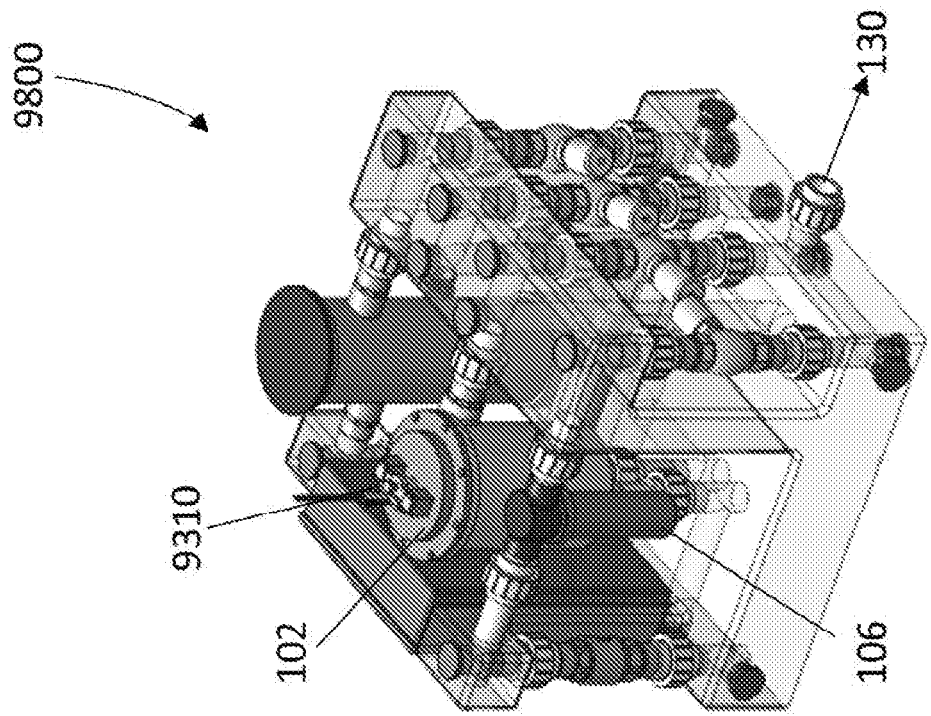
FIG. 102 is a perspective view of a filter system according to one embodiment of the invention.
Figure 101:
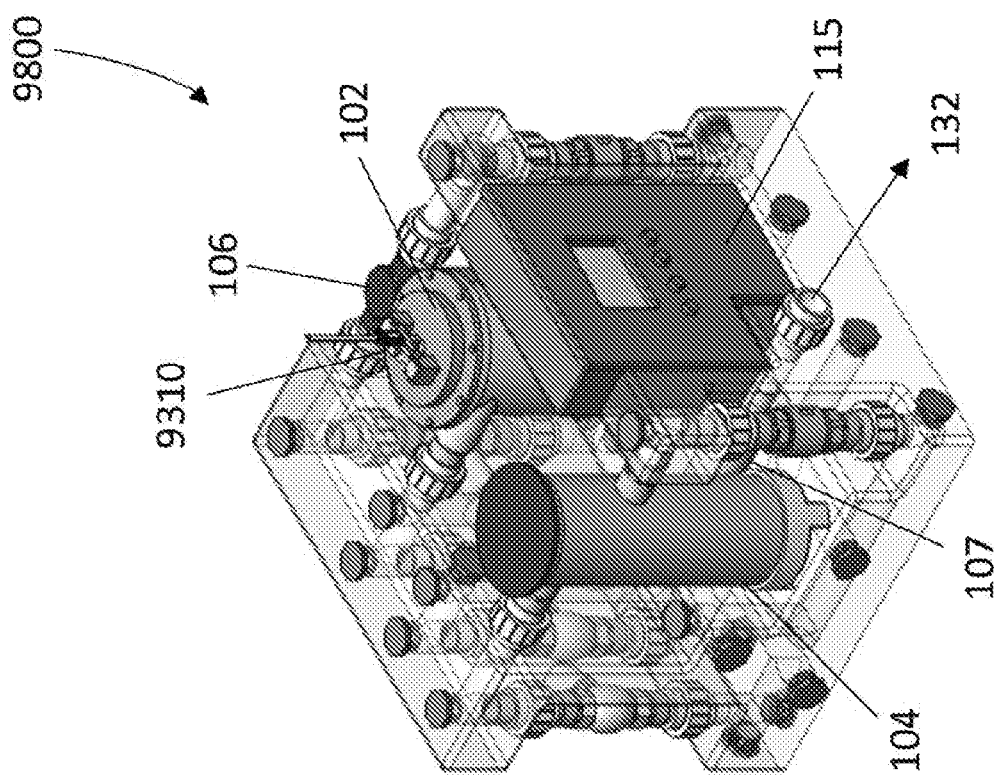
FIG. 101 is a perspective view of a filter system according to one embodiment of the invention.

FIGS. 101-102 show another configuration of a filter system 9800. The filter system 9800 is a compact arrangement configured without having pipes between filtration units. This filter system 9800 may offer benefits by being compact through the elimination of flow paths. The filter system 9800 includes a primary filter 102, a backwash filter 104, a pre-screen filter 106, a controller 115, an actuator 9310 coupled to the filter media in the primary filter and configured to variably alter the pore size using the methods described herein. The filter system 9800 further includes a plurality of valves in electrical communication with the controller 115, and is configured to operate in a similar or the same manner as the aforementioned embodiments.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. A variable pore size filter media, comprising:
   an upper plate;
   a retainer;
   a support profile disposed between the upper plate and the retainer;
   a plurality of wire rings disposed on the support profile and longitudinally distributed within a region between the upper plate and the retainer, the plurality of wire rings being distributed in a non-contiguous manner to form a plurality of spaces therebetween;
   a plurality of pores defined by the plurality of spaces between the plurality of wire rings; and
   a pore size adjustment mechanism configured to vary a respective distance between each of the plurality of wire rings to increase or decrease a respective size of each of the plurality of pores by increasing or decreasing a size of each of the plurality of spaces.

2. The variable pore size filter media of claim 1, wherein each of the plurality of wire rings includes respective magnets coupled to a surface on at least a portion thereof, wherein the respective magnets are aligned to repel each other to create the plurality of spaces.

3. The variable pore size filter media of claim 2, wherein each of the plurality of wire rings includes a respective tab configured to receive the respective magnet.

4. The variable pore size filter media of claim 2, wherein each of the plurality of wire rings further includes a respective aperture configured to receive the support profile.

5. The variable pore size filter media of claim 2, wherein the pore size adjustment mechanism includes a pressing member that expands and contracts the region to vary the respective distance between each of the plurality of wire rings.

6. The variable pore size filter media of claim 1, wherein the pore size adjustment mechanism includes a rotatable camshaft having a plurality of radially projecting cams positioned between at least a portion of the plurality of wire rings, and wherein movement of the cams is configured to vary the respective distance between each of the plurality of wire rings.

7. The variable pore size filter media of claim 6, wherein each cam of the plurality of radially projecting cams has a height dimension that varies along a diameter of the cam.

8. A filter, comprising:
a housing having an inlet to receive a fluid, and an outlet to discharge filtrate;
a filter media positioned in an inner chamber of the housing, the filter media having a plurality of wire rings longitudinally distributed apart from one another within the inner chamber to form a plurality of spaces therebetween;
a plurality of pores defined by the plurality of spaces between the plurality of wire rings;
an actuator coupled to the filter media to move a portion of the filter media to change a dimension of the plurality of pores by increasing or decreasing a size of each of the plurality of spaces; and
a controller communicatively coupled to the actuator, the controller configured to control the actuator to move the portion of the filter media.

9. The filter of claim 8, wherein the plurality of wire rings are configured to magnetically repel each other to create the plurality of spaces between the plurality of wire rings.

10. The filter of claim 8, wherein each of the plurality of wire rings comprises a respective planar surface that is perpendicular to a common axis on which each of the plurality of wire rings is longitudinally distributed.

11. The filter of claim 8, wherein each of the plurality of wire rings further includes at least one respective aperture configured to receive a support rod that extends longitudinally along at least a portion of the inner chamber, and wherein each of the plurality of wire rings is configured to move longitudinally along the support rod.

12. The filter of claim 8, wherein the actuator compresses or expands a region of the inner chamber that contains the plurality of wire rings so as to move the portion of the filter media.

13. The filter of claim 12, wherein the actuator linearly displaces a pressing member to compress or expand the region.

14. The filter of claim 8, wherein the filter media is disposed between the outlet and the inlet.

15. The filter of claim 8, wherein the actuator linearly displaces a magnetic device to move the portion of the filter media.

16. The filter of claim 8, further comprising at least one sensor configured to generate a signal, wherein the controller directs the actuator to move the portion of the filter media based on the signal.

17. The filter of claim 16, wherein the at least one sensor includes at least one of a temperature sensor, a pressure sensor, a flow rate sensor, a fluid level sensor, a fluid density sensor, a counter, or a timer.

18. The filter of claim 8, wherein the filter media includes a rotatable camshaft having a plurality of radially projecting cams positioned between at least a portion of each of the plurality of wire rings, wherein each cam of the plurality of radially projecting cams has a height that varies along a diameter of the cam.

19. The filter of claim 18, wherein the actuator is configured to rotate the camshaft to radially extend and retract the plurality of radially projecting cams so as to move the portion of the filter media.

20. A variable pore size filter comprising:
an upper plate;
a retainer;
a support profile disposed between the upper plate and the retainer;
a plurality of wire rings disposed on the support profile and longitudinally distributed between the upper plate and the retainer to form a plurality of pores therebetween;
a plurality of magnets coupled to the plurality of wire rings;
at least one sensor configured to generate a signal;
an actuator coupled to the upper plate; and
a controller communicatively coupled to the actuator and the at least one sensor, the controller configured to control the actuator based on the signal from the at least one sensor to increase or decrease a respective size of each of the plurality of pores.

* * * * *